US010739926B2

(12) United States Patent
Nathan et al.

(10) Patent No.: US 10,739,926 B2
(45) Date of Patent: Aug. 11, 2020

(54) PRESSURE-SENSITIVE TOUCH PANEL

(71) Applicant: Cambridge Touch Technologies Ltd., Cambridge (GB)

(72) Inventors: Arokia Nathan, Cambridge (GB); Simon Banks, Cambridge (GB)

(73) Assignee: Cambridge Touch Technologies, Cambridge (GB)

( * ) Notice: Subject to any disclaimer, the term of this patent is extended or adjusted under 35 U.S.C. 154(b) by 0 days.

(21) Appl. No.: 16/534,076

(22) Filed: Aug. 7, 2019

(65) Prior Publication Data
US 2019/0361547 A1    Nov. 28, 2019

Related U.S. Application Data

(63) Continuation of application No. 16/356,538, filed on Mar. 18, 2019, now Pat. No. 10,430,009, which is a
(Continued)

(30) Foreign Application Priority Data

Dec. 23, 2015    (GB) .................................. 1522813.3

(51) Int. Cl.
*G11C 29/38*    (2006.01)
*G11C 29/12*    (2006.01)
(Continued)

(52) U.S. Cl.
CPC ............ *G06F 3/044* (2013.01); *G06F 3/0414* (2013.01); *G06F 3/0416* (2013.01);
(Continued)

(58) Field of Classification Search
None
See application file for complete search history.

(56) References Cited

U.S. PATENT DOCUMENTS 10,254,894 B2    4/2019 Nathan et al.
10,282,046 B2    5/2019 Nathan et al.
(Continued)

OTHER PUBLICATIONS

Notice of Allowance, U.S. Appl. No. 16/390,094, dated Sep. 17, 2019, 8 pages.
(Continued)

*Primary Examiner* — Andrew Sasinowski

(57) ABSTRACT

A device (48) for combined capacitance and pressure measurements includes a number of first input/output terminals for a projected capacitance touch panel, wherein the projected capacitance touch panel includes a layer of piezoelectric material disposed between a plurality of first electrodes and at least one second electrode. The device also includes a plurality of second input/output terminals for a capacitive touch controller. The device also includes a plurality of separation stages, each separation stage connecting at least one first input/output terminal to a corresponding second input/output terminal, and each separation stage including a first frequency-dependent filter for filtering signals between first and second input/output terminals. The device also includes at least one amplification stage, each amplification stage having at least one input and an output configured to provide an amplified signal, wherein the number of amplification stages is less than or equal to the number of separation stages and each amplification stage input is connected to one or more of the first input/output terminals through the respective separation stage(s). Each amplification stage or each separation stage includes a second frequency-dependent filter for filtering signals between the respective first input/output terminal and an amplification stage input. Each first frequency-dependent filter is configured to pass signals to and/or from the capacitive touch controller and each second frequency-dependent (Continued)

filter is configured to attenuate signals from the capacitive touch controller.

13 Claims, 31 Drawing Sheets

Related U.S. Application Data continuation of application No. 15/596,156, filed on May 16, 2017, now Pat. No. 10,282,046, which is a continuation-in-part of application No. 15/386,612, filed on Dec. 21, 2016, now Pat. No. 10,254,894.

(51) Int. Cl.
| | |
|---|---|
| *G11C 29/00* | (2006.01) |
| *G11C 29/14* | (2006.01) |
| *G11C 29/36* | (2006.01) |
| *G11C 29/42* | (2006.01) |
| *G11C 29/44* | (2006.01) |
| *G11C 29/48* | (2006.01) |
| *G06F 3/044* | (2006.01) |
| *G06F 3/041* | (2006.01) |

(52) U.S. Cl.
CPC .. *G06F 3/0412* (2013.01); *G06F 2203/04105* (2013.01); *G06F 2203/04106* (2013.01); *G06F 2203/04107* (2013.01)

(56) References Cited

U.S. PATENT DOCUMENTS

| | | |
|---|---|---|
| 10,310,659 B2 | 6/2019 | Nathan et al. |
| 10,318,038 B2 | 6/2019 | Nathan et al. |
| 10,430,009 B2 | 10/2019 | Nathan et al. |
| 2010/0013785 A1 | 1/2010 | Murai et al. |
| 2014/0341446 A1 | 11/2014 | Hare et al. |
| 2014/0354585 A1 | 12/2014 | Cok et al. |
| 2015/0042590 A1 | 2/2015 | Ando et al. |
| 2015/0331517 A1* | 11/2015 | Filiz ............... G06F 3/0414 345/173 |
| 2016/0062505 A1 | 3/2016 | Hwang et al. |
| 2019/0050080 A1 | 2/2019 | Bagheri et al. |
| 2019/0243502 A1 | 8/2019 | Nathan et al. |
| 2019/0243503 A1 | 8/2019 | Nathan et al. |
| 2019/0253053 A1 | 8/2019 | Nathan et al. |
| 2019/0286263 A1 | 9/2019 | Bagheri et al. |

OTHER PUBLICATIONS

U.S. Non Final Office Action, U.S. Appl. No. 16/390,094, dated May 17, 2019, 12 pages.
U.S. Final Office Action, U.S. Appl. No. 16/385,213, dated Jan. 7, 2020, 23 pages.
U.S. Non Final Office Action, U.S. Appl. No. 16/385,213, dated Jun. 14, 2019, 20 pages.
U.S. Final Office Action, U.S. Appl. No. 16/385,237, dated Jan. 23, 2020, 27 pages.
U.S. Non Final Office Action, U.S. Appl. No. 16/385,237, dated Jun. 19, 2019, 22 pages.
Nathan et. al, Commonly assigned U.S. Appl. No. 16/891,285, Pressure Sensitive Touch Panel, filed Jun. 3, 2020, 93 pages.
U.S. Non Final Office Action, U.S. Appl. No. 16/385,213, dated Jun. 1, 2020, 22 pages.

\* cited by examiner

PRESSURE-SENSITIVE TOUCH PANEL

CROSS-REFERENCE TO RELATED APPLICATIONS

The present application is a Continuation of application Ser. No. 16/356,538, filed Mar. 18, 2019, which is a Continuation of application Ser. No. 15/596,156, filed on May 16, 2017, now patent Ser. No. 10/282,046, which is a Continuation-in-Part-Application of application Ser. No. 15/386,612, filed on Dec. 21, 2016, now U.S. Pat. No. 10,254,894, which claims priority from United Kingdom Application GB 1522813.3, filed Dec. 23, 2015, the benefit of priority of each of these applications is claimed hereby, and each is incorporated by reference herein in its entirety.

FIELD OF THE INVENTION

The present invention relates to a touch panel for combined capacitive and pressure sensing.

BACKGROUND

Resistive and capacitive touch panels are used as input devices for computers and mobile devices. One type of capacitive touch panel, projected capacitance touch panels, is often used for mobile devices because an exterior layer may be made of glass, providing a hard surface which is resistant to scratching. An example of a projected capacitance touch panel is described in US 2010/0079384 A1.

Projected capacitance touch panels operate by detecting changes in electric fields caused by the proximity of a conductive object. The location at which a projected capacitance touch panel is touched is often determined using an array or grid of capacitive sensors. Although projected capacitance touch panels can usually differentiate between single-touch events and multi-touch events, they suffer the drawback of not being able to sense pressure. Thus, projected capacitance touch panels tend to be unable to distinguish between a relatively light tap and a relatively heavy press. A touch panel that can sense pressure can allow a user to interact with a device in new ways by providing additional information to simply position of a touch.

Different approaches have been proposed to allow a touch panel to sense pressure. One approach is to provide capacitive sensors which include a gap whose size can be reduced by applied pressure, so as to produce a measurable difference in the mutual capacitance. For example, US 2014/043289 A describes a pressure sensitive capacitive sensor for a digitizer system which includes an interaction surface, at least one sensing layer operable to sense interaction by mutual capacitive sensing, and an additional layer comprising resilient properties and operable to be locally compressed responsive to pressure locally applied during user interaction with the capacitive sensor. However, the need for a measurable displacement can make it more difficult to use a glass touch surface and can cause problems with material fatigue after repeated straining.

Other pressure sensitive touch panels have proposed using one or more discrete force sensors supporting a capacitive touch panel, such that pressure applied to the capacitive touch panel is transferred to one or more sensors located behind the panel or disposed around the periphery. For example, US 2013/0076646 A1 describes using strain gauges with a force sensor interface which can couple to touch circuitry. WO 2012/031564 A1 describes a touch panel including a first panel, a second panel, and a displacement sensor sandwiched between the first panel and the second panel. The displacement sensors, such as capacitive or piezoresistive sensors, are placed around the edge of the second panel. However, it can be difficult to distinguish the pressure of multiple touches using sensors located behind a touch panel or disposed around the periphery.

Other pressure sensitive touch panels have been proposed which attempt to combine capacitive touch sensing with force sensitive piezoelectric layers. For example, WO 2009/150498 A2 describes a device including a first layer, a second layer, a third layer, a capacitive sensing component coupled to the first layer, and a force sensing component coupled to the first layer and the third layer and configured to detect the amount of force applied to the second layer. WO 2015/046289 A1 describes a touch panel formed by stacking a piezoelectric sensor and an electrostatic sensor. The piezoelectric sensor is connected to a pressing force detection signal generation unit, and the electrostatic sensor is connected to a contact detection signal generation unit. However, systems which use separate electrodes and/or separate electronics to sense changes in capacitance and pressures can make a touch panel more bulky and expensive. Systems in which electrodes are directly applied or patterned onto a piezoelectric film can be more complex and expensive to produce.

SUMMARY

The present invention seeks to provide an improved capacitive touch panel. According to a first aspect of the invention there is provided a device including a number of first input/output terminals for a projected capacitance touch panel, wherein the projected capacitance touch panel includes a layer of piezoelectric material disposed between a plurality of first electrodes and at least one second electrode. The device also includes a plurality of second input/output terminals for a capacitive touch controller. The device also includes a plurality of separation stages, each separation stage connecting at least one first input/output terminal to a corresponding second input/output terminal, and each separation stage including a first frequency-dependent filter for filtering signals between first and second input/output terminals. The device also includes at least one amplification stage, each amplification stage having at least one input and an output configured to provide an amplified signal, wherein the number of amplification stages is less than or equal to the number of separation stages and each amplification stage input is connected to one or more of the first input/output terminals through the respective separation stage(s). Each amplification stage or each separation stage includes a second frequency-dependent filter for filtering signals between the respective first input/output terminal and an amplification stage input. Each first frequency-dependent filter is configured to pass signals to and/or from the capacitive touch controller and each second frequency-dependent filter is configured to attenuate signals from the capacitive touch controller.

Thus, pressure and capacitance measurements may be performed using a single set of electrodes. This allows pressure and capacitance measurements to be integrated into a touch panel and control system without substantially increasing the complexity of a touch panel. A single signal including both pressure and capacitance information may be processed in a way which may be readily integrated with existing projected capacitance touch panels and capacitive touch controllers.

Each first frequency dependent filter may comprise at least one band-pass filter and each second frequency dependent filter may comprise at least one low-pass filter. The first frequency-dependent filter may comprise at least one band-pass filter and the second frequency-dependent filter may comprise at least one band-stop filter. The first frequency-dependent filter may comprise a high-pass filter and the second frequency-dependent filter may comprise a low-pass filter. Each band-pass filter may be a notch or comb filter. Filters may comprise active filter circuits. Filters may comprise passive filter circuits. Filters may comprise a single stage. Filters may comprise multiple stages. Filters may comprise filter circuits selected from the group consisting of Butterworth filters, Chebyshev filters, Gaussian filters and Bessel filters.

The second frequency dependent filter may have a low-frequency cut-off configured to reject a pyroelectric response of the layer of piezoelectric material in the touch panel. The low frequency cut-off may be at least 7 Hz. The second frequency dependent filter may have a low-frequency cut-off configured to reject a mains power distribution frequency. The second frequency dependent filter may include a notch filter centred at a mains power distribution frequency. The mains power distribution frequency may be 50 Hz, 60 Hz, at least 100 Hz, at least 200 Hz or at least 400 Hz.

The second frequency-dependent filters may be configured such that the amplitude of the amplified signal from each amplification stage output is dependent upon a pressure applied to the projected capacitance touch panel proximate to the first electrode(s) connected to the corresponding first input/output terminal(s).

Each amplification stage may be connected to one first input/output terminal through one separation stage. Each amplification stage may be connected to two or more of the first input/output terminals through respective separation stages.

Each amplification stage may include a virtual earth amplifier to provide the amplified signal. Each amplification stage may include an integrating amplifier to provide the amplified signal. Each amplification stage may include a charge amplifier to provide the amplified signal.

The plurality of separation stages and the plurality of amplification stages may be connected by a resistance network. The plurality of separation stages and the plurality of amplification stages may be connected using one or more multiplexers.

The device may further include a common terminal for receiving bias signals from the capacitive touch controller. Each separation stage may further include an additional first frequency-dependent filter, and a reference resistance and a reference capacitance connected in series, each separation stage configured to connect the respective second input/output terminal to the common terminal through the reference resistance and capacitance, the additional first frequency-dependent filter for filtering signals between the respective second input/output terminal and the common terminal. Each amplification stage may be a differential amplification stage having a first amplification stage input connected to one or more of the first input/output terminals through the respective separation stage(s) and a second amplification stage input connected to the common terminal through the reference resistance and reference capacitance of the respective separation stage(s). In dependence upon each separation stage including a second frequency-dependent filter, each separation stage may further include an additional second frequency-dependent filter for filtering signals between the respective second amplification stage input first terminal and the common terminal.

Thus, capacitance measurements may be combined with differential amplification of pressure signals to improve the signal to noise ratio of the amplified signals.

The first frequency dependent filter may be a capacitance.

Each amplification stage may include a second frequency dependent filter, and each second frequency dependent filter may be a feedback network(s) and one or more operational amplifiers. A feedback network may be a resistance-capacitance network.

The device may further include a third terminal. The device may further include a pressure signal processing module having a plurality of inputs and an output, each input connected to a corresponding amplification stage output, and the output connected to the third terminal. The pressure signal processing module may be configured to receive the amplified signals, to calculate pressure values in dependence upon the amplified signals, and to provide an output comprising pressure values to the third terminal.

The device may further include a plurality of third terminals, each third terminal connected to a corresponding amplification stage output.

The device may further include a capacitive touch controller having a plurality of electrode monitoring ports, each electrode monitoring port connected to a corresponding second input/output terminal. The capacitive touch controller may be configured to send and/or receive signals to and/or from sensing electrodes of the projected capacitance touch panel via the respective signal separation stages, to calculate capacitance values in dependence upon the sent and/or received signals, and to provide an output comprising capacitance values.

The device may further include a capacitive touch controller having a plurality of electrode monitoring ports and a common output port, each electrode monitoring port connected to a corresponding second input/output terminal, and the common output port for providing bias signals to a common electrode of the projected capacitance touch panel. The capacitive touch controller may be configured to send and/or receive signals to and/or from sensing electrodes of the projected capacitance touch panel via the respective signal separation stages, to calculate capacitance values in dependence upon the sent and/or received signals, and to provide an output comprising capacitance values.

An apparatus may be provided which includes the device and a pressure signal processing module having a plurality of inputs and an output. The device may further include a number of third terminals, each third terminal connected to a corresponding amplification stage output. Each input may be connected to a corresponding third terminal of the device. The pressure signal processing module may be configured to receive the amplified signals, to calculate pressure values in dependence upon the amplified signals, and to provide an output comprising pressure values.

The pressure signal processing module may be housed in a separate package to the device and be connected to the device.

An apparatus may be provided which includes the device, the pressure signal processing module and a capacitive touch controller having a plurality of electrode monitoring ports. Each electrode monitoring port may be connected to a corresponding second input/output terminal of the device. The capacitive touch controller may be configured to send and/or receive signals to and/or from sensing electrodes of the projected capacitance touch panel via the respective signal separation stages, to calculate capacitance values in dependence upon the sent and/or received signals, and to provide an output comprising capacitance values.

An apparatus may be provided which includes the device, the pressure signal processing module and a capacitive touch controller having a plurality of electrode monitoring ports and a common output port. Each electrode monitoring port may be connected to a corresponding second input/output terminal of the device, and the common output port may be for providing bias signals to a common electrode of the projected capacitance touch panel. The capacitive touch controller may be configured to send and/or receive signals to and/or from sensing electrodes of the projected capacitance touch panel via the respective signal separation stages, to calculate capacitance values in dependence upon the sent and/or received signals, and to provide an output comprising capacitance values.

The capacitive touch controller may be housed in a separate package to the device and may be connected to the device.

The capacitive touch controller may be configured to determine a self-capacitance of a first or second electrode of the touch panel. The capacitive touch controller may be configured to determine a mutual capacitance between a pairing of first and second electrodes of the touch panel. The capacitive touch controller may measure the self-capacitance of each first or second electrode sequentially. The capacitive touch controller may measure the self-capacitance of first and/or second electrodes simultaneously. The capacitive touch controller may measure the mutual capacitance for each pairing of first and second electrodes sequentially. Each electrode monitoring port connects to one second input/output terminal. The capacitive touch controller may be a controller for a capacitive touch panel which does not include a layer of piezoelectric material.

A touch panel system may be provided which includes the device or the apparatus including the device, and which further includes a touch panel. The touch panel may include a layer structure including one or more layers, each layer extending perpendicularly to a thickness direction, the one or more layers including a layer of piezoelectric material, the layer structure having first and second opposite faces, and the layer(s) arranged between the first and second faces such that the thickness direction of each layer is perpendicular to the first and second faces. The touch panel may also include a plurality of first electrodes disposed on the first face, each first electrode connected to a corresponding first input/output terminal. The touch panel may also include at least one second electrode disposed on the second face.

In dependence upon the device or the apparatus including a common terminal, the at least one second electrode may take the form of a common electrode which is connected to the common terminal. In dependence on the device or the apparatus including a capacitive touch controller, the common output port of the capacitive touch controller may be connected to the at least one second electrode in the form of a common electrode.

The layer structure may include one or more dielectric layers stacked between the layer of piezoelectric material and the first face of the layer structure. The layer structure may include one or more dielectric layers stacked between the second face of the layer structure and the layer of piezoelectric material.

The common electrode may be a region of conductive material arranged in a grid.

Thus, the common electrode may be located between the sensing electrodes and a user without screening electrostatic interactions.

The plurality of first electrodes may be a plurality of conductive pads disposed on the first face in an array.

The touch panel may further include a plurality of second electrodes and each of the second electrodes may be connected to a corresponding first input/output terminal. Each of the first input/output terminals may be connected to one first electrode or one second electrode.

The touch panel may further include a plurality of third electrodes disposed overlying the first face of the layer structure and arranged such that the layer structure is between the plurality of second sensing electrodes and the common electrode. Each of the third electrodes may be connected to a corresponding first input/output terminal. Each of the first input/output terminals may be connected to one first electrode or one third electrode.

Each first electrode may extend in a first direction and the plurality of first electrodes may be arrayed spaced apart perpendicular to the first direction. Each second electrode may extend in a second direction and the plurality of second electrodes may be arrayed spaced apart perpendicular to the second direction. The first and second directions may be different.

Each first electrode may extend in a first direction and the plurality of first electrodes may be arrayed spaced apart perpendicular to the first direction. Each third electrode may extend in a second direction and the plurality of third electrodes may be arrayed spaced apart perpendicular to the second direction. The first and second directions may be different.

The touch panel may further include a second layer structure including one or more dielectric layers, each dielectric layer extending perpendicularly to a thickness direction, the second layer structure having third and fourth opposite faces, the dielectric layers arranged between the third and fourth faces such that the thickness direction of each dielectric layer is perpendicular to the third and fourth faces. The plurality of third electrodes may be disposed on the third face of the second layer structure and the fourth face of the second layer structure may contact the plurality of first electrodes.

The plurality of third electrodes may be disposed on the first face of the layer structure. Each first electrode may be a continuous conductive region and each third electrode may be a plurality of conductive regions electrically connected to one another by jumpers, each jumper spanning a conductive region forming a portion of one of the first electrodes.

The touch panel may include at least one second electrode in the form of a plurality of separated common electrodes. The touch panel may further include a plurality of third electrodes disposed on the second face of the layer structure. Each third electrode may be connected to a respective first input/output terminal. Each first electrode may extend in a first direction and the plurality of first electrodes may be arrayed spaced apart perpendicular to the first direction. Each separated common electrode may extend in a second direction and the plurality of separated common electrodes may be arrayed spaced apart perpendicular to the second direction. Each third electrode may extend in a second direction and the plurality of third electrodes may be arrayed spaced apart perpendicular to the second direction. The third electrodes may be arranged parallel to and interleaved with the plurality of separated common electrodes. The first and second directions may be different. The first and second directions may be substantially perpendicular. The first and second directions may meet at an angle of more than 30 and less than 90 degrees.

The capacitive touch controller may be configured to determine a self-capacitance of a first, second or third electrode of the touch panel. The capacitive touch controller may be configured to determine a mutual capacitance between a pairing of first, second and/or third electrodes of the touch panel. The capacitive touch controller may measure the self-capacitance of the first, second and/or third electrodes sequentially. The capacitive touch controller may measure the self-capacitance of the first, second and/or third sensing electrodes simultaneously. The capacitive touch controller may measure the mutual capacitance for each pairing of first, second and/or third electrodes sequentially. Each electrode monitoring port connects to one second input/output terminal. The capacitive touch controller may be a controller which is suitable for use in a capacitive touch panel which does not include a layer of piezoelectric material.

According to a second aspect of the invention there is provided a portable electronic device including the device, apparatus or touch panel system.

According to a third aspect of the invention there is provided a portable electronic device including the device, apparatus or touch panel system and a signal processor arranged to receive the pressure values and/or capacitance values. The signal processor may be configured to employ correlated double sampling methods so as to improve signal to noise ratio of the pressure values and/or capacitance values.

The signal processor may be configured to treat the pressure values and/or the capacitance values as image data. Each pressure value and/or each capacitance value may correspond to one pixel value of the image data. The signal processor may be configured to treat the pressure values as a pressure value image and to treat the capacitance values as a capacitance value image.

The touch panel may overlie a display screen. The touch panel may be integrated into a display screen.

According to a fourth aspect of the invention there is provided a method including filtering, using a first frequency-dependent filter, signals to and/or from a capacitive touch controller and a first electrode of a projected capacitance touch panel which comprises a layer of piezoelectric material disposed between a plurality of first electrodes and at least one second electrode. The method also includes filtering, using a second frequency-dependent filter, signals between the sensing electrode of the projected capacitance touch panel and an amplification stage input to produce a filtered signal. The method also includes amplifying the filtered signal to produce an amplified signal. Each first frequency-dependent filter is configured to pass signals from the capacitive touch controller and each second frequency-dependent filter is configured to attenuate signals from the capacitive touch controller.

BRIEF DESCRIPTION OF THE DRAWINGS

Certain embodiments of the present invention will now be described, by way of example, with reference to the accompanying drawings in which.

DETAILED DESCRIPTION

Figure 1:
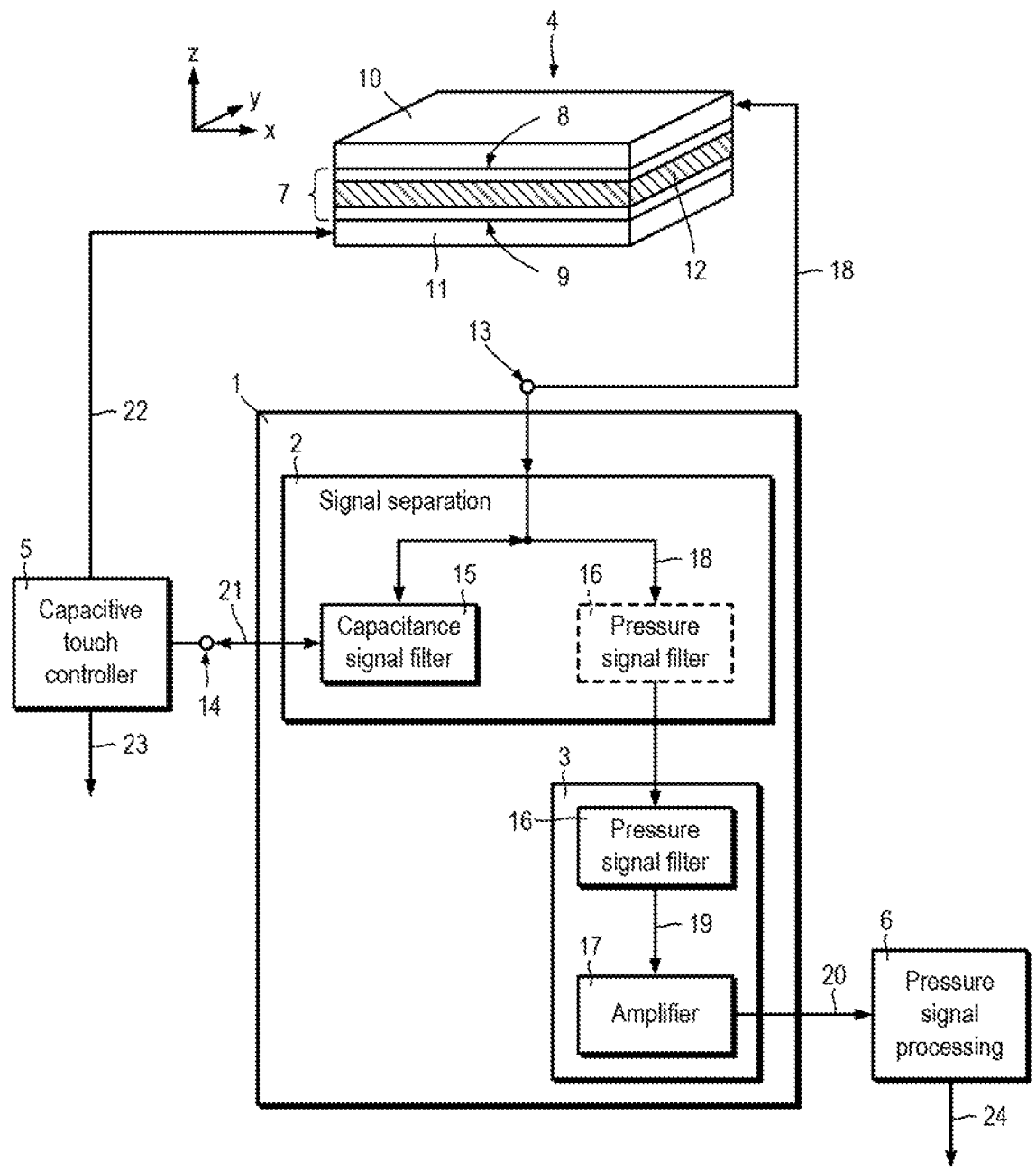
FIG. 1 illustrates a device and touch sensor for combined capacitance and pressure measurements.

In the following description, like parts are denoted by like reference numerals.

Combined Self-Capacitance and Pressure Measurements:

FIG. 1 illustrates a device 1 and touch sensor 4 for combined capacitance and pressure measurements.

Referring to FIG. 1, a device 1 for combined capacitance and pressure measurements includes a signal separation stage 2 and an amplification stage 3. The device 1 is connected to a touch sensor 4, a capacitive touch controller 5 and a pressure signal processing module 6. The device 1 allows capacitance and pressure measurements to be made from the touch sensor 4 concurrently using one pair of electrodes.

The first touch sensor 4 includes a layer structure 7 having a first face 8 and a second, opposite, face 9, a first sensing electrode 10 and a common electrode u. The layer structure 7 includes one or more layers, including at least a layer of piezoelectric material 12. Each layer included in the layer structure 7 is generally planar and extends in first and second directions x, y which are perpendicular to a thickness direction z. The one or more layers of the layer structure 7 are arranged between the first and second faces 8, 9 such that the thickness direction z of each layer of the layer structure 7 is perpendicular to the first and second faces 8, 9. The first sensing electrode 10 is disposed on the first face 8 of the layer structure 7, and the common electrode 11 is disposed on the second face 9 of the layer structure 7.

Preferably, the piezoelectric material is a piezoelectric polymer, for example a suitable fluoropolymer such as polyvinylidene fluoride (PVDF). However, the piezoelectric material may alternatively be a layer of a piezoelectric ceramic such as lead zirconate titanate (PZT). Preferably, the first and second electrodes are indium tin oxide (ITO) or indium zinc oxide (IZO). However, the first and second electrodes 10, 11 may be conductive polymers such as polyaniline, polythiphene, polypyrrole or poly(3,4-ethylenedioxythiophene) polystyrene sulfonate (PEDOT/PSS). The first and second electrodes 10, 11 may be metal films such as aluminium, copper, silver or other metals suitable for deposition and patterning as a thin film. The first and second electrodes may be formed from a metal mesh; nanowires, optionally silver nanowires; graphene; and carbon nanotubes.

The device 1 includes a first input/output terminal 13 for connecting to the touch sensor 4 and a second input/output terminal 14 for connecting to the capacitive touch controller 5. The signal separation stage 2 includes a first, capacitance signal filter 15. The signal separation stage 2 connects the first input/output terminal 13 to the second input/output terminal 14 via the capacitance signal filter 15. The capacitance signal filter 15 filters signals between the second input/output terminal 14 and the first input/output terminal 13. The signal separation stage 2 also connects the amplification stage 3 to the first input/output terminal 13. Signals between the first input/output terminal 13 and the amplification stage 3 are not filtered by the capacitance signal filter 15.

Figure 10:
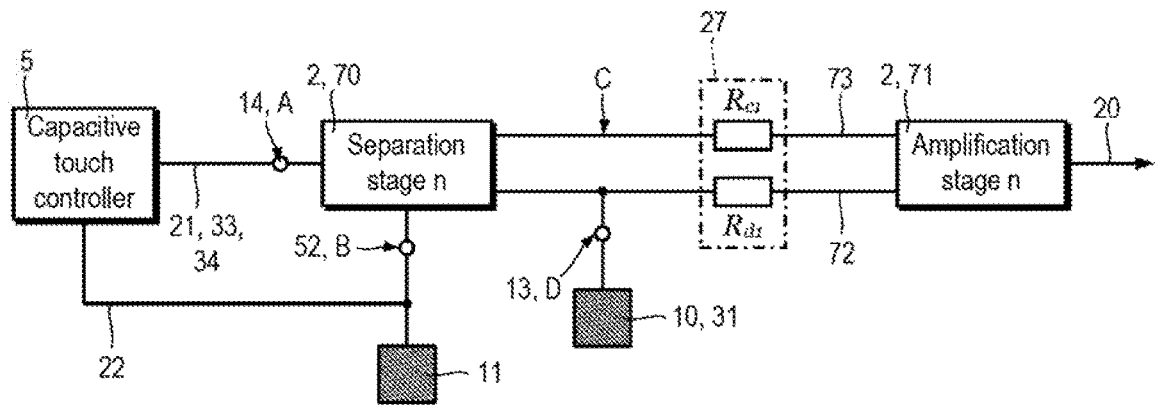
FIG. 10 illustrates an implementation of the first touch panel system employing differential amplification.

The amplification stage 3 is connected to the first input/output terminal 13 through the signal separation stage 2. The amplification stage 3 includes a second, pressure signal filter 16 and an amplifier 17. The pressure signal filter 16 receives a touch sensor signal 18 and filters it to produce a pressure signal 19. The amplifier 17 receives the pressure signal 19 and amplifies it to output an amplified signal 20. The amplifier 17 may provide additional frequency dependent filtering. When the amplifier 17 is a differential amplifier, the amplifier 17 may receive an additional input (FIG. 10). The amplifier 17 is preferably a virtual earth amplifier such as, for example, a charge amplifier.

Alternatively, the pressure signal filter 16 may be integrated as a single unit with the amplifier 17 such as, for example, an operational amplifier and a resistance-capacitance feedback network. In this case, the amplifier 17 receives the touch sensor signal 18 directly and the amplified signal 20 is based on the touch sensor signal 18.

Alternatively, the pressure signal filter 16 may be included in the signal separation stage 2 instead of the amplification stage 3. When the pressure signal filter 16 is included in the signal separation stage 2, the pressure signal filter 16 filters signals between the first input/output terminal 13 and the amplification stage 3. Signals between the first and second input/output terminals 13,14 are not filtered by the pressure signal filter 16.

The pressure signal filter 16 and/or the amplifier 17 may have a low-frequency cut-off configured to reject a pyroelectric response of the layer of piezoelectric material 12. The low frequency cut-off may take a value between 1 Hz and 7 Hz. The pressure signal filter 16 and/or the amplifier 17 may include a notch filter configured to reject a mains power distribution frequency, for example, 50 Hz or 60 Hz. Alternatively, the mains power notch filter may be a separate filter stage (not shown) disposed before or after the pressure signal filter 16 and/or the amplifier 17.

The capacitive touch controller 5 is, in general, a conventional capacitive touch controller capable of measuring the self-capacitance of an electrode. For example, the capacitive touch controller may be a commercially available touch controller such as an Atmel® MXT224 touch controller. The capacitive touch controller 5 outputs a capacitance measurement signal 21 which drives the sensing electrode 10 through the signal separation stage 2. The capacitance signal filter 15 has a frequency response which passes the capacitance measurement signals 21 produced by the capacitive touch controller 5 without attenuation, or with minimal attenuation. The capacitance touch controller 5 is also connected to the common electrode if of the touch sensor 4 to output a bias signal 22 to the common electrode 11. During measurements of the self-capacitance of the sensing electrode 10, the bias signal 22 is the substantially the same as the capacitance measurement signal 21, in order to remove the influence of mutual capacitance between the sensing electrode 10 and the common electrode 11. The self-capacitance of the sensing electrode 10, i.e. the capacitance between the sensing electrode 10 and earth, is determined by the capacitive touch controller 5 using an internal charge amplifier (not shown). In this way, the capacitance touch controller 5 calculates a capacitance value in dependence upon capacitance measurement signals 21, and provides an output comprising capacitance values 23.

The specific method for measuring the self-capacitance of the sensing electrode 10, and the specific waveforms of the capacitance measurement signals 21 and bias signal 22, depend on the particular capacitive touch controller 5 used. However, any capacitive touch controller 5 may be used with the device 1 by adjusting the bandwidth of the capacitance signal filter 15 to pass the capacitance measurement signals 21 produced by a particular capacitive touch controller 5.

Figure 24:
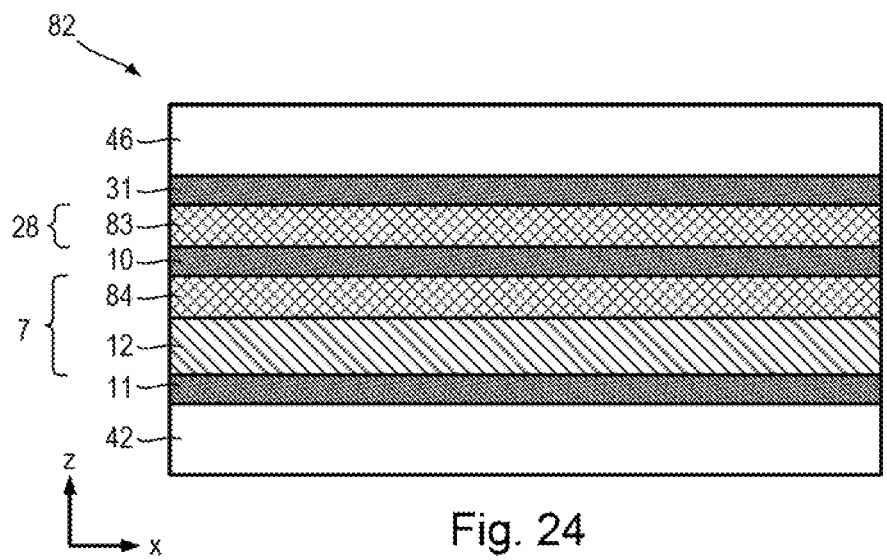
FIGS. 24 to 31 show simplified cross-sections of first to eighth display stack-ups for providing touch panels for combined capacitance and pressure measurements.

The touch sensor signal 18 may differ from the capacitance measurement signal 21 in response to a user interaction with the touch sensor 4, or with a layer of material overlying the touch sensor 4, which produces a piezoelectric response from the layer of piezoelectric material 12. A user interaction refers to a user touching or pressing a touch sensor 4, a touch panel 36 (FIG. 5) or a layer of material overlying either, e.g. cover lens 46 (FIG. 24). A user interaction may involve a user's digit or a stylus (whether conductive or not). A touch interaction may include a user's digit or conductive stylus being proximate to a touch sensor 4 or touch panel 36 (FIG. 5) without direct physical contact or without applying significant pressure. A press interaction involves a user pressing the touch sensor 4 or touch panel 16 (FIG. 5) with sufficient force to cause straining of the layer of piezoelectric material 12 and generation of a piezoelectric response.

The layer of piezoelectric material 12 is poled such that the layer of piezoelectric material 12 becomes polarised with a polarisation $\underline{P}$ in response to straining caused by a user interaction which applies sufficient force. The polarisation $\underline{P}$ of the layer of piezoelectric material results in a corresponding charge $Q_{piezo}(t)$ being developed between the common electrode 11 and the sensing electrode(s) 10. The layer of piezoelectric material 12 should be arranged and poled such that the charge $Q_{piezo}(t)$ developed between the common electrode 11 and the sensing electrode(s) 10 is sufficient to produce a detectable response at a location proximate to the user interaction. The straining which produces the polarisation $\underline{P}$ may result from a compression or a tension. The straining which produces the polarisation $\underline{P}$ may be an in-plane stretching of the piezoelectric material layer 12. Intimate contact between the layer of piezoelectric material 12 and the electrodes 10, 11 is not required. Generally, a greater straining of the layer of piezoelectric material 12 (caused by a more forceful user interaction) will result in a greater polarisation $\underline{P}$, and a correspondingly larger magnitude of the charge difference $\Delta Q_{piezo}$ produced between the electrodes 10, 11.

In this way, the touch sensor signal 18 is approximately a superposition of a capacitance measurement signal 21 and a piezoelectric response which is the current associated with the charge $Q_{piezo}(t)$. The piezoelectric response $I_{piezo}(t)$ may be integrated and amplified to determine the charge produced in response to a user interaction. Because the capacitance signal filter 15 is adapted to pass the capacitance measurement signals 21, the capacitive touch controller 5 may communicate with a the touch sensor 4 and measure the self-capacitance of the sensing electrode 10 with no, or minimal, interference from the device 1 and the piezoelectric response of the layer of piezoelectric material 12. In this way, a capacitive touch controller 5 suitable for use with a conventional projected capacitance touch panel can be used with the device 1. The pressure signal filter 16 is adapted to reject, or at least attenuate, capacitance measurement signals 21. In this way, the amplified signal 20 may be based on the piezoelectric response $I_{piezo}(t)$ produced by straining the layer of piezoelectric material 12.

The separation of capacitance measurements signals 21 and pressure signals 19 is possible because the frequency bandwidth of the piezoelectric response $I_{piezo}(t)$ to user interactions typically spans a frequency bandwidth which may be significantly below the frequency bandwidth of capacitance measurements signals 21. The capacitance measurement signals 21 may typically be selected to have a basic frequency, $f_d$, of greater than or equal to 10 kHz, greater than or equal to 20 kHz, greater than or equal to 50 kHz, greater than or equal to 100 kHz or up to 500 kHz. The capacitance measurement signals 21 may include multiple frequency components, such as for example, step, square or triangular waveforms, or may be provided with a narrow frequency band or even a single frequency signal, such as a sinusoidal signal.

By contrast, the piezoelectric response $I_{piezo}(t)$ typically includes a broadband frequency content spanning a range from several Hz to several hundreds or thousands of Hz. For example, the piezoelectric response $I_{piezo}(t)$ may include frequency components between 1 Hz and 1 kHz. This is mainly because the piezoelectric response $I_{piezo}(t)$ arises from user interactions by a human user, and partly because a time constant of the piezoelectric response $I_{piezo}(t)$ may be influenced as explained hereinafter.

In this way, the capacitance signal filter is may be adapted to pass the capacitance measurement signals 21 having relatively higher frequency content, and the pressure signal filter 16 may be adapted so that the pressure signal 19 is substantially based on the relatively lower frequency piezoelectric response $I_{piezo}(t)$. For example, the capacitance signal filter 15 may be a high-pass filter and the pressure signal filter 16 may be a low-pass filter. In this way, the amplitude of the amplified signal 20 is dependent upon a pressure applied to the layer of piezoelectric, material 12 by a user interaction. The pressure signal processing module 6 receives the amplified signals 20, determines pressure values 24 and provides the pressure values 24 as an output. The pressure signal processing module 6 may determine the pressure value 24 corresponding to a given amplified signal 20 using, for example, a pre-calibrated empirical relationship, or by interpolation of a pre-calibrated look-up table.

The pressure signal processing module 6 does not need to be a separate module, and may alternatively be integrated into the device 1.

Figure 3:
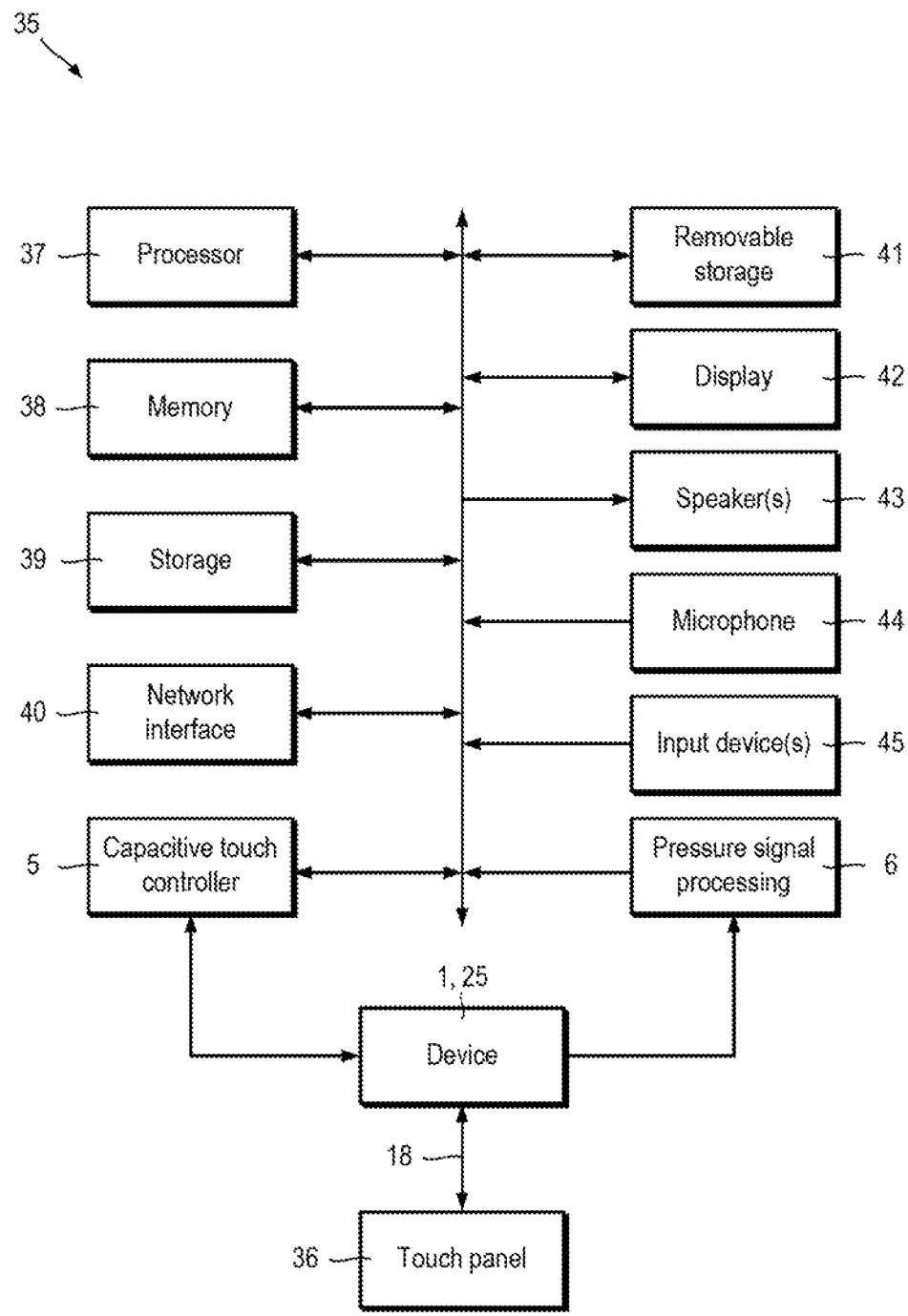
FIG. 3 shows a schematic block diagram of an electronic device incorporating a device and a touch panel for combined capacitance and pressure measurements.

In practice, the pressure signal 19 will not be identical to the piezoelectric response $I_{piezo}(t)$, and may include attenuated high frequency components of the capacitance measurement signals 21. Such attenuated high frequency components maybe compensated/removed by subsequent digital signal processing of the amplified signal 20, for example in the pressure signal processing module 6 or in the processor 37 (FIG. 3) of an electronic device 35 (FIG. 3).

In this way, pressure and capacitance measurements may be performed using the touch sensor 4 without the need for separate pressure and capacitance electrodes. A single signal 18 including both pressure and capacitance information is extracted from the touch sensor 4. Additionally, the device 1 allows the separation and amplification of pressure and capacitance signals 19, 21 in a way which may be readily integrated with existing projected capacitance touch panels and capacitive touch controllers 5.

The capacitance and pressure signal filters 15, 16 need not be high-pass and low-pass filters respectively. Instead, the capacitance signal filter 15 may be a band-pass filter having a pass-band covering the capacitance measurement signals 21 and the pressure signal filter 16 may be a low-pass filter with a cut-off frequency below the base frequency $f_d$. Alternatively, the capacitance signal filter 15 may be a band-pass filter having a pass-hand covering the capacitance measurement signals 21 and the pressure signal filter 16 maybe a band-stop filter having a stop-hand covering the capacitance measurement signals 21. Band-pass or band-stop filters may be notch filters when the capacitance measurement signals 21 have narrow frequency band widths, or comb filters if the power of the capacitance measurement signals at is predominantly at the base frequency $f_d$ and harmonics thereof. The filters 15, 16 may be passive or active, for example, the capacitance signal filter 15 may simply be a capacitance, or the pressure signal filter 16 may be provided by a resistance capacitance feedback network of an operational amplifier providing the amplifier 17. Alternatively, more complex passive filters may be used, for example Butterworth filters, Chebyshev filters, Gaussian filters or Bessel filters.

The layer structure 7 of the touch sensor 4 may include only the layer of piezoelectric material 12, such that the first and second opposite faces 8, 9 are faces of the piezoelectric material layer 12. Alternatively, the layer structure 7 may include one or more dielectric layers which are stacked between the layer of piezoelectric material 12 and the first face 8 of the layer structure 7. The layer structure 7 may include one or more dielectric layers stacked between the second face 9 of the layer structure 7 and the layer of piezoelectric material 12. Preferably, one or more dielectric layer(s) include layers of a polymer dielectric material such as polyethylene terephthalate (PET), or layers of pressure sensitive adhesive (PSA) material. However, one or more dielectric layer(s) may include layers of a ceramic insulating material such as aluminium oxide.

In FIG. 1, the first and second faces 8, 9 and the layers of the layer structure 7 are shown extending along orthogonal axes labelled x and y, and the thickness direction of each layer of the layer structure 7 is aligned with an axis labelled z which is orthogonal to the x and y axes. However, the first, second and thickness directions x, y, z need not form a right handed orthogonal set as shown. For example, the first and second directions x, y may intersect at an angle of 30 degrees or 45 degrees or any other angle greater than 0 degrees and less than 90 degrees.

Figure 5:
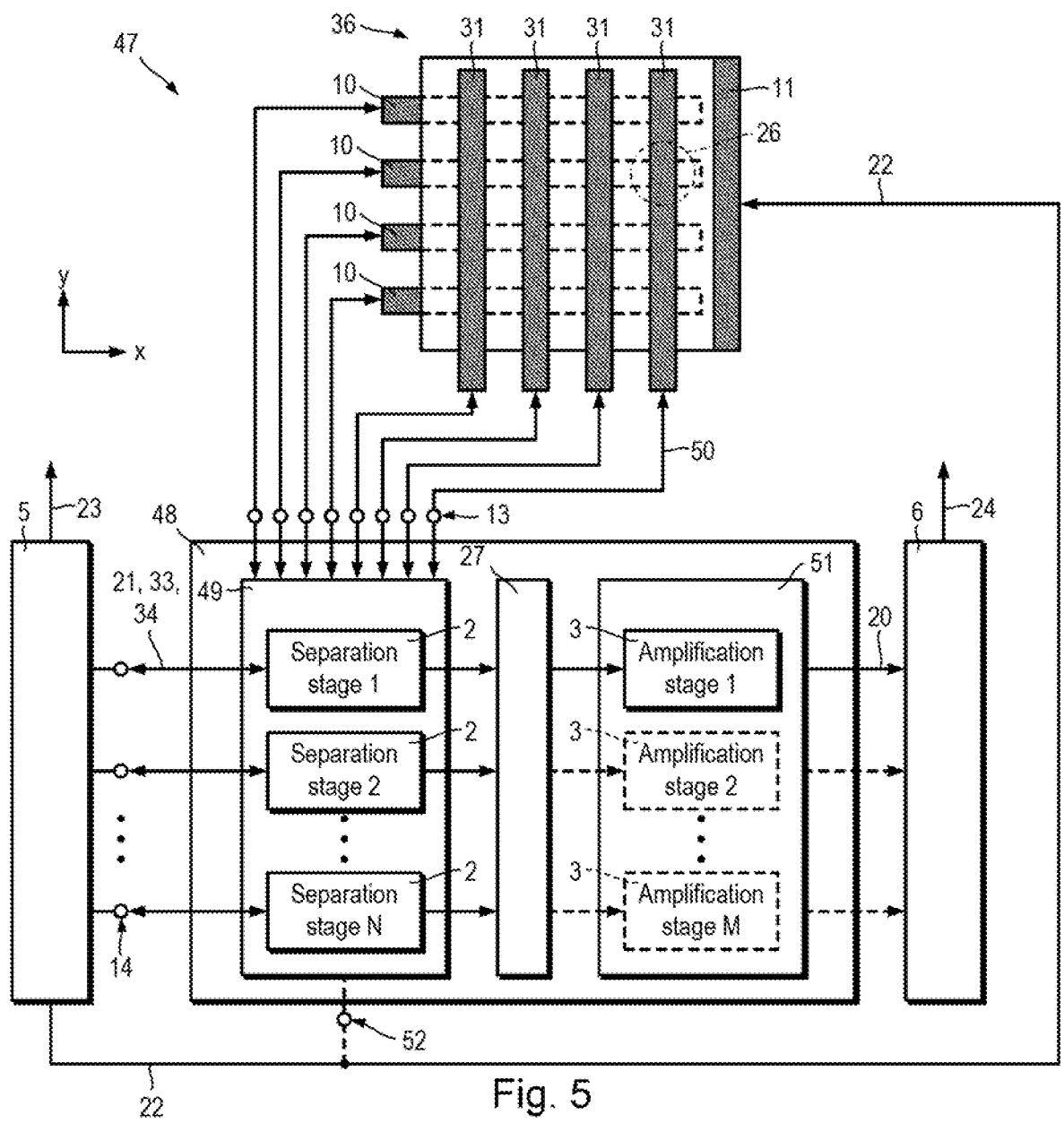
FIG. 5 illustrates a first touch panel system for combined capacitance and pressure measurements.

The device 1 may be adapted to work with touch panels 36 (FIG. 5) which include multiple touch sensor 4 elements, for example, by providing a signal separation stage 2 and first and second input/output terminals 13, 14 corresponding to the sensing electrode 10 of each touch sensor 4 included in the touch panel (FIG. 5). When adapted for multiple touch sensors 4, the device 1 includes a signal separation stage 2 for each touch sensor 4 (i.e. for each sensing electrode 10) so that the capacitive touch controllers may measure the capacitance of each sensing electrode 10 separately. The device may include a separate amplification stage 3 corresponding to each signal separation stage 2.

Figure 20:
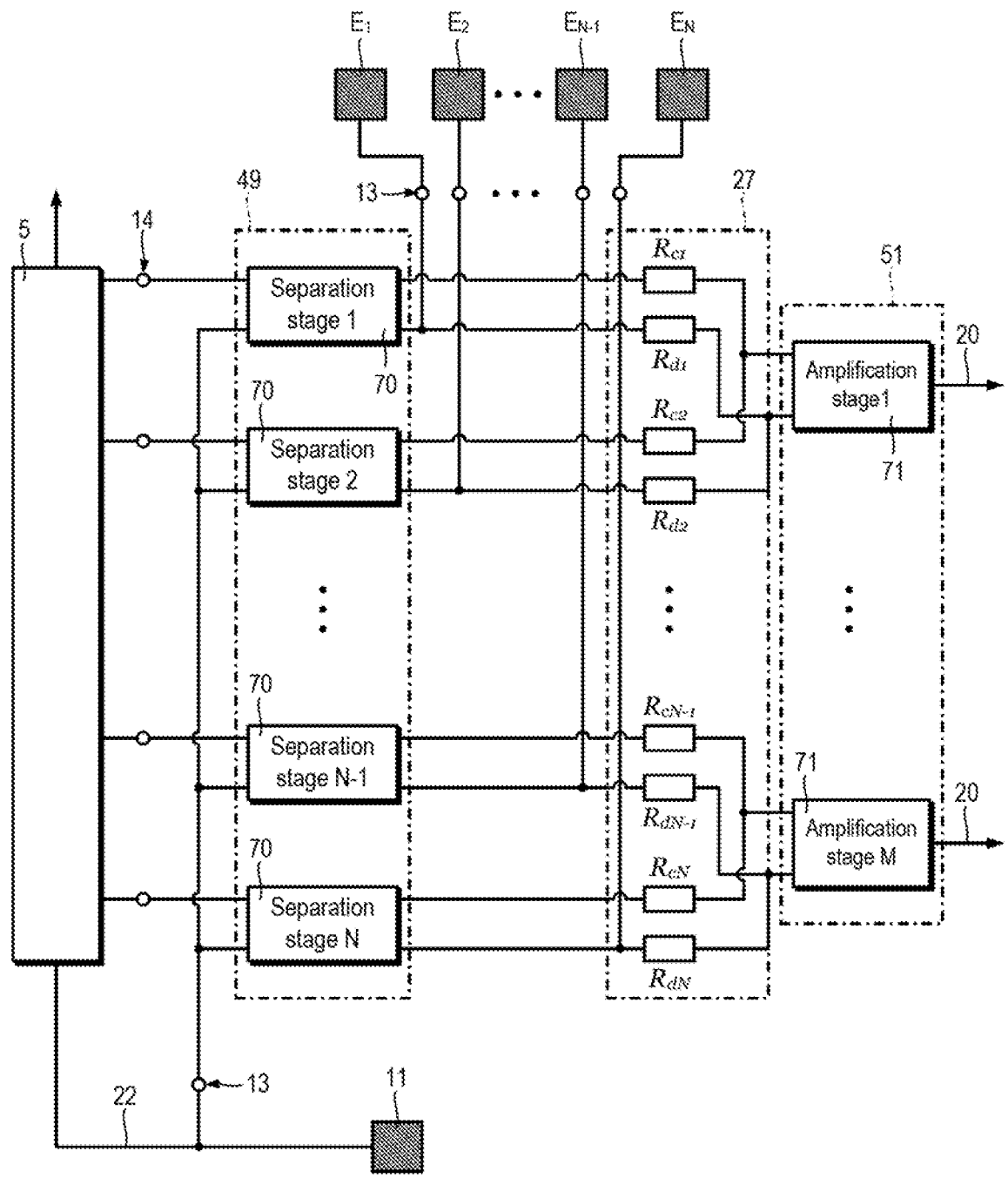
FIG. 20 illustrates implementing the first touch panel system shown in FIG. 5 using an unequal numbers of separation and amplification stages.

Alternatively, the number of amplification stages 3 may be less than the number of signal separation stages 2. For example, for a touch panel in which the resolution of pressure values 24 is not required to be equal to the resolution of capacitance values 23, each amplification stage 3 may be connected to two or more signal separation stages 2 (FIG. 20). Although two or more signal separation stages 2 may simply be connected to an amplification stage 3 in parallel, multiple signal separation stages 2 are preferably connected to a single amplification stage 3 through a resistance network 27 (FIGS. 2, 5, 22) to minimise cross talk between the capacitance measurement signals 21 driving the corresponding two or more sensing electrodes 10.

Figure 2:
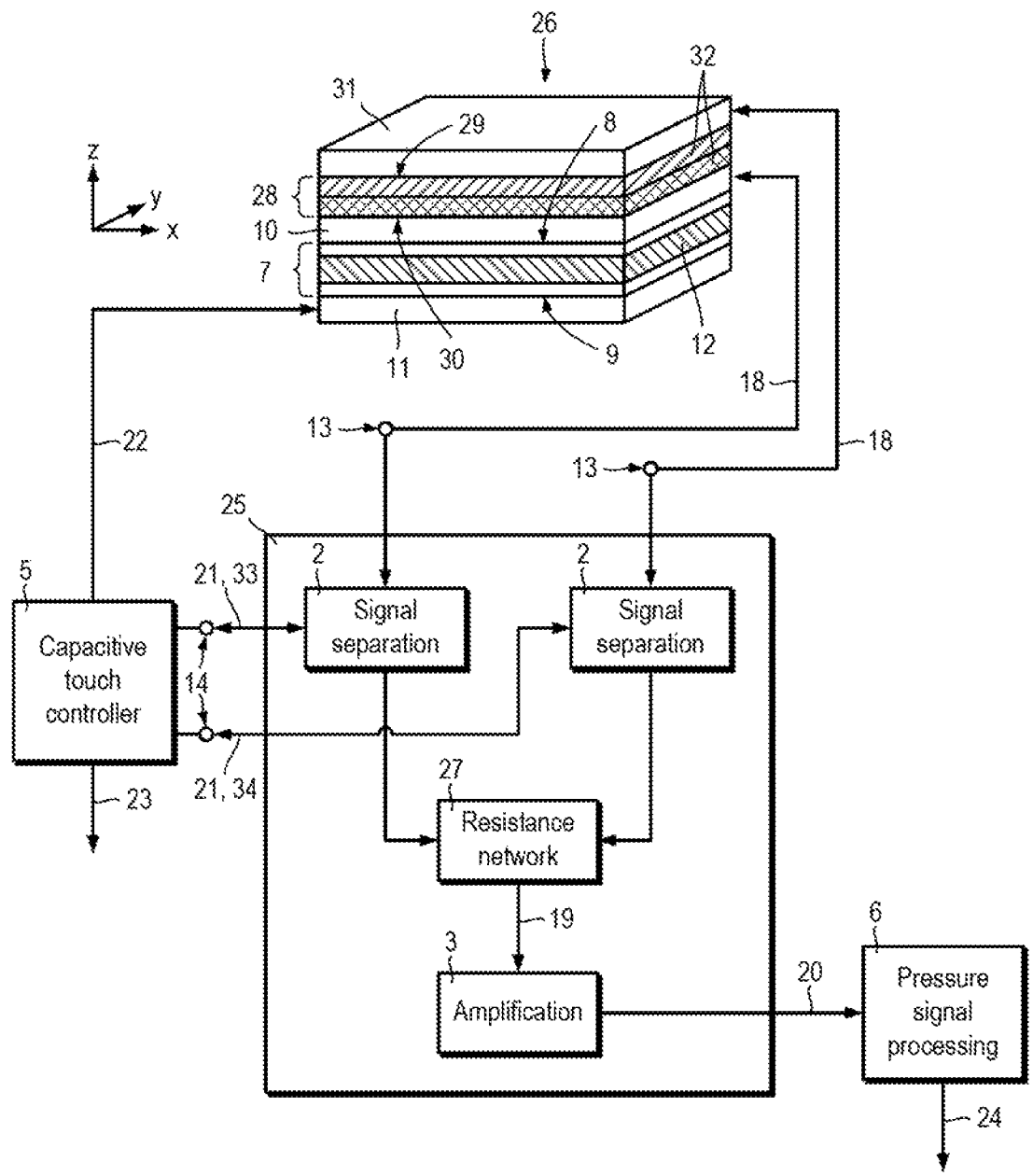
FIG. 2 illustrates a second device and a second touch sensor for combined capacitance and pressure measurements.

Combined Self-Capacitance, Mutual Capacitance and Pressure Measurements:

FIG. 2 illustrates a second device 25 and a second touch sensor 26 for combined capacitance and pressure measurements. Referring also to FIG. 2, a second device 25 for combined pressure and capacitance measurements is the same as the device 1, except that the second device includes two signal separation stages 2, two first input/output terminals 13 and two second input/output terminals 14 and a resistance network 27. A single amplification stage 3 is connected to both signal separation circuits 2 through the resistance network 27.

The second touch sensor 26 is similar to the first touch sensor 4, except that the second touch sensor 26 also includes a second layer structure 28 having a third face 29 and a fourth, opposite, face 30, and a second sensing electrode 31. The second layer structure 28 includes one or more dielectric layers 32. Each dielectric layer 32 is generally planar and extends in first and second directions x, y which are perpendicular to a thickness direction z. The one or more dielectric layers 32 of the second layer structure 28 are arranged between the third and fourth faces 29, 30 such that the thickness direction z of each dielectric layer 32 of the second layer structure 28 is perpendicular to the third and fourth faces 29, 30. The second sensing electrode 31 is disposed on the third face 29 of the second layer structure 28, and the fourth face 30 of the second layer structure 28 contacts the first sensing electrode 10.

Preferably, the dielectric layer(s) 32 include, layers of a polymer dielectric material such as PET or layers of PSA materials. However, the dielectric layer(s) 32 may include layers of a ceramic insulating material such as aluminium oxide. Preferably, the second sensing electrode 31 is made of indium tin oxide (ITO) or indium zinc oxide (IZO). However, the second sensing elect rode 31 may be made of a conductive polymer such as polyaniline, polythiphene, polypyrrole or poly(3,4-ethylenedioxythiophene) polystyrene sulfonate (PEDOT/PSS). The second sensing electrode 31 may be a metal mesh film such as aluminium, copper, silver or other metals suitable for deposition and patterning as a thin film.

The first and second sensing electrodes 10, 31 are coupled to corresponding ports of the capacitive touch controller 5 through the respective signal separation stages 2. Provided that the first sensing electrode 10 does not completely screen electromagnetic interactions between the piezoelectric material layer 12 and the second sensing electrode 31, a piezoelectric response $I_{piezo}(t)$ may be produced between the common electrode 11 and the second sensing electrode 31.

In this way, the capacitive touch controller 5 may separately measure the self-capacitance of the first and second sensing electrodes 10, 31 and at the same time measure pressure values 24 from the second touch sensor 26. Additionally, the capacitive touch controller 5 can also measure the mutual capacitance between the first and second sensing electrodes 10, 31 by, for example, driving the first sensing electrode 10 using a capacitance measurement signal 21 in the form of a capacitance drive signal 33 and receiving a corresponding capacitance measurement signal 21 in the form of a capacitance sense signal 34 induced in the second sensing electrode 31, or vice versa. The capacitance signal filters 15 of each signal separation stages 2 are adapted to pass the capacitance measurement signals 21 in the form of the capacitance drive/sense signals 33, 34. Measurement of the mutual capacitance between the first and second sensing electrodes 10, 31 maybe more robust against electromagnetic interference compared to self-capacitance measurement. For mutual capacitance measurements, the bias signal 22 may lie a fixed DC voltage or ground (o V).

The first and second sensing electrodes 10, 31 need not share a single amplification stage 3, and the respective signal separation stages 2 may each be connected to a corresponding amplification stage 3 in the same way as the first device 1.

The second device 25 may be readily adapted for use with a touch panel including multiple second touch sensors 26. Instead of using coextensive first and second sensing electrodes 10, 31, in a touch panel 36 (FIG. 5) the first sensing electrodes 10 may be extensive in a first direction x and the second sensing electrodes 31 may be extensive in a second direction y, so as to form a grid in which each intersection provides a second touch sensor 26. In such a configuration, the separation stages 2 corresponding to two or more first sensing electrodes 10 may be connected to a single amplification stage 3, or the separation stages 2 corresponding to two or more second sensing electrodes 31 may be connected to a single amplification stage 3. However, in general the separation stages 2 corresponding to a mixture of first and second sensing electrodes 10, 31 should not be connected to the same amplification stage 3, except in the case that every first and second sensing electrode 10, 31 is connected to a single amplification stage 3 to provide a single, global pressure value 24 for the touch panel 36 (FIG. 5).

Figure 7:
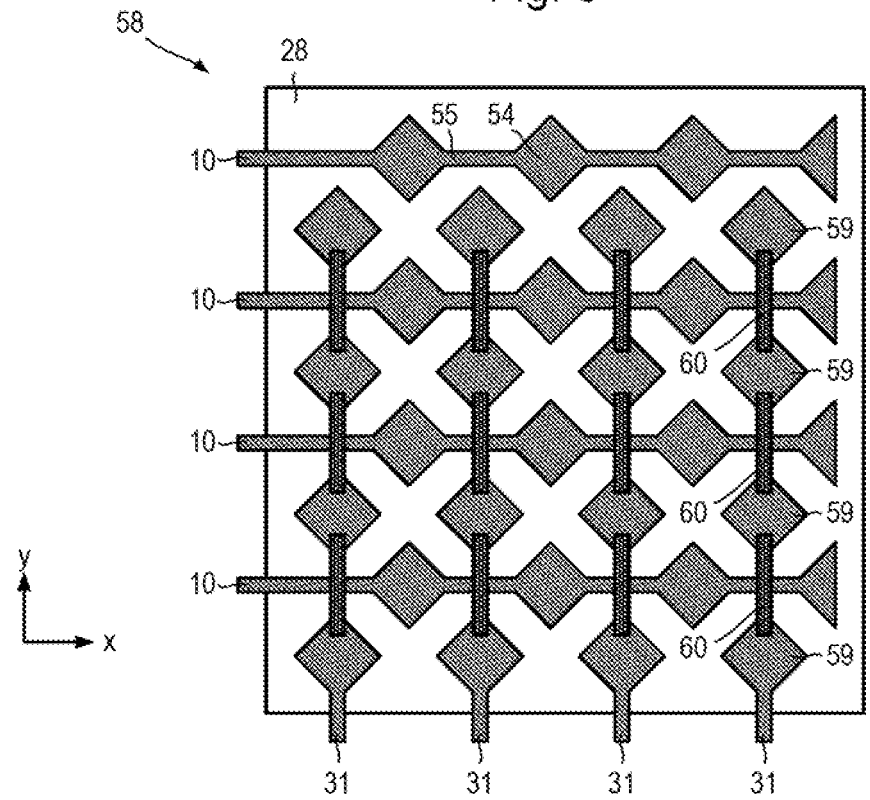
FIG. 7 shows a layout of sensing electrodes for a third touch panel for combined capacitance and pressure measurements.

The second layer structure 28 may include a single dielectric layer 32, such that the third and fourth opposite faces 29, 30 are faces of a single dielectric layer 32. Alternatively, a second layer structure 28 need not be used, and the second sensing electrode 31 could be disposed on the first face 8 along with the first sensing electrode 10 (FIG. 7). In FIG. 2, the third and fourth faces 29, 30 and the dielectric layers 32 of the second layer structure 28 are shown extending along orthogonal axes labelled x and y, and the thickness direction of each dielectric layer 32 of the second layer structure 28 is aligned with an axis labelled z which is orthogonal to the x and y axes. However, the first, second and thickness directions x, y, z need not form aright handed orthogonal set as shown.

The pressure signal processing module 6 does not need to be a separate module, and may instead be integrated into the device 25.

Electronic Device:

FIG. 3 shows a schematic block diagram of an electronic device incorporating a device 1, 25 for combined pressure and capacitance measurements and a touch panel 36 including one or more touch sensors 4, 26. Referring also to FIG. 3, an electronic device 35 may include a touch panel 36, a capacitive touch controller, a pressure signal processing module 6 and a device 1, 25 for combined capacitive and pressure measurements.

The electronic device 35 may be a relatively immobile electronic device such as, for example a desktop computer, an automated teller machine (ATM), a vending machine, a point of sale device, or a public access information terminal. Alternatively, an electronic device 35 may be a portable electronic device such as a laptop, notebook or tablet computer, a mobile phone, a smart phone, a personal data, assistant, a music playing device, or, a vehicle such as a car. The preceding lists are not exhaustive. The electronic device 35 includes a touch panel 36 including one or more touch sensors 4, 26. The touch panel 36 is coupled to a device for combined pressure and capacitance measurements such as, for example, the first or second device 1, 25.

The electronic device 35 may include a processor 37 for executing programs and processing information. The electronic device 35 may include a memory 38 such as a volatile random access memory for temporarily storing programs and information, and for storage 39 such as non-volatile random access memory (NVRAM) or a hard disc drive (HDD) for long term storage of programs and information. The electronic device 35 may include a network interface 40 for transmitting and/or receiving information from wired or wireless communication networks (not shown). The electronic device 35 may include a removable storage interface 41 which can interface with removable storage media (not shown) to read and/or write programs and information. The electronic device 35 may include output means such as, for example, a display 42 and/or speaker(s) 43. The display 42 may be any type of display such as, for example, a liquid crystal display (LCD), a light emitting diode display (LED), an organic LED display, an electrophoretic display or other type of electronic-ink display.

The capacitive touch controller 5 provides input information to the electronic device 35 which corresponds to user interactions with the touch panel 36. For example, input information may be the locations of one or more user interactions. Alternatively, the capacitive touch controller 5 may provide capacitance values 23 to the processor 37 and the processor 37 may determine locations of one or more user interactions with the touch panel. Similarly, the pressure signal processing module A provides input information to the electronic device 35 in the form of pressure values 24. When multiple amplification stages 3 are included in the device 1, 25, the pressure signal processing module 6 may also provide locations of user interactions. The pressure signal processing module 6 need not be a separate module, and may instead be integrated into the device 1, 25. Alternatively, the device 1, 25 may provide amplified signals 20 directly to the processor 37 and the processor 37 may determine the pressure values 24.

The electronic device may include other input means such as a microphone 44, and/or other input devices 45 such as, for example, a keyboard, keypad, mouse or trackball. When the touch panel 36 includes a plurality of touch sensors 4, 26, the capacitive touch controller 5 and/or the pressure signal processing module 6 may provide positional information in the form of coordinates and/or pressures corresponding to one or more simultaneous user interactions with the touch panel 36.

The touch panel 36 may be provided overlying the display 42. Alternatively, the touch sensors 4, 26 of the touch panel 36 may be integrated into or embedded within the display 42. When the touch panel 36 is used overlying or integrated into the display 42, the layer structure(s) 7, 28 and electrodes 10, 11, 31 may be transparent or substantially transparent. For example, the layer structure(s) 7, 28 and electrodes 10, 21, 31 may transmit 50% or more, preferably at least 75%, or preferably at least 90% of light in visible wavelengths. For example, the piezoelectric material may be a suitable fluoropolymer such as PVDF, dielectric layers included in the layers structures 7, 28 may be PET or an optically clear PSA, and the electrodes 10, 11, 31 may be ITO. Alternatively, the electrodes 10, 11, 31, and any connections thereto, may be opaque and sufficiently thin in a direction perpendicular to the thickness direction z that they are not immediately noticeable to the human eye, for example, electrodes 10, 11, 31, and any connections thereto, may be less than 100 micrometers (1×10−4 m) wide, less than 10 micrometers (1×10−5 m) wide, or thinner.

Figure 4:
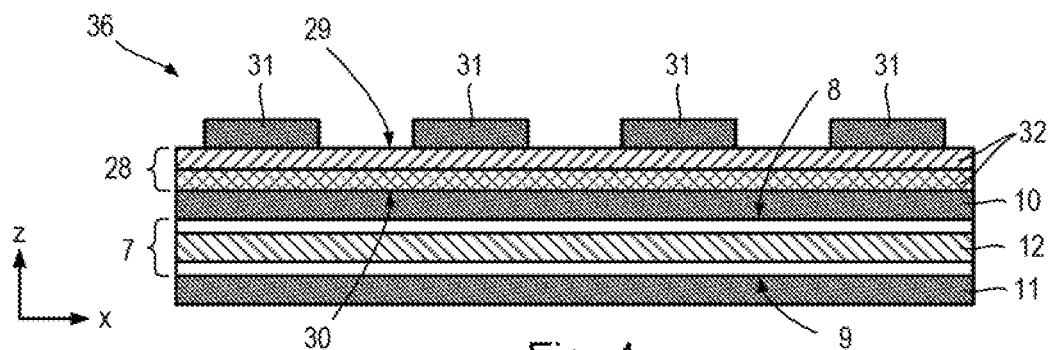
FIG. 4 shows a simplified cross-section of a first touch panel for combined capacitance and pressure measurements.

First Touch Panel System:

FIG. 4 shows a simplified cross-section of a first touch panel 36. Referring to FIGS. 1, 2 and 4, the first touch panel 36 includes layer structures 7, 28 which are generally the same as the layer structures 7, 28 of the second touch sensor 26, except that in the first touch panel 36, the layer structure 7 is shared by multiple first sensing electrodes 10 disposed on the first face 8 of the layer structure 7, and the second layer structure 28 is shared by multiple second sensing electrodes 31 disposed on the third face 29 of the second layer structure 28. The first sensing electrodes 10 each extend 111 the first direction x and the first sensing electrodes 10 are disused in an array evenly spaced in the second direction y. The second sensing electrodes 31 each extend in the second direction y and the second sensing electrodes 31 are disposed in an array evenly spaced in the first direction x. The common electrode 11 is disposed on the second face 9 and is extensive such that the common electrode 11 at least partially underlies each of the first and second sensing electrodes 10, 31. The common electrode 11 may be substantially coextensive with the second face 9 of the layer structure 7. In this way, each intersection of a first sensing electrode 10 with a second sensing electrode 31 effectively provides a second touch sensor 26.

The first touch panel 36 may be bonded overlying the display 42 (FIG. 3) of an electronic, device 35 (FIG. 3), and a cover lens 46 (FIG. 24) may be bonded overlying the first touch panel 36 to protect the outermost electrodes, e.g. the second sensing electrodes 32.

FIG. 5 illustrates a first touch panel system 47 for combined capacitance and pressure measurements.

Referring also to FIG. 5, the first touch panel system 47 includes the first touch panel 36, a third device 48 for combined capacitance and pressure measurements, a capacitive touch controller 5 and a pressure signal processing module 6.

The third device 48 is the same as the first and second devices 1, 25, except that the third device 48 includes a signal separation stage 2 and first and second input/output terminals 13, 14 corresponding to each sensing electrode 10, 31. The third device 48 includes a signal separation section 49 including a number, N, of signal separation stages 2, where N is the total number of first and second sensing electrodes 10, 31. The third device 48 includes N first input/output terminals 13, and each first input/output terminal 13 is connected to a corresponding first or second sensing electrode 10, 31 via a conductive trace 50. The third device 48 includes N second input/output terminals 14, and each second input/output terminal is connected to a corresponding terminal/port of the capacitive touch controller. In this way, each separation stage 2 connects one sensing electrode 10, 31 to a corresponding terminal of the capacitive touch controller 5 through a capacitance signal filter 15 (FIG. 1).

The third device 48 includes an amplification section 51 including a second number M of amplification stages 3. The number M of amplification stages 3 is between one and the number N of sensing electrodes 10, 31 and signal separation stages 2, i.e. 1≤M≤N. The amplification stages 3 are connected to the separation stages 2 through a resistance network 27. The resistance network 27 maps the M amplification stages 3 to the N signal separation stages such that an input of each amplification stage 3 is connected to one or more sensing electrodes 10, 31 through the respective signal separation stage(s) 2.

The number M of amplification stages 3 may be equal to the number of sensing electrodes 10, 31, so that each amplification stage 3 is connected to one corresponding signal separation stage 2. When the number M of amplification stages 3 is less than the number N of sensing electrodes 10, 31, the numbers M, N are preferably related by an integer multiple, for example, N=2×M, N=3×M, N=4×M, and each of the amplification stages 3 is preferably connected to the same number of signal separation stages 2 as each other amplification stage 3. Amplification stages 3 are preferably connected, through the resistance network 27 and respective signal separation stage 2, to sensing electrodes 10, 31 of the same type, for example to one or more first sensing electrodes 10, or to one or more second sensing electrodes 31. An exception is when the amplification section 51 includes a single amplification stage 3. In this case, the resistance network 27 connects the amplification stage 3 input to all of the N signal separation stages 2, to allow measurement of a single, global, pressure value from the touch panel 36.

Each amplification stage 3 outputs a corresponding amplified signal 20 to the pressure signal processing module 6, which determines and outputs pressure values 24 to the processor 37 (FIG. 3) of the electronic device 35 (FIG. 3). Alternatively, the pressure signal processing module 6 may be integrated into the third device 48 as a single unit.

The capacitive touch controller 5 is connected to each sensing electrode 10, 31 separately. In this way, the capacitive touch controller 5 may individually address any sensing electrode 10, 31 or any pair including one first sensing electrode 10 and one second sensing electrode 31. A common output of the capacitive touch controller 5 is connected to the common electrode 11 to supply bias signals 22 to the common electrode 11. The connections via the signal separation stages 2 allow capacitance measure me at signals 21, including capacitance drive/sense signals 33, 34, to pass through the capacitance signal filters 15 with no attenuation or minimal attenuation. The self-capacitances of the sensing electrodes 10, 31, or the mutual capacitances between any pair of a first sensing electrode 10 and a second sensing electrode 31, maybe measured by the capacitive, touch controller 5 according to known methods, and the capacitance values 23 and/or locations of user interactions provided to the processor 37 (FIG. 3) of the electronic device 35 (FIG. 3).

In this way, the first touch panel system 47 allows pressure measurements to be made from a touch panel, without disturbance or with minimal disturbance, to concurrent projected capacitance measurements made using the same set of sensing electrodes 10, 31. In this way, the number of sensing electrodes used is not increased compared to a purely projected capacitance touch panel, and there is no need to apply additional electrodes and conducting traces 50, which could increase cross-talk and/or manufacturing complexity.

Optionally, when the amplifier 17 of the amplification stages 3 is a differential amplifier, each signal separation stage 2 may be additionally connected to a common terminal 52 to provide a reference path for the differential measurement (FIGS. 10 to 13). The common terminal 52 is connected to the common electrode 11 of the first touch panel 36 and the common output of the capacitive touch panel 5, to receive bias signal 22.

The device 1, 25, 48 is preferably provided as a discrete module, for example as a packaged integrated circuit with the first and second input/output, terminals 13, 14 and the common terminal 52 as physical terminals for attachment to a printed circuit board or similar substrate. The pressure signal processing module 6 may be provided as a separate element, or may be integrated into a single package with the device 48. Alternatively, the pressure signal processing module 6 may be provided by digital signal processing in the processor 37 (FIG. 3) of the electronic device 35 (FIG. 3). The device 1, 25, 48 does not need to be provided as a packaged integrated circuit, and may alternatively be provided as a small form-factor printed circuit board which may be rigid or flexible.

An advantage of the touch panel 36 and the device 1, 25, 48 is to allow combined capacitance and pressure measurements to be made using conventional capacitive touch controllers 5 with minimal adaptation of existing hardware and software. However, the first touch panel system 47 does not need to be implemented using a separate capacitive touch controller 5. Instead, the device 1, 25, 48, the capacitive touch controller 5 and the pressure signal processing module 6 may be combined into a single module for connection to the first touch panel 36, providing a single package solution for combined pressure and capacitance measurements.

A separate capacitive touch controller 5 connected to the device 1, 25, 48 preferably has a number of capacitance measurement outputs equal to the number N of sensing electrodes 10, 31. However, capacitive touch controllers 5 having fewer than N capacitance measurement outputs can be used with the device 1, 25, 48 by connecting such a capacitive touch controller 5 to the N second input/output terminals 14 through a multiplexer.

Although the first and second sensing electrodes 10, 31 have been shown as being substantially rectangular, other shapes can be used.

Figure 6:
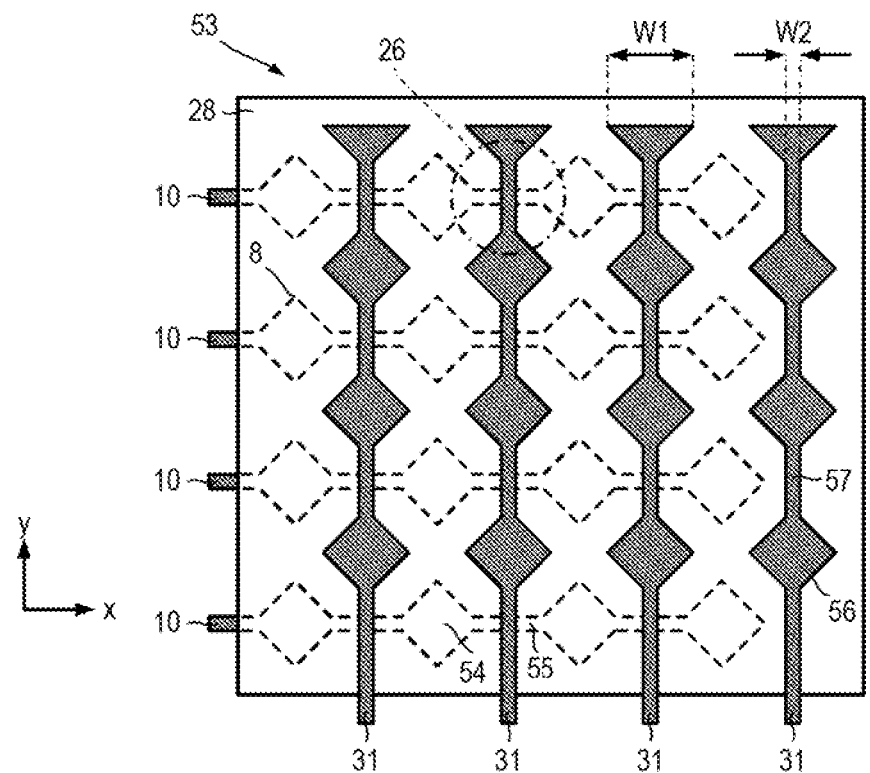
FIG. 6 shows a layout of sensing electrodes for a second touch panel for combined capacitance and pressure measurements.

Second Touch Panel:

FIG. 6 shows a layout of first and second sensing electrodes 1, 31 for a second touch panel 53. Referring also to FIG. 6, the second touch panel 53 is the same as the first touch panel 36, except that the first and second sensing electrodes 10, 31 are differently shaped. Instead of being rectangular, each first sensing electrode 10 may include several pad segments 54 evenly spaced in the first direction x and connected to one another in the first direction x by relatively narrow bridging segments 55. Similarly each second sensing electrode 31 may include several pad segments 56 evenly spaced in the second direction y and connected to one another in the second direction y by relatively narrow bridging segments 57. The pad segments 54, 56 of the first and second sensing electrodes 10, 31 are in the form of diamonds having a first width W1, and the bridging segments 55, 57 of the first and second sensing electrodes 10, 31 have a second width W2.

The first and second sensing electrodes 10, 31 are arranged such that the bridging segments 57 of the second sensing electrodes 31 overlie the bridging segments 55 of the first sensing electrodes 10. Alternatively, the first sensing electrodes 10 and the second sensing electrodes 31 may be arranged such that the pad segments 56 of the second sensing electrodes 31 overlie the pad segments 54 of the first sensing electrodes 10. The pad segments 54, 56 need not be diamond shaped, and may instead be circular. The pad segments 54, 54 maybe a regular polygon such as a triangle, square, pentagon or hexagon. The pad segments 54, 56 may be I shaped or Z shaped. The pad segments 54, 56 may have different areas.

Third Touch Panel:

FIG. 7 shows a layout of first and second sensing electrodes 1, 31 for a third touch panel 58. Referring also FIG. 7, the third touch panel 58 is substantially the same as the first and second touch panels 36, 53, except that the third touch panel 58 does not include the second layer structure 28 and the second sensing electrodes 31 are disposed substantially on the first face 8 of the layer structure 7 along with the first sensing electrodes 10.

Each first sensing electrode 10 is a continuous conductive region extending in the first direction x in the same way as the second touch panel 53. For example, each first sensing electrode 10 may include several pad segments 54 evenly spaced in the first direction x and connected to one another in the first direction x by relatively narrow bridging segments 55. Each second sensing electrode 31 may comprise several pad segments 59 evenly spaced in the second direction y in the same way as the second touch panel 53. However, unlike the second touch panel 53, the pad segments 59 of the third touch panel 58 are disposed on the first face 8 of the layer structure 7 and are interspersed with, and separated by, the first sensing electrodes 10. The pad segments 59 corresponding to each second sensing electrode 31 are connected together by conductive jumpers 60. The jumpers 60 each span a part of a first sensing electrode 10 and the jumpers 60 are insulated from the first sensing electrodes 10 by a thin layer of dielectric material (not shown) which may be localised to the area around the intersection of the juniper 60 and the first sensing electrode 10.

Alternatively, a thin dielectric layer (not shown) may overlie the first face 8 of the layer structure 7, the first sensing electrodes 10 and the pad segments 59 of the second sensing electrodes 31. Conductive traces (not shown) extending in the second direction y may lie disposed over the single thin dielectric layer (not shown), each conductive trace (not shown) overlying the pad segments 59 making up one second sensing electrode 31. The overlying conductive traces (not shown) may connect the pad segments 59 making up each second sensing electrode 31 using vias (not shown) formed through the single thin dielectric layer (not shown).

Patterned Common Electrode for Touch Panels:

The value of a mutual capacitance between a first or second sensing electrode 10, 31 and the common electrode 11 may be reduced if required by using a patterned common electrode 11. Using a patterned common electrode 11 may allow the common electrode 11 to be disposed between a users digit/stylus and the sensing electrodes 10, 31 without screening electrostatic interactions between the user's digit/stylus and the sensing electrodes 10, 31. A configuration with the common electrode 11 towards the outside may be advantageous for touch panels Integrally embedded in a display 42 (FIGS. 32 to 39).

Figure 8:
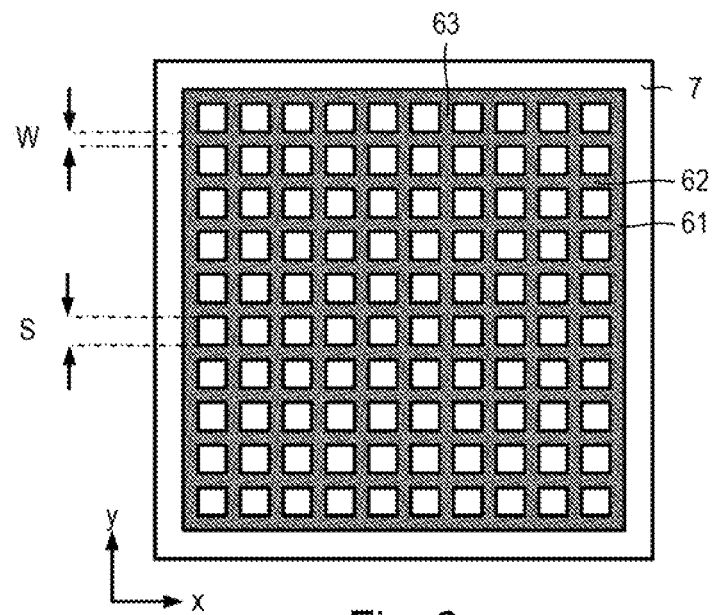
FIG. 8 shows a layout for a patterned common electrode for use in a touch panel for combined capacitance and pressure measurements.

FIG. 8 shows a layout for a patterned common electrode 61. Referring to FIG. 8, a patterned common electrode 61 may take the form of a Cartesian grid. The conductive region of the patterned common electrode 61 includes struts 62 extending in the first direction x and having a width W in the second direction y, and struts 63 extending in the second direction y and having a width W in the first direction x. The struts 61 extending in the first direction x are evenly spaced in the second direction y with a spacing S, and the struts 63 extending in the second direction y are evenly spaced in the first direction x with the same spacing S. The struts 62, 63 are joined where they intersect such that the patterned common electrode 61 is formed of a single region of conductive material.

Referring also to FIGS. 1, 2, 4 and 5, the patterned common electrode 61 may be arranged to reduce the magnitude of the mutual capacitances between the sensing electrodes 10, 31 and the common electrode 11.

A patterned common electrode 61 need not be arranged as a Cartesian grid, and any other continuously connected two-dimensional pattern may be used. A patterned common electrode 61 need not use a repeating lattice pattern, and irregular or quasi-periodic arrangements may be used instead.

Interpolation of Pressure Values:

The separation between adjacent electrodes in a projected capacitance touch panel, sometimes referred to as the pitch, may be relatively coarse, for example, 1 to 5 mm or larger than 5 mm. If the positions of user interactions were determined only at the resolution of the pitch, projected capacitance touch panels would not be able to provide accurate positions of user interactions or smoothly follow a path traced by a user. To provide more accurate locations, projected capacitance touch panels typically employ interpolation methods, for example, using an electrode having a peak signal and also the adjacent electrode signals, in order to infer a touch location using linear interpolation, quadratic interpolation or interpolation using higher order polynomials or other suitable functions. Such interpolation is possible because a user interaction may alter the capacitances of several adjacent sensing electrodes simultaneously.

Figure 9:
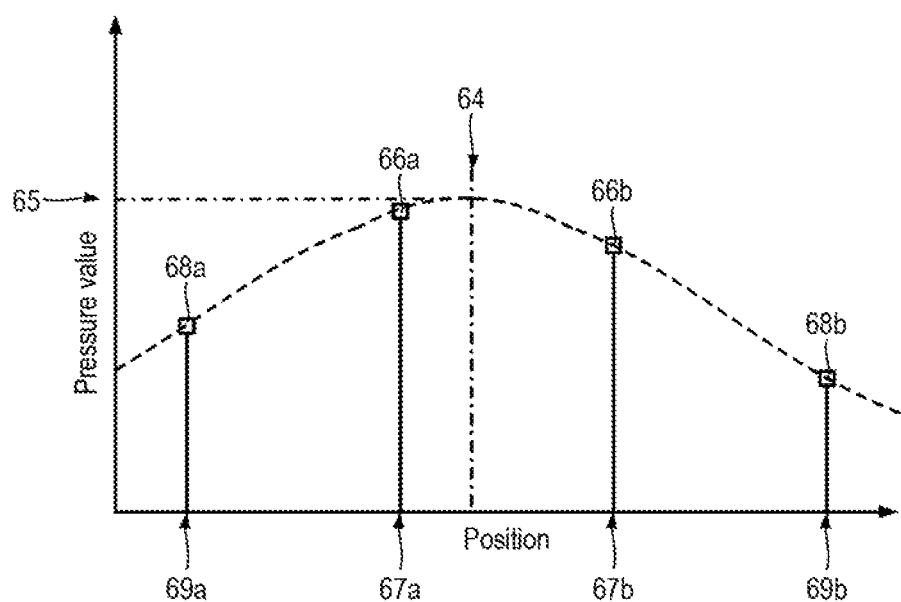
FIG. 9 illustrates using interpolation to infer a location and/or a pressure of a user interaction for a touch panel.

FIG. 9 illustrates using interpolation methods to infer a location and/or a pressure of a user interaction.

Referring to FIGS. 5 and 9, when a user presses on a cover lens 46 (FIG. 24) overlying a touch panel 36, 53, 58, the layer of piezoelectric material 12 underlying the cover lens 46 will experience strain across a relatively broadened area. For example, this could be because the rigidity of the cover lens 46 spreads a compressive load over a larger area and/or because the layer of piezoelectric material experiences in-plane stretching. For example, a user interaction at a precise location 64 applying a peak pressure 65 may result in pressure values 66a and 66b being determined for sensing electrodes 10, 31 at locations 67a, 67b which bracket the precise location 64. A user interaction at a precise location 64 may also result in pressure values 68a and 68b being determined for sensing electrodes 10, 31 at locations 69a, 69b which are further from the precise location 64 and adjacent to the pair of bracketing locations 67a, 67b.

The pressure values 66a, 66b are slightly different from the peak pressure 65 which would be measured at the precise location 64 of the user interaction, and will vary depending on the relative position of the precise location 64 with respect to the bracketing locations 67a, 67b. As such, threshold pressure values for responding to user interactions should be spaced widely enough to avoid mis-registrations due to the relative position of the precise location 64 with respect to the bracketing locations 67a, 67b. This may lead to a coarse resolution of pressure values for pressure touch applications. The potential resolution of pressure touch applications may be improved by using interpolation to estimate the peak pressure 65.

The pressure signal processing module 6, or the processor 37 (FIG. 3) may calculate an estimate of the precise location 64 and/or the pressure value 65 using the largest value 66a and the corresponding location 67a in combination with the two next nearest values 66b, 68a and the corresponding locations 67b, 69a. Alternatively, the pressure signal processing module 6 or the processor 37 (FIG. 3) may calculate an estimate of the precise location 64 and/or die peak pressure 65 using the pair of bracketing values 66a, 66b and locations 67a, 67b. The pressure signal processing module 6 or the processor 37 (FIG. 3) may calculate an estimate of the precise location 64 and/or the peak pressure 65 using the pair of bracketing values 66a, 66b and locations 67a, 67b and the adjacent values and locations 68a, 68b, 69a, 69b. The pressure signal processing module 6 or the processor 37 (FIG. 3) may calculate an estimate of die precise location 64 and/or the peak pressure 65 using linear interpolation, quadratic interpolation or interpolation using higher order polynomials or other suitable functions.

In this way the resolution for pressure touch applications may be improved by applying interpolation methods to the pressure values 24 to estimate a peak pressure 65 of a user interaction. Interpolation may also be used to improve estimates of user interaction locations determined using pressure values 24.

The capacitive touch controller 5 may also use interpolation of capacitance values 23 to improve the accuracy of determining the locations of one or more user interactions.

Example Using Differential Amplification Stages:

FIG. 10 illustrates an example from the third device 48 employing differential amplification. Referring to FIGS. 1, 2, 4, 5 and 10, in one example implementation, the third device 48 may include an equal number N of differential separation stages 70 and differential amplification stages 71. Each differential amplification stage 71 is an example of implementing the amplification stage 3, and each differential amplification stage 71 includes a pressure signal filter 16 and an amplifier 17 in the form of a differential amplifier.

Figure 11:
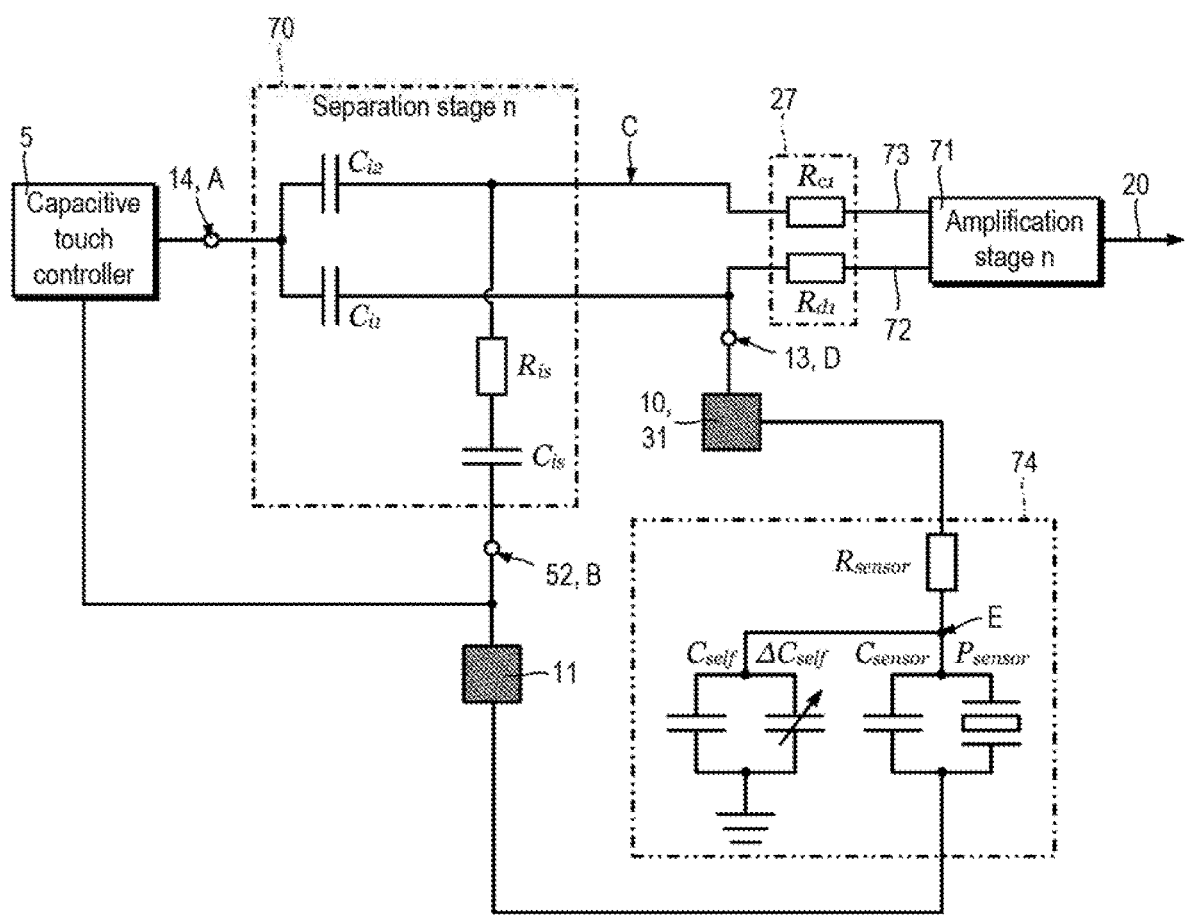
FIG. 11 illustrates an example of a circuit for implementing a differential signal separation stage shown in FIG. 10.

Each differential separation stage 70 is an example of implementing the separation stage 2. The $n^{th}$ differential separation stage 70 connects the $n^{th}$ first input/output terminal 13 to the $n^{th}$ second input/output terminal 14 through a first capacitance signal filter 15 (FIG. 1). The $n^{th}$ first input/output terminal 13 is connected to the $n^{th}$ sensing electrode 10, 31 of a touch panel 36, 53, 58 at a circuit node denoted D. The $n^{th}$ second input/output terminal 14 is connected to the capacitive touch controller 5 at a circuit node denoted A. The capacitive touch controller 5 exchanges capacitance measurement signals 21 with the $n^{th}$ sensing electrode 10, 31 through the $n^{th}$ second input/output terminal 14, for example capacitance drive/sense signals 33, 34. However, the differential separation stage 70 also connects the common terminal 52 to the $n^{th}$ second input/output terminal 14 through a second capacitance signal filter 15 and a reference resistance-capacitance $R_{is}$-$C_{is}$ (FIG. 11). The second capacitance signal filter 15 and the reference resistance-capacitance $R_{is}$-$C_{is}$ (FIG. 11) are connected in series at a circuit node denoted C. The common terminal 52 is connected to the common electrode 11 of the touch panel 36, 53, 58 and to the common output of the capacitive touch controller 5 at a circuit node denoted B. The common output of the capacitive touch controller 5 provides bias signals 22 to the common electrode 11 and common terminal 52.

A first input 72 to the differential amplification stage 71 is coupled to the circuit node D by a first resistance $R_{d1}$ and a second input 73 to the differential amplification stage 71 is coupled to the circuit node C by a second resistance $R_{c1}$. The first and second resistances $R_{d1}$, $R_{c1}$ form a portion of the resistance network 27. The differential amplification stage 71 produces the amplified signal 20 based on the difference between the first and second inputs 72, 73, i.e. based on the voltage difference between the circuit nodes C and D.

FIG. 11 illustrates an example of a circuit of implementing the differential separation stage 70. Referring also to FIG. 11, the first and second capacitance filters 15 may fake the form of first and second capacitances, $C_{i1}$, $C_{i2}$. The filter capacitances $C_{i1}$, $C_{i2}$ may serve as capacitance signal filters 15, namely high-pass filters, by decoupling the capacitive touch controller from DC and low frequency components. The capacitances $C_{i1}$, $C_{i2}$ are preferably the same. The differential separation stage 70 includes a reference resistance $R_{is}$ and a reference capacitance $C_{is}$ connected in series between the circuit node C and the common terminal 52. In this way, the reference resistance $R_{is}$ and reference capacitance $C_{is}$ provide a reference path between the capacitive touch controller 5 and the common electrode 11.

The path between the $n^{th}$ sensing electrode 10, 31 and the common electrode 11 may be approximately represented by an equivalent circuit 74 for the $n^{th}$ touch sensor 4, 26 of the touch panel 36, 53, 58. The equivalent circuit 74 includes a sensor resistance $R_{sensor}$ representing the resistance of the touch sensor 4, 26. The equivalent circuit 74 includes a sensor capacitance $C_{sensor}$, which is a mutual capacitance between the $n^{th}$ sensing electrode 10, 31 and the common electrode 11, and a piezoelectric element $P_{sensor}$ representing the piezoelectric material layer 12. The sensor capacitance $C_{sensor}$ and the piezoelectric element $P_{sensor}$ are connected in a parallel with one another, and are connected in series with the sensor resistance $R_{sensor}$ at a circuit node denoted E. The equivalent circuit 74 also includes a self-capacitance $C_{self}$ of the sensing electrode 10, 31 and a variable self-capacitance $\Delta C_{self}$ which changes in response to a user interaction with the $n^{th}$ touch sensor 4, 26. The self-capacitance $C_{self}$ and variable self-capacitance $\Delta C_{self}$ are connected in parallel between the circuit node E and ground.

The value of the reference resistance $R_{is}$ is chosen to approximate the sensor resistance $R_{sensor}$. The value of the reference capacitance $C_{is}$ is chosen to approximate the overall capacitance of the network formed by the sensor capacitance $C_{sensor}$, the piezoelectric element $P_{sensor}$ and the self-capacitance $C_{self}$. In this way, the first and second inputs 72, 73 to the $n^{th}$ differential amplifier 71 are sensitive to a difference between the reference path formed by the reference resistance and capacitance $R_{is}$, $C_{is}$, and the $n^{th}$ touch sensor 4, 26, in response to capacitance measurement signals 21 from the capacitive touch controller 5.

Figure 12:
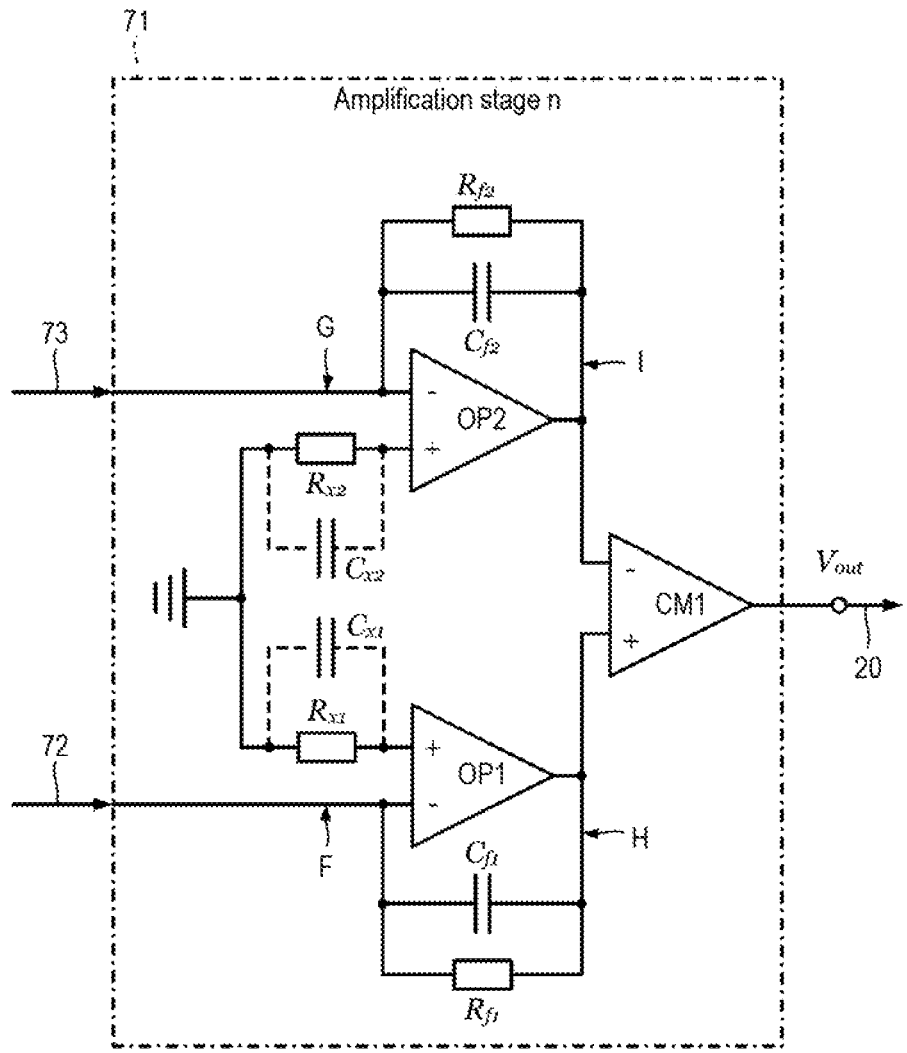
FIG. 12 illustrates an example of a circuit for implementing a differential amplification stage shown in FIG. 10.
Figure 13A:
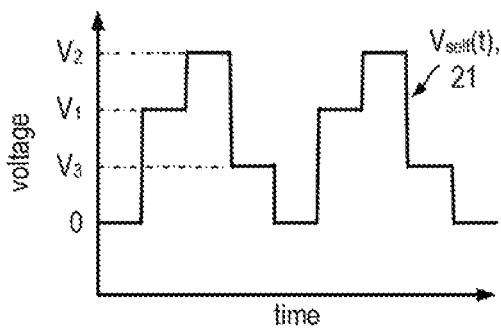
FIGS. 13A to 13F illustrate measuring the self-capacitance of a sensing electrode when no user interaction is occurring.
Figure 13B:
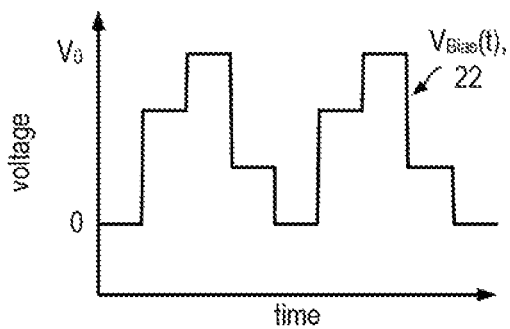
Figure 13C:
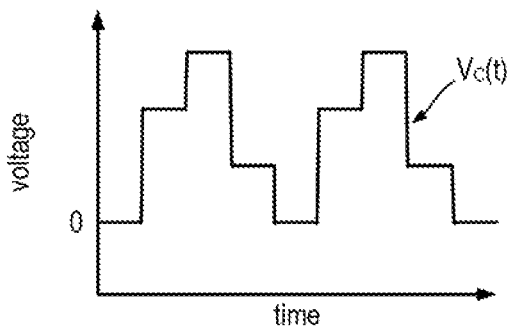
Figure 13D:
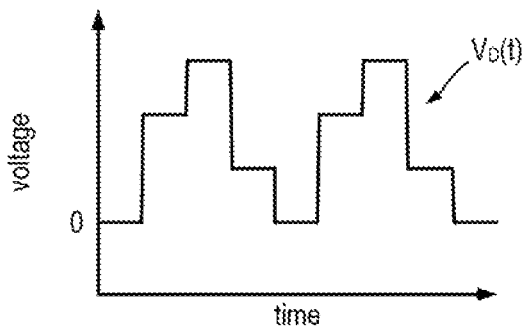
Figure 13E:
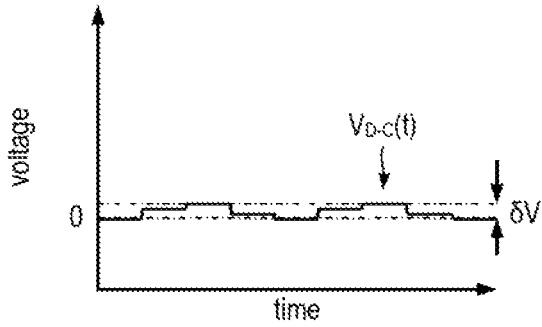
Figure 13F:
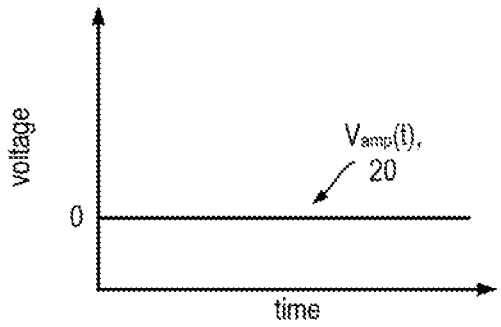
Figure 14A:
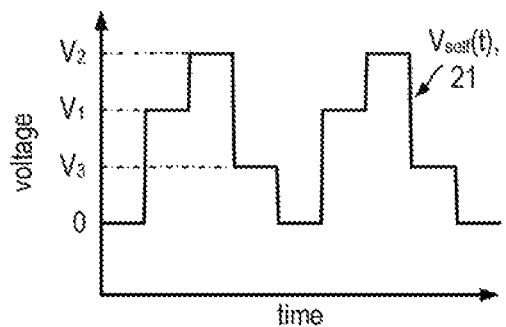
FIGS. 14A to 14I illustrate measuring self-capacitance of a sensing electrode combined with measuring the pressure applied by a user interaction.
Figure 14B:
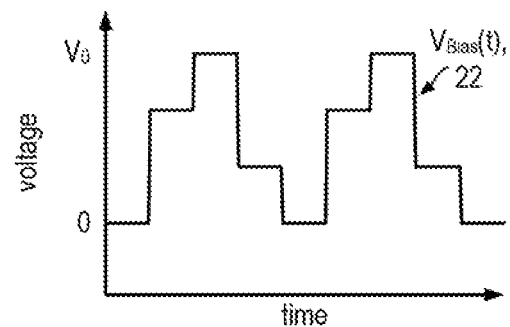
Figure 14C:
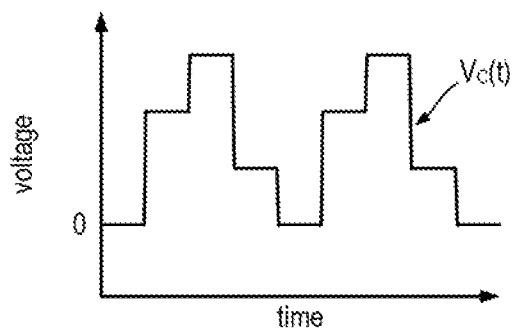
Figure 14D:
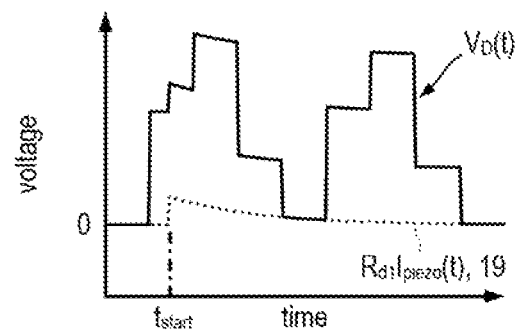
Figure 14E:
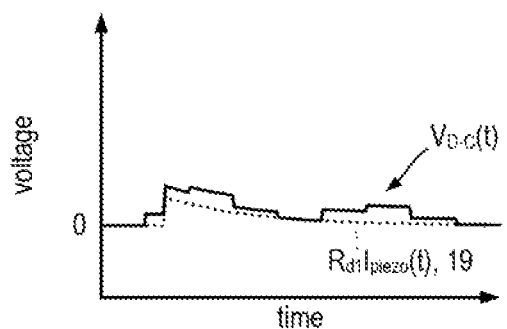
Figure 14F:
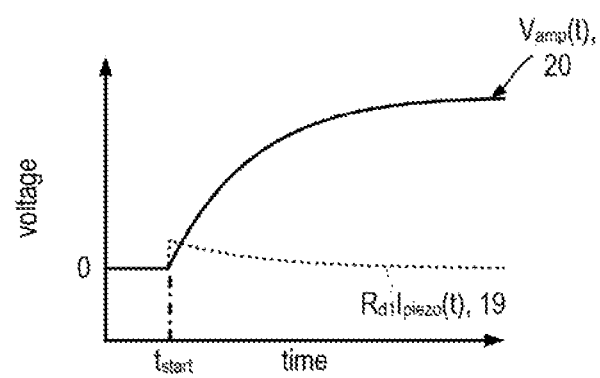
Figure 14G:
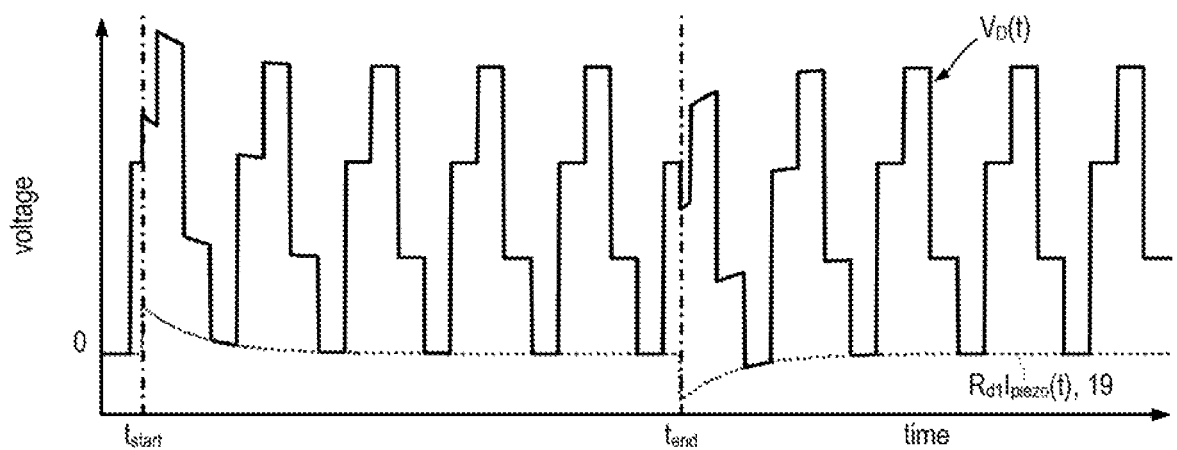
Figure 14H:
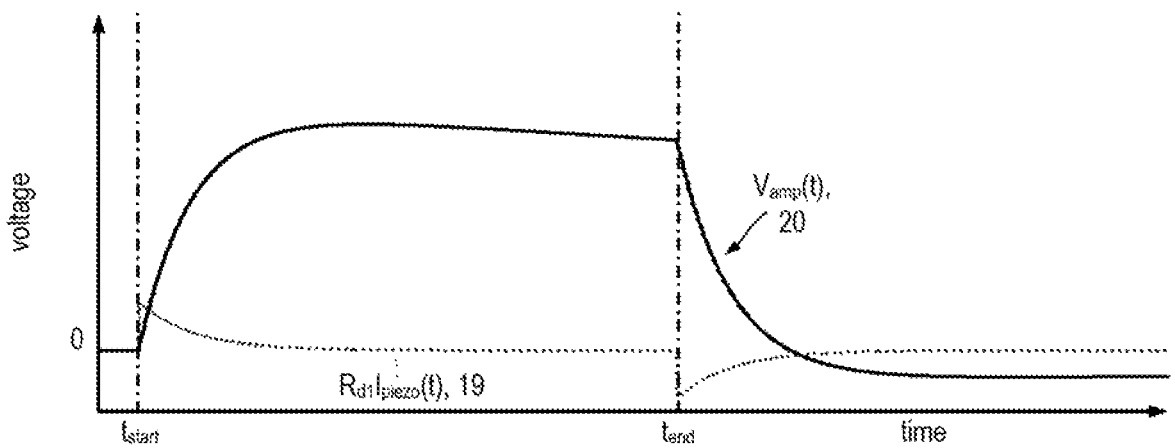
Figure 14I:
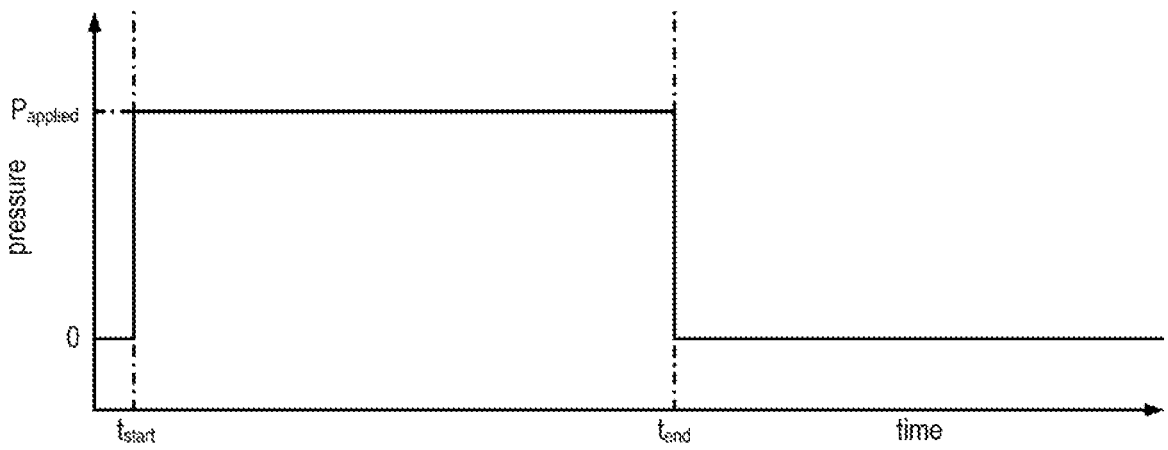

FIG. 12 illustrates an example of a circuit implementing the differential amplification stage 71. Referring also to FIG. 12, an example of the differential amplification stage 71 includes first, and second operational amplifiers OP1, OP2 and a comparator CM1. The first input 72 is received by the inverting input of the first operational amplifier OP1 at a circuit node denoted F, and the second input 73 is received by the inverting input of the second operational amplifier at a circuit node denoted G. The non-inverting input of the first operational amplifier OP1 is connected to ground through a first pull down resistance $R_{x1}$. Similarly, the non-inverting input of the second operational amplifier OP2 Is connected to ground through a second pull down resistance $R_{x2}$. The first and second pull down resistances $R_{x1}$, $R_{x2}$ preferably have the same value. Optionally, first and second pull down capacitances $C_{x1}$, $C_{x2}$ may be connected in parallel with the first and second pull down resistances $R_{x1}$, $R_{x2}$ respectively. The output of the first operational amplifier OP1 is coupled to the non-inverting input of the comparator CM1 at a circuit node denoted H, and the output of the second operational amplifier OP2 is coupled to the inverting input of the comparator CM1 at a circuit node denoted I. Alternatively, the connections of the operational amplifiers OP1, OP2 to the inverting and non-inverting inputs of the comparator CM1 may be reversed. The comparator CM1 output provides the amplified signal 20. A first feedback resistance $R_{f1}$ and a first feedback capacitance $C_{f1}$ are connected in parallel between the circuit node F and the circuit node H. The first feedback resistance and capacitance $R_{f1}$, $C_{f1}$ provide a feedback network for the first operational amplifier OP1. In this way, the pressure signal filter 16 is integrated with the first operational amplifier OP1. Similarly, a second feedback resistance $R_{f2}$ and a second feedback capacitance $C_{f2}$ are connected in parallel between the circuit node G and the circuit node I. The second feedback resistance and capacitance $R_{f1}$, $C_{f1}$ provide the feedback network and pressure signal filter 16 of the second operational amplifier OP2.

Use of differential amplification stage 71 may reduce the sensitivity of the amplifier signal 20 to electromagnetic interference. The differential amplification stage 71 may also reduce any residual amplitude of the capacitance measurement signals 21.

Operation for Combined Self-Capacitance and Pressure Measurements:

FIGS. 13A to 13F illustrate using the touch panel system 47 to measure the self-capacitance of the $n^{th}$ sensing electrode 10, 31 in a case when no user interaction with the $n^{th}$ sensing electrode 10, 31 is occurring.

Referring to FIGS. 10 to 13F, the capacitive touch controller 5 outputs a capacitance measurement signal 21 to the $n^{th}$ sensing electrode 10, 31 through the $n^{th}$ differential separation stage 70. The capacitance measurement signal 21 may take the form of a stepped waveform $V_{self}(t)$, in which the voltage $V_{self}(t)$ is held at ground for a predetermined duration, before stepping up to a first voltage $V_1$. The voltage $V_{self}(t)$ is held at $V_1$ for the predetermined duration before stepping up to a second voltage $V_2$ for the predetermined duration and then stepping down to a third voltage $V_3$. After holding at the third voltage $V_3$ for the predetermined duration, the voltage $V_{self}(t)$ steps down to ground, i.e. 0 V, and the stepped waveform $V_{self}(t)$ repeats. The difference between the second and third voltages, $V_2$-$V_3$ is equal to the first voltage $V_1$, which allows the self-capacitance of the $n^{th}$ sensing electrode, $C_{self}$+$\Delta C_{self}$ to be measured from a rising edge and a falling edge. The specific form of the voltage signal $V_{self}(t)$ need not be a stepped waveform, and any signal suitable for determining the self-capacitance of the $n^{th}$ sensing electrode, $C_{self}$+$\Delta C_{self}$ may be used, depending on the capacitive touch controller 5 used.

The capacitive touch controller 5 output a bias signal 22, $V_{bias}(t)$ which is substantially the same as the capacitance measurement signal 21, $V_{self}(t)$. This removes or substantially reduces the influence of the sensor capacitance $C_{sensor}$ on the measurement of the self-capacitance $C_{self}$+$\Delta C_{self}$. In this way, a measured capacitance substantially corresponds to the self-capacitance $C_{self}$ between the $n^{th}$ sensing electrode 10, 31 and ground. The self-capacitance $C_{self}$ of the $n^{th}$ sensing electrode 10, 31 is determined by the capacitive touch controller 5 using an internal charge amplifier (not shown) which determines the charge flowing to/from the self-capacitance $C_{self}$ in response to the capacitance measurement signal 21, $V_{self}(t)$.

The capacitance measurement signal 21 is passed by the first and second capacitance filters 15, for example the first and second capacitances $C_{i1}$, $C_{i2}$, with no or minimal attenuation. The reference resistance and capacitance $R_{is}$, $C_{is}$ should preferably be chosen to substantially match the resistance $R_{sensor}$ and capacitance $C_{sensor}$+$C_{self}$ of the touch sensor 4, 26 equivalent circuit 74. Thus, when no user interaction is occurring, the voltages at circuit nodes D and C, namely $V_D(t)$ and $V_C(t)$, are substantially similar because the paths to the common electrode 11 via the touch sensor 4, 26 and via the reference resistance and capacitance $R_{is}$, $C_{is}$ have substantially similar impedance. Thus, the difference between the voltages at nodes D and C, $V_{D-C}(t)$ is small or negligible, with a residual magnitude of $\delta V$. The residual difference $V_{D-C}(t)$ has a substantially similar frequency composition to the capacitance measurement signal 21, $V_{self}(t)$, and is rejected/filtered out by the pressure signal filter 16 incorporated in the differential amplification stage 72, for example the operational amplifiers OP1, OP2 and respective feedback networks $R_{f1}$-$C_{f1}$, $R_{f2}$-$C_{f2}$. The amplified signal 20, $V_{amp}(t)$ is substantially constant. Any residual contributions due to the capacitance measurement signal 21, $V_{self}(t)$, which are not sufficiently attenuated by the pressure signal filter 16 and/or the integrated nature of the output may be removed or compensated during subsequent digital signal processing of the amplified signal by the pressure signal processing module 6 (FIG. 5) or the processor 37 (FIG. 3).

When a user interaction occurs in the form of a light press/proximity hover, i.e. no significant piezoelectric response $I_{piezo}(t)$ is generated from the piezoelectric material layer 12, the signals are substantially the same. The change in self-capacitance $\Delta C_{self}$ of the $n^{th}$ sensing electrode 10, 31 due to the user interaction is sensed by the capacitive touch controller 5 based on a change in the charge flow to/from the $n^{th}$ sensing electrode which is determined by the internal charge amplifier (not shown).

FIGS. 14A to 14I illustrate using the touch panel system 47 for combined measurements of the self-capacitance of the $n^{th}$ sensing electrode 10, 31 and the pressure applied to the $n^{th}$ sensing electrode 10, 31.

Referring also to FIG. 14A to 14I, when a user interaction applies pressure to the $n^{th}$ touch sensor 4, 26 of the touch panel 36, 53, 58, the strain induced polarisation $\underline{P}$ of the layer of piezoelectric material 12 produces a piezoelectric response $I_{piezo}(t)$ from the $n^{th}$ sensing electrode 10, 31. The piezoelectric response $I_{piezo}(t)$ does not significantly register at circuit node C via the reference path $R_{is}$, $C_{is}$ because magnitude of the piezoelectric response $I_{piezo}(t)$ is small and because the circuit nodes C and D are at least partially decoupled by the first and second capacitance signal filters 15, for example $C_{i1}$ and $C_{i2}$. In this example implementation, the piezoelectric response $I_{piezo}(t)$ registers at the node D as a voltage across the input resistance $R_{d1}$, i.e. as $R_{d1}I_{piezo}(t)$. In this way, the voltage signal $V_D(t)$ at circuit node D is approximately a superposition of the capacitance measurement signal 21, $V_{self}(t)$ and the voltage due to the piezoelectric response $R_{d1}I_{piezo}(t)$. The piezoelectric signal $R_{d1}I_{piezo}(t)$ has substantially smaller amplitude that the capacitance measurement signal 21, $V_{self}(t)$. The relative amplitude of the piezoelectric signal $R_{d1}I_{piezo}(t)$ shown in FIGS. 14D to 14I has been exaggerated for visual purposes. The difference $V_{D-C}(t)$ between the voltage signals at circuit nodes 1) and C is a superposition of the piezoelectric signal $R_{d1}I_{piezo}(t)$ and residual fluctuations with approximate amplitude δV. The pressure signal filters 16 of the differential amplification stage 72 substantially reject/attenuate the residual fluctuations δV due to capacitance measurement signals 21, and the amplified signal 20, $V_{amp}(t)$ Is proportional to the integral of the piezoelectric signal $R_{d1}I_{piezo}(t)$ multiplied by a gain $G_{amp}$. The correspondence may not be precise because relatively higher frequency components of the piezoelectric signal $R_{d1}I_{piezo}(t)$, for example above the base frequency $f_d$ of capacitance measurements signals 21, may be attenuated by the pressure signal filters 16. Any residual contributions due to the capacitance measurement signal 21, $V_{self}(t)$ which are not sufficiently attenuated by the pressure signal filter 16 may be removed or compensated during subsequent digital signal processing of the amplified signal by the pressure signal processing module 6 (FIG. 5) or the processor 37 (FIG. 3).

Referring in particular to FIGS. 14D to 14I, a user interaction applying a pressure $P_{applied}$ begins at $t_{start}$ and continues until $t_{end}$. The piezoelectric current $I_{piezo}(t)$ (and hence to signal $R_{d1}I_{piezo}(t)$) increases rapidly before decaying as the charge $Q_{piezo}(t)$ developed between the sensing electrode 10, 31 and the common electrode 11 approaches a peak value. The time constant is approximately set by the capacitance of the equivalent circuit 74 and the input resistance $R_{d1}$. The amplified signal 20 is proportional to the integral of the piezoelectric signal $R_{d1}I_{piezo}(t)$ and also increases rapidly after $t_{start}$. The amplified signal 20 also decays with a time constant related to the amplifier. For example, the time constant for decay of the amplified signal 20 may be determined by the resistances $R_{f1}$, $R_{f2}$ and capacitances $C_{f1}$, $C_{f2}$ forming the feedback network of the operational amplifiers OP1, OP2. Typically, the time constant for decay of the amplified signal 20, $V_{amp}(t)$ is longer than for decay of the piezoelectric signal $R_{d1}I_{piezo}(t)$. On re the pressure is removed at a time $t_{end}$, a piezoelectric signal $-R_{d1}I_{piezo}(t)$ having the opposite sense is produced as the charge $Q_{piezo}$ is discharged between the electrodes 10, 11, 31. The decay of the amplified signal 20, $V_{amp}(t)$ results in a small, transient, overshoot of the amplified signal 20, $V_{amp}(t)$ after $t_{end}$. The overshoot in the amplified signal 20, $V_{amp}(t)$ decays to the baseline level with the same time constant.

In FIGS. 14D to 14I, the time constant of the piezoelectric signal $R_{d1}I_{piezo}(t)$ has been shown as relatively short for illustrative purposes. In practice, the time constant for decay of the piezoelectric signal $R_{d1}I_{piezo}(t)$ is several tens, hundreds or even thousands of times the period of the capacitance measurement signal 21, $V_{self}(t)$. The duration $t_{end}$-$t_{start}$ of the user interaction has also been shortened in FIGS. 14D to 14I for illustrative purposes. In practice, the length of a user interaction may exceed hundreds, thousands or even tens of thousands of times the period of the capacitance measurement signal 21, $V_{self}(t)$.

The specific method for measuring the self-capacitance of the sensing electrodes 10, 31, and the specific waveforms of the capacitance measurement signals 21 and bias signal 22 depend on the particular capacitive touch controller 5 used. However, any capacitive touch controller 5 may be used with the device 1, 25, 48, by adjusting the bandwidth of the capacitance signal filter 15 to pass the capacitance measurement signals 21 produced by a particular capacitive touch controller 5.

Operation for Combined Mutual-Capacitance and Pressure Measurements:

The touch panel system 47 may also be used to measure the mutual capacitance between a pair of one first sensing electrode 10 and one second sensing electrode 31, concurrently with making pressure measurements between each of the first and second sensing electrodes 10, 31 and the common electrode. Measuring mutual capacitances between pairs of one first sensing electrode 10 and one second sensing electrode 31 docs not require any change in the physical configuration of the touch panel system 47, and the measurement mode, namely self- or mutual-capacitance, mainly varies in the form of the capacitance measurement signals 21 sent/received by the capacitive touch controller 5.

Figure 15:
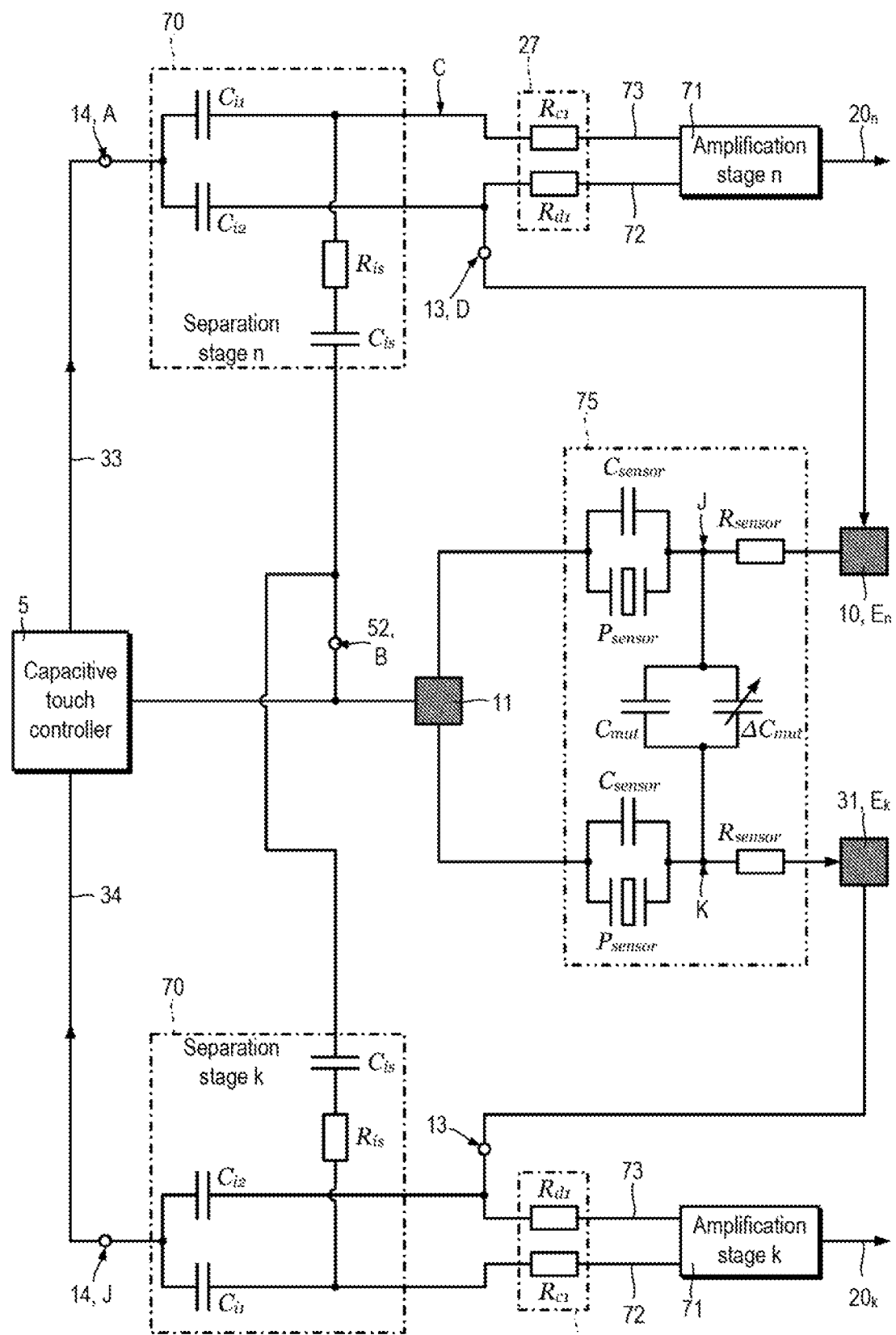
FIG. 15 illustrates implementing mutual capacitance measurements between a pair of sensing electrodes using the first touch panel system.
Figure 16A:
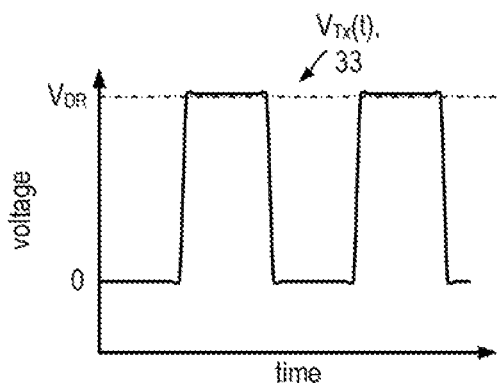
FIGS. 16A to 16F illustrate measuring a mutual-capacitance between a pair of sensing electrodes when no user interaction is occurring.
Figure 16B:
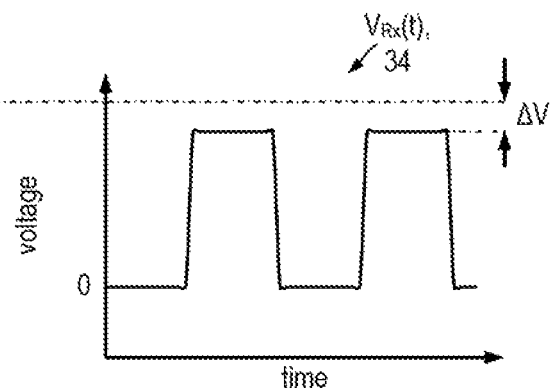
Figure 16C:
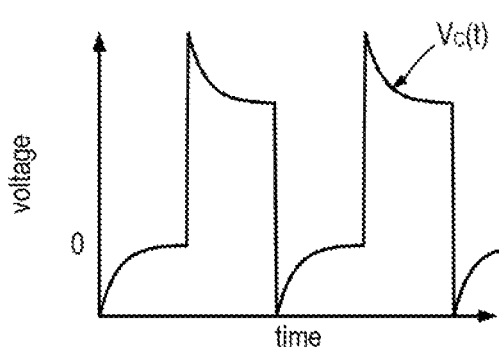
Figure 16D:
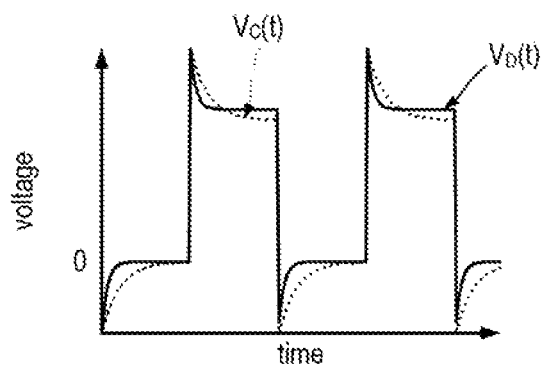
Figure 16E:
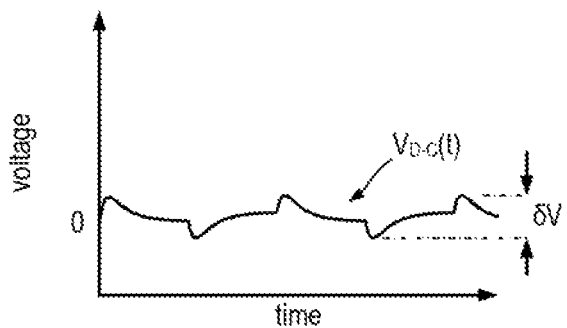
Figure 16F:
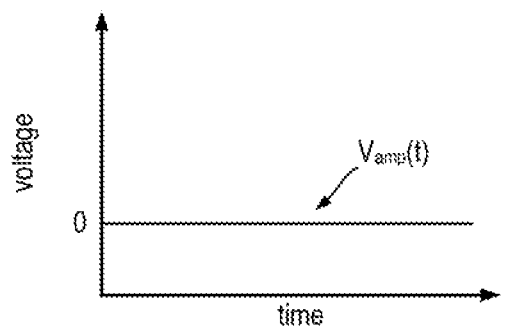
Figure 17A:
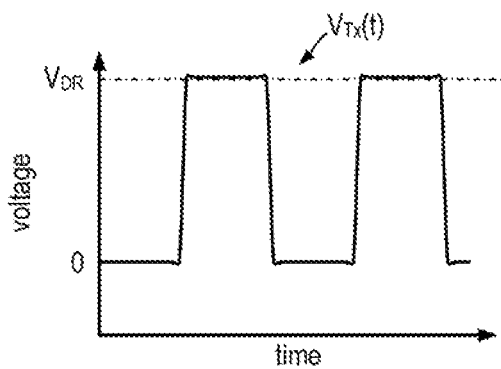
FIGS. 17A to 17F illustrate measuring a mutual-capacitance between a pair of sensing electrodes when there is a light user interaction proximate to the sensing electrodes.
Figure 17B:
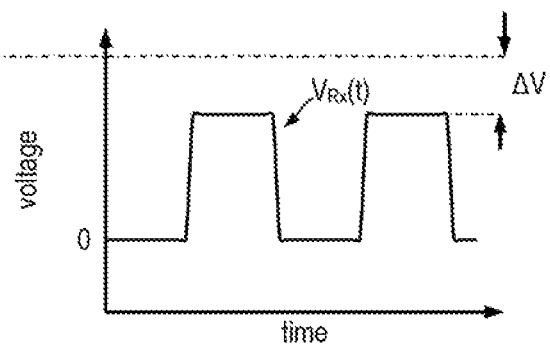
Figure 17C:
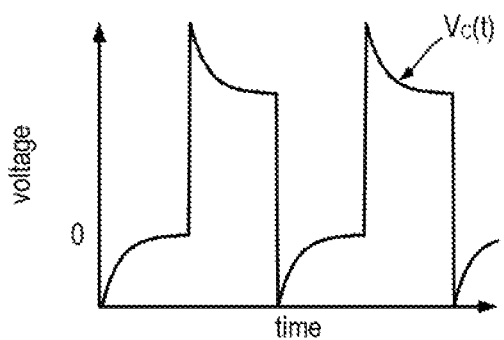
Figure 17D:
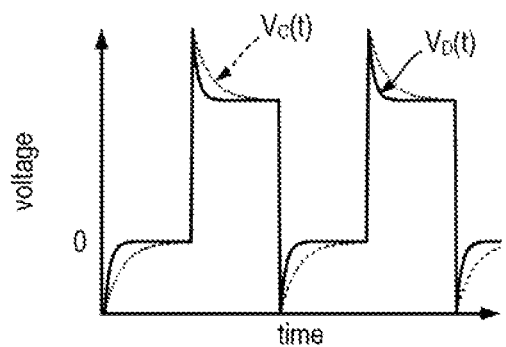
Figure 17E:
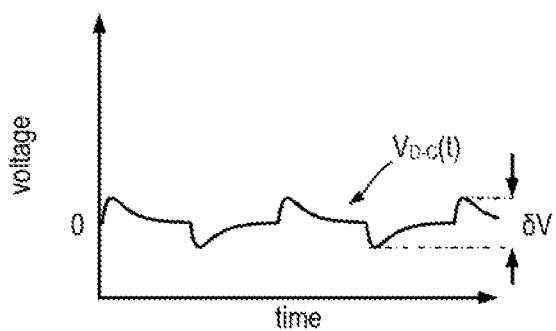
Figure 17F:
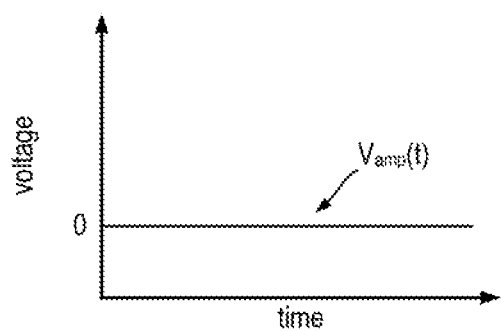
Figure 18A:
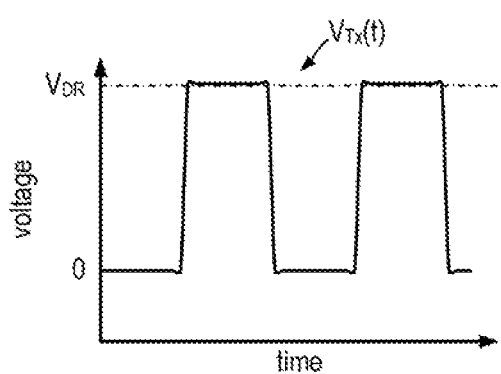
FIGS. 18A to 18F illustrate measuring a mutual-capacitance between a pair of sensing electrodes combined with measuring a pressure applied by a user interaction proximate to the sensing electrodes.
Figure 18B:
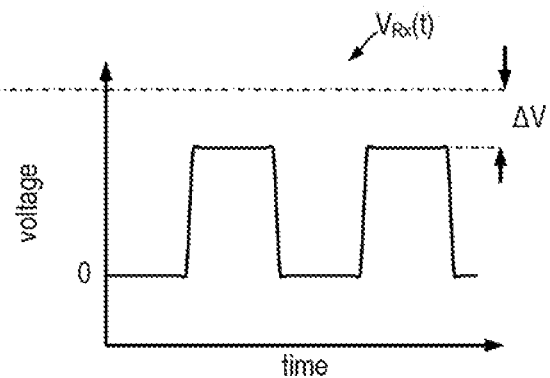
Figure 18C:
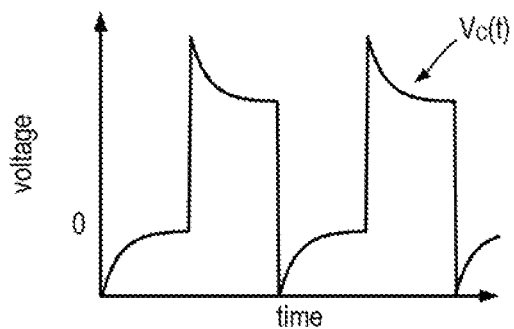
Figure 18D:
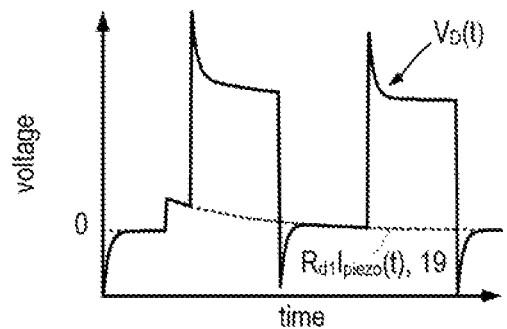
Figure 18E:
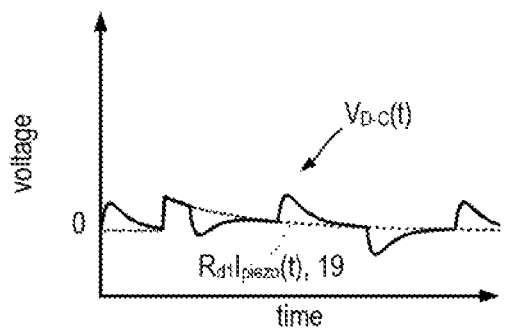
Figure 18F:
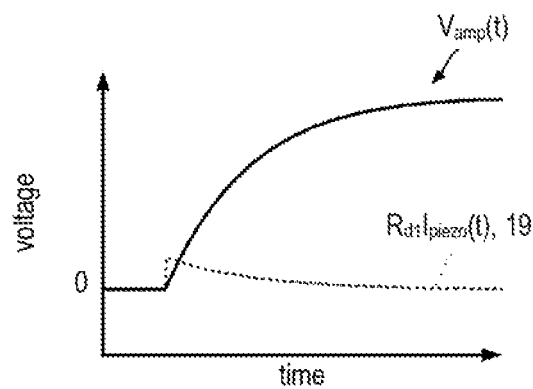

FIG. 15 illustrates using the touch panel system 47 to measure the mutual capacitance between a pair of sensing electrode 10, 31. Referring to FIGS. 5, 10 to 12 and 15, mutual capacitance measurements are made using a pair including a first sensing electrode 10 and a second sensing electrode 31. For example, if a touch panel 36, 53, 58 includes a total number N of sensing electrodes 10, 31, of which $N_1$ are first sensing electrodes, then denoting the $n^{th}$ sensing electrode 10, 31 as $E_n$, a mutual capacitance may be measured for any pairing of a first sensing electrode 10, $E_n$ for all $1 \le n \le N_1$ with a second sensing electrode 31, $E_k$ for all $N_1 < k \le N$.

The physical configuration of the touch panel system 47 is the same as for self-capacitance measurements. However, the capacitive touch controller 5 transmits/receives different capacitance measurement signals 21 and a mutual capacitance equivalent circuit 75 is considered instead of the equivalent circuit 74. The mutual capacitance equivalent circuit 75 is substantially similar to the equivalent circuit 74. The $n^{th}$ or $k^{th}$ touch sensor 4, 26 is represented as sensor capacitance $C_{sensor}$ and a sensor resistance $R_{sensor}$ connected in series between the $n^{th}$ sensing electrode $E_n$ and the common electrode 11, with a piezoelectric element $P_{sensor}$ connected in parallel across the sensor capacitance $C_{sensor}$. The sensor capacitance $C_{sensor}$ represents a mutual capacitance between the respective sensing electrode $E_n$, $E_k$ and the common electrode 11. The sensor capacitance $C_{sensor}$ and sensor resistance $R_{sensor}$ representing the $n^{th}$ touch sensor 4, 26 are connected at a circuit node denoted J, and the sensor capacitance $C_{sensor}$ end sensor resistance $R_{sensor}$ representing the $k^{th}$ touch sensor 4, 26 are connected at a circuit node denoted K. The equivalent circuit 75 also includes a mutual capacitance $C_{mut}+\Delta C_{mut}$ between the $n^{th}$ and $k^{th}$ sensing electrodes $E_n$, $E_k$, connecting between the circuit nodes J and K.

FIGS. 16A to 16F illustrate using a touch panel system 47 to measure mutual-capacitance between an intersection of the $n^{th}$ sensing electrode $E_n$, 10 and the $k^{th}$ sensing electrode $E_k$, 31 when there is no user interaction proximate to the $n^{th}$ or $k^{th}$ sensing electrodes $E_n$, $E_k$.

Referring to FIGS. 4, 5, 15 and 16A to 16F, the capacitive touch controller 5 drives the $n^{th}$ sensing electrode $E_n$, 10 with a capacitance measurement signal 21 in the form of a capacitance drive signal 33, $V_{Tx}(t)$. The capacitance drive signal 33, $V_{Tx}(t)$ takes the form of a square wave signal have a drive signal amplitude $V_{Dr}$ and a base frequency $f_1$. The capacitive drive signal 33, $V_{Tx}(t)$ induces a capacitance measurement signal 21 in the form of capacitance sense signal 34, $V_{Rx}(t)$ in the intersecting $k^{th}$ sensing electrode $E_k$, 31, and the capacitive touch controller 5 receives the capacitance sense signal 34, $V_{Rx}(t)$. The capacitance sense signal 34, $V_{Rx}(t)$ is also a square wave, with an amplitude reduced to $V_D$-$\Delta V$ by a voltage drop $\Delta V$, and the capacitive touch controller 5 determines the value of the mutual capacitance $C_{mut}$ between the $n^{th}$ and $k^{th}$ sensing electrodes $E_n$, $E_k$ based on the size of the voltage difference $\Delta V$. The bias signal 22 is a constant DC voltage or ground for mutual capacitance measurements. When there is no user interaction with the $n^{th}$ and $k^{th}$ sensing electrodes $E_n$, $E_k$, the voltage signals $V_C(t)$, $V_D(t)$ at circuit nodes C and D are substantially similar, though not identical. Similar to the case of self-capacitance measurements, the difference signal between circuit nodes D and C, $V_{D-C}(t)$ includes residual fluctuations $\delta V$ having a frequency content similar to the capacitance drive signal 33, $V_{Tx}(t)$. The behaviour of the $k^{th}$ signal separation and amplification stages 70, 71 is similar. Thus, the pressure signal filters 16 of the differential amplification stages 71 reject/attenuate the residual fluctuations $\delta V$ and the amplified signals $20_n$, $20_k$, $V_{amp}(t)$ of the $n^{th}$ and $k^{th}$ amplification stages 71 are substantially constant. Any remaining noise corresponding to the capacitance drive/sense signals 33, 34 may be removed or compensated by digital signal processing in the pressure signal processing module 6 and/or by the processor 37 (FIG. 3).

FIGS. 17A to 17F illustrate using a touch panel system 47 to measure mutual-capacitance between an intersection of the $n^{th}$ sensing electrode 10 and the $k^{th}$ sensing electrode $E_k$, 31 when there is a light user interaction proximate to the $n^{th}$ or $k^{th}$ sensing electrodes $E_n$, $E_k$.

Referring also to FIGS. 17A to 17F, a user interaction may occur which results in capacitive coupling between the user's digit or a suitable conductive stylus and the $n^{th}$ and $k^{th}$ sensing electrodes, but which does not apply sufficient pressure to produce a significant piezoelectric signal $R_{d1}I_{piezo}(t)$. The capacitive coupling to the user's digit or conductive stylus causes a change $\Delta C_{mut}$ in the mutual capacitance between the $n^{th}$ and $k^{th}$ sensing electrodes. The capacitive touch controller 5 determines the change $\Delta C_{mut}$ in the mutual capacitance from a corresponding increase in the voltage drop $\Delta V$ between the capacitance drive signal 33, $V_{Tx}(t)$ and the capacitance sense signal 34, $V_{Rx}(t)$. The voltage signals $V_C(t)$, $V_D(t)$ at circuit nodes C and D are also modified relative to one another by the change in mutual capacitance $\Delta C_{mut}$, and the voltage difference between nodes D and C, $V_{D-C}(t)$ will change correspondingly. The residual voltage fluctuations $\delta V$ continue to have a frequency composition based on the capacitance drive and sense signals $V_{Tx}(t)$, $V_{Rx}(t)$, and are substantially rejected/attenuated by the pressure signal filters 16 incorporated in the differential amplification stages 71.

FIGS. 18A to 18F illustrate using a touch panel system 47 to measure mutual-capacitance between an intersection of the $n^{th}$ sensing electrode $E_n$, 10 and the $k^{th}$ sensing electrode $E_k$, 31 when a user interaction proximate to the $n^{th}$ or $k^{th}$ sensing electrodes $E_n$, $E_k$ applies sufficient pressure to induce a piezoelectric response.

Referring also to FIGS. 18A to 18F, when a user interaction applies pressure to the $n^{th}$ and $k^{th}$ touch sensors 26 of the touch panel 36, 53, 58, the strain induced polarisation of the piezoelectric material layer 12 produces a piezoelectric response $I_{piezo}(t)$ from the $n^{th}$ sensing electrode 10, 31. The piezoelectric signal $I_{piezo}(t)$ does not substantially register at the circuit node C via the reference path $R_{is}$, $C_{is}$ because the magnitude of the piezoelectric response $I_{piezo}(t)$ is small and because the circuit nodes C and D are at least partially decoupled by the first and second capacitance signal filters 15, for example $C_{i1}$, $C_{i2}$. In this example implementation, the piezoelectric response $I_{piezo}(t)$ registers at the node D as a voltage across the input resistance $R_{d1}$, i.e. as $R_{d1}I_{piezo}(t)$. In this way, the voltage signal $V_D(t)$ at circuit node D is approximately a superposition of the capacitance drive signal 33, $V_{Tx}(t)$ and a piezoelectric signal $R_{d1}I_{piezo}(t)$. In a similar way, an approximate superposition of the capacitance sense signal 34, $V_{Rx}(t)$ and a piezoelectric signal $R_{d1}I_{piezo}(t)$ provides one input to the differential amplification stage 71 associated with the $k^{th}$ sensing electrode $E_k$. The piezoelectric signal $R_{d1}I_{piezo}(t)$ has substantially smaller amplitude than the capacitance drive and sense signals $V_{Tx}(t)$, $V_{Rx}(t)$. The relative amplitude of the piezoelectric signal $R_{d1}I_{piezo}(t)$ shown in FIGS. 18D to 18F has been exaggerated for visual purposes. The difference $V_{D-C}(t)$ between the voltage signals at circuit nodes D and C is a superposition of the piezoelectric signal $R_{d1}I_{piezo}(t)$ and residual fluctuations $\delta V$. The pressure signal fitters 16 of the differential amplification stage 72 substantially reject/attenuate the residual fluctuations $\delta V$, and the amplified signal $20_n$, $V_{amp}(t)$ is approximately proportional to integral of the piezoelectric signal $R_{d1}I_{piezo}(t)$ multiplied by a gain $G_{amp}$. As described hereinbefore, the amplified signal $V_{amp}(t)$ will decay towards the baseline level for static pressures with a time constant determined by the resistances $R_{f1}$, $R_{f2}$ and capacitances $C_{f1}$, $C_{f2}$ forming the feedback network of the operational amplifiers OP1, OP2. The correspondence may not be precise because relatively higher frequency components of the piezoelectric signal $R_{d1}I_{piezo}(t)$ (e.g. $\geq f_d$) may be attenuated by the pressure signal filters 16. The amplified signal $20_k$ output by the amplification stage 71 associated with the $k^{th}$ sensing electrode $E_k$ is produced in the same way. The pressure signal processing module 6 receives the amplified signals $20_n$, $20_k$ and determines corresponding pressure values 24. For example, the pressure signal processing module 6 may use a model or a look-up table previously calibrated using known applied pressures. A user interaction with the $n^{th}$ and $k^{th}$ sensing electrodes $E_n$, $E_k$ results in one capacitance value 23 and a pair of pressure values 24. The pressure signal processing module 6 may take an average of the pressure values 24 calculated based on the amplified signals $20_n$, $20_k$ corresponding to the $n^{th}$ and $k^{th}$ sensing electrodes $E_n$, $E_k$. Alternatively, the pressure signal processing module may only determine one pressure value 24 based on the strongest amplified signal 20, for example, the amplified signal corresponding to the first sensing electrode 10 due to proximity to the piezoelectric material layer 12.

The first sensing electrodes 10 do not need to be the driving electrodes and the second sensing electrodes 31 do not need to be the sensing electrodes. Instead, the capacitive touch controller 5 may drive the second sensing electrode 31, i.e. the $k^{th}$ sensing electrode, using capacitance drive signals 33 and receive capacitance sense signals 34 from the first sensing electrode 10, i.e. the $n^{th}$ sensing electrode.

The specific method for measuring the mutual-capacitance of the sensing electrodes 10, 31, and the specific waveforms of the capacitance measurement signals 21 in the form of capacitance drive/sense signals 33, 34, and bias signal 22 depend on the particular capacitive touch controller 5 used. However, any capacitive touch controller 5 may be used with the device 1, 25, 48, by adjusting the bandwidth of the capacitance signal filter 15 to pass the capacitance measurement signals 21 produced by a particular capacitive touch controller 5.

Figure 19:
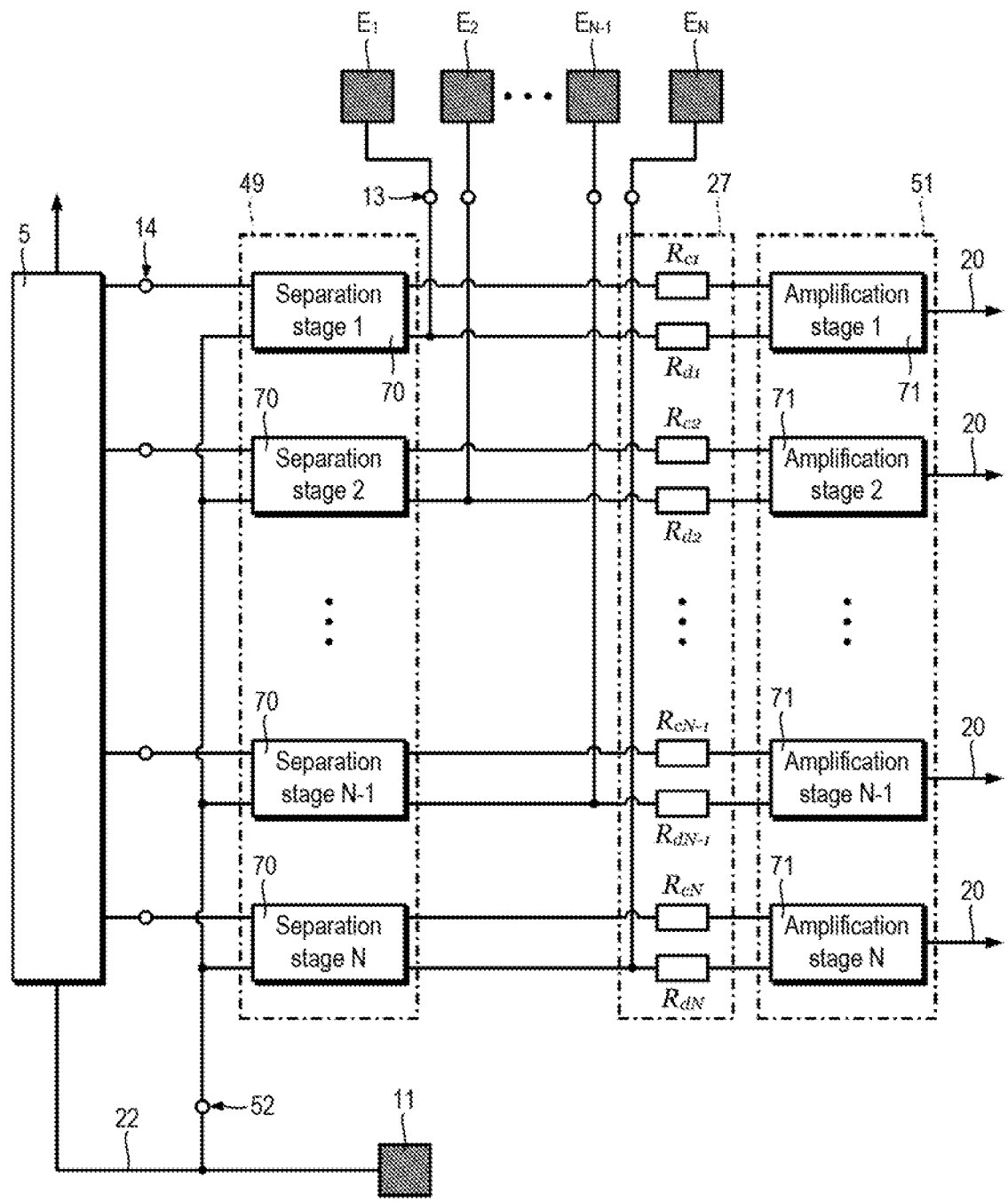
FIG. 19 illustrates implementing the first touch panel system shown in FIG. 5 using an equal numbers of separation and amplification stages.

Touch Panel System with Equal Numbers of Separation and Amplification stages:

FIG. 19 illustrates the connections between equal numbers of separation stages 2, 70 and amplification stages 3, 71. Referring to FIGS. 4, 5, 10, 11 and 19, the third device 48 may be implemented using a signal separation section 49 including a number N of separation stages 2 in the form of differential signal separation stages 70 and an amplification section 51 including an equal number N of amplification stages 3 in the form of differential amplification stages 71. Each differential signal separation stage 70 is connected to one of N sensing electrodes $E_1$, $E_2$ . . . , $E_n$ via a respective first input/output terminal 13. When a touch panel 36, 53, 58 includes second touch sensors 26, the sensing electrodes $E_1$, $E_2$, . . . , $E_N$ may be a mixture of first and second sensing electrodes 10, 31, for example arranged to form a grid of intersections.

When the numbers of differential separation and amplification stages 70, 71 are equal, the resistance network 27 may include a pair of resistances $R_{cn}$, $R_{dn}$ corresponding to each differential separation stage 70. The resistance $R_{dn}$ couples the first input 72 of the $n^{th}$ differential amplification stage 71 to the circuit node D associated with the $n^{th}$ differential separation stage 70. The resistance $R_{cn}$ couples the second input 73 of the $n^{th}$ differential amplification stage 71 to the circuit node C associated with the $n^{th}$ differential separation stage 70, i.e. to the reference path $R_{is}$-$C_{is}$. The reference path $R_{is}$-$C_{is}$ of each differential separation stage 70 is connected to the common terminal 52, and the common terminal 52 is connected to the common electrode of the touch panel 36, 53, 58.

In an alternative implementation of the touch panel system 47 using single input amplification stages 77 (FIG. 21), the resistance network 27 includes a single resistance $R_{dn}$ coupling the input of the $n^{th}$ amplification stage 3 to the respective $n^{th}$ signal separation stage 2 and first input/output terminal 13.

Touch Panel System with Unequal Numbers of Separation and Amplification Stages:

FIG. 20 illustrates the connections between a number N of separation stages 2 in the form of differential separation stages 70 and a smaller number M of amplification stages 3 in the form of differential amplification stages 71. Referring to FIGS. 4, 5, 10, 11 and 20, the signal separation section 49 may include a number N of differential signal separation stages 70 and the amplification section 51 may include a smaller number M of differential amplification stages 71. Each differential signal separation stage 70 is connected to one of N sensing electrodes $E_1$, $E_2$, . . . , $E_N$ via a respective first input/output terminal 13. When a touch panel includes second touch sensors 26, the sensing electrodes $E_1$, $E_2$, . . . , $E_N$ may be a mixture of first and second sensing electrodes 10, 31, for example arranged to form a grid of intersections.

When the number M of differential amplification stages 71 is less than the number N of differential separation stages 70, the resistance network 27 includes a pair of resistances $R_{cn}$, $R_{dn}$ corresponding to each differential separation stage 70. The first input 72 of the $m^{th}$ of M differential amplification stages 71 is coupled to multiple differential separation stages 70 via the respective resistances $R_{dn}$. For example, the $m^{th}$ of M differential amplification stages 71 may be connected to the $n^{th}$ and $n+1^{th}$ differential separation stages 70 via the respective resistances $R_{dn}$, $R_{dn+1}$. In this case, the first input/output terminal of each resistance $R_{dn}$, $R_{dn+1}$ is connected to the circuit node D associated with the respective differential separation stage 70, and the second input/output terminals of both resistances $R_{dn}$, $R_{dn+1}$ are connected to the first input 72 of the corresponding $m^{th}$ differential amplification stage 71 at a common circuit node. The second input 73 of the $m^{th}$ differential amplification stage 71 is connected to the corresponding differential separation stages 70 by the resistances $R_{cn}$, $R_{cn+1}$ in the same way.

In this way, the amplified signal 20 output by the $m^{th}$ of M differential amplification stages 71 will be indicative of a pressure applied proximate anyone of the sensing electrodes $E_n$, $E_{n+1}$ which are connected to the $m^{th}$ differential amplification stage 71 through the respective $n^{th}$ and $n+1^{th}$ differential separation stages 70. When the amplification stages 71 include integrating amplifiers, the amplified signal 30 will be indicative of a sum of the pressures applied proximate to the sensing electrodes $E_n$, $E_{n+1}$ which are connected to the $m^{th}$ differential amplification stage 71.

More than two differential separation stages 70 may be connected to each differential amplification stage 71 in an analogous way.

Figure 21:
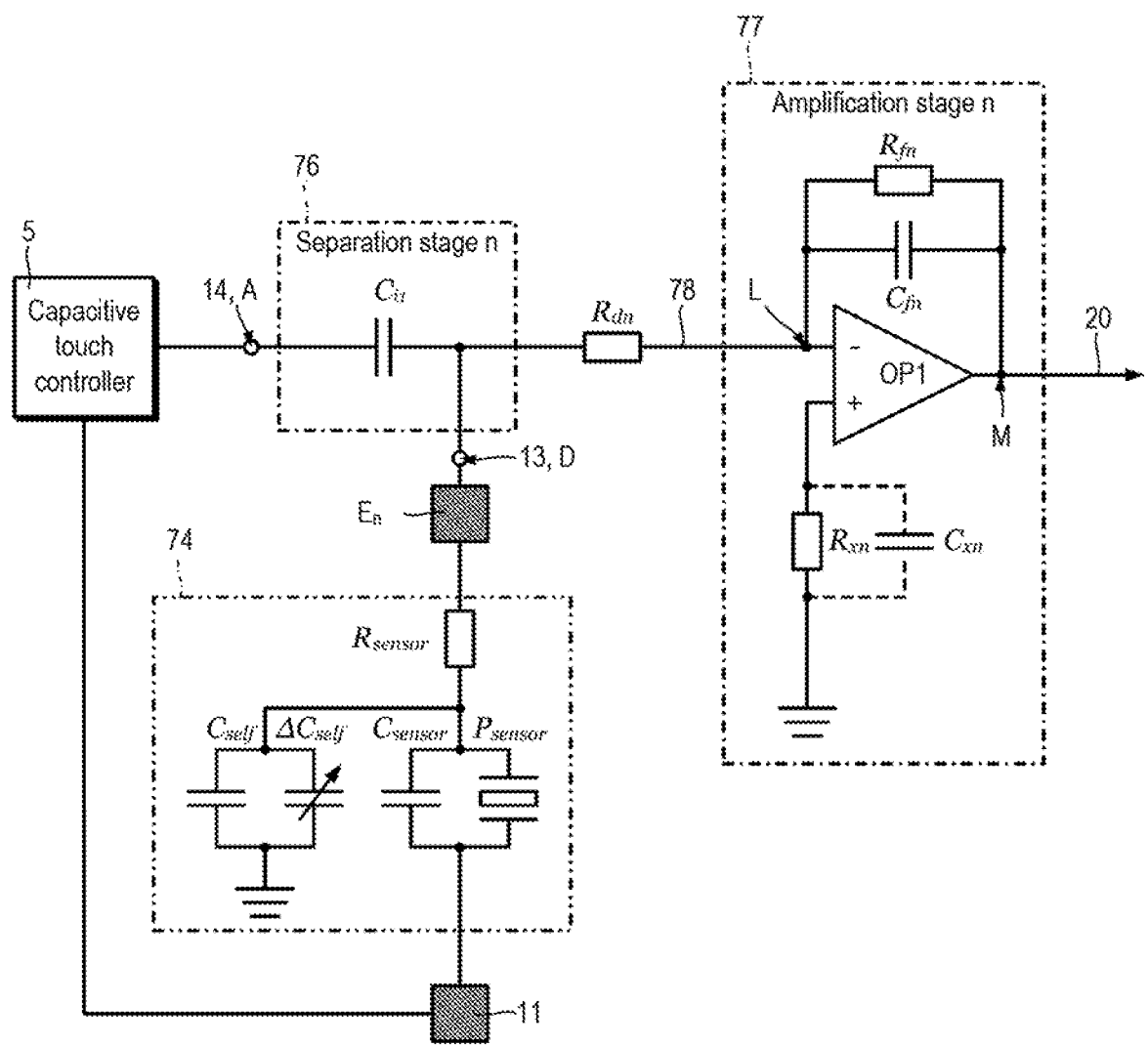
FIG. 21 illustrates an implementation of the first touch panel system employing single input amplification.

In an alternative implementation of the touch panel system using single input amplification stages 77 (FIG. 21, the amplification stages 3 may be connected to the signal separation stages 2 in the same way, except that each signal separation stage 2 will correspond to a single resistance $R_{dn}$ within the resistance network 27.

Touch Panel System Using Single Input Amplification Stages:

FIG. 21 illustrates an example implementation of a portion of a touch panel system 47 employing single input separation and amplification stages 76, 77. Referring to FIGS. 1, 2, 4, 5 and 21, the first touch panel system may be implemented using amplification stages 3 in the form of single input amplification stages 77, and corresponding signal separation stages 2 in the form of single input signal separation stages 76. A single input amplification stage 77 may generate the amplified signal 20 based on a single input 78. An $n^{th}$ single input signal separation stage 76 may couple the $n^{th}$ second input/output terminal 14 to the $n^{th}$ first input/output terminal 13 through a capacitance $C_n$ providing a first capacitance signal filter 15. The $n^{th}$ first input/output terminal 13 is connected to the capacitance $C_n$ at a circuit node denoted D, which is also coupled to the first input 78 of the corresponding single input amplification stage 77 via a resistance $R_{dn}$.

An example implementation of the single input amplification stage 77 includes a first operational amplifier OP1 having an inverting input coupled to the first input 78 at a circuit node denoted L. The non-inverting input of the first operational amplifier OP1 is coupled to ground via a pull down resistance $R_{xn}$. Optionally, a pull down capacitance $C_{xn}$ is connected in parallel across the pull down resistance $R_{xn}$. The output of the find, operational amplifier OP1 is connected to a circuit node denoted M which provides the amplified signal 20. A feedback resistance $R_{fn}$ and a feedback capacitance $C_{fn}$ are connected in parallel between the circuit nodes L and M, providing a feedback network for the first operational amplifier OP1.

Referring also to FIGS. 13 and 14, single input separation and amplification stages 76, 77 may be used for combined self-capacitance and pressure measurements using first or second touch sensors 4, 26.

Referring also to FIGS. 16 to 18, single input separation and amplification stages 76, 77 may be used for combined mutual-capacitance and pressure measurements using first or second touch sensors 4, 26.

Referring also to FIG. 19, single input separation and amplification stages 76, 77 may be used in touch panel systems including equal numbers of single input separation and amplification stages 76, 77.

Referring also to FIG. 20, single input separation and amplification stages 76, 77 may be used in touch panel systems including a first number of single input separation stages 76 and a second, lower, number M of single input amplification stages 77.

As already explained, the amplitude of capacitance measurement signals 21, for example capacitance drive and sense signals 33, 34, is substantially larger than the amplitude of piezoelectric signal $R_{d1}I_{piezo}(t)$. Differential amplification stages 71 are preferred, because using the reference path $R_{is}$-$C_{is}$ to provide a second input means that the pressure signal filter 16 must attenuate the amplitude of residual voltage fluctuations δV, which is considerably less than the full amplitude of capacitance measurement signals 21 such as $V_{self}(t)$ or $V_{Tx}(t)$. By contrast, using single input amplification stages 77, the pressure signal filter 16 must attenuate the full amplitude of the capacitance measurement signals 21. As a result, amplified signals 20 output by single input amplification stages 77 may include relatively more significant noise signals corresponding to capacitance measurements signals 21. Any remaining noise signals corresponding to the capacitance measurement signals 21 may be removed or compensated by digital signal processing in the pressure signal processing module 6 and/or in the processor 37 (FIG. 3).

Figure 22:
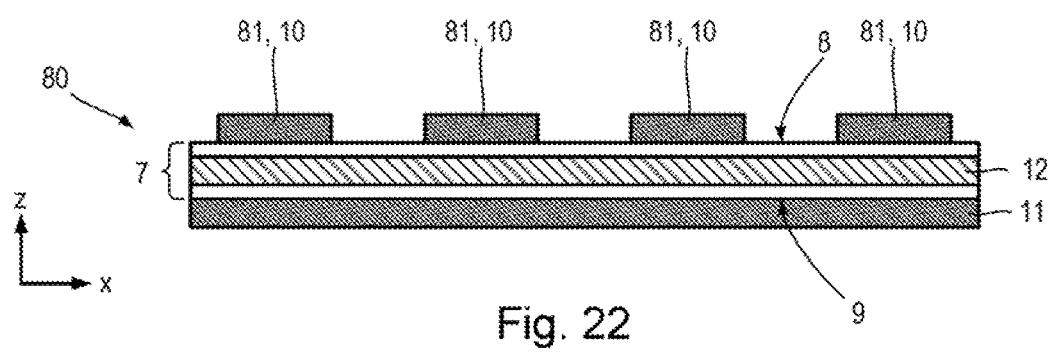
FIG. 22 shows a simplified cross-section of a fourth touch panel for combined capacitance and pressure measurements.
Figure 23:
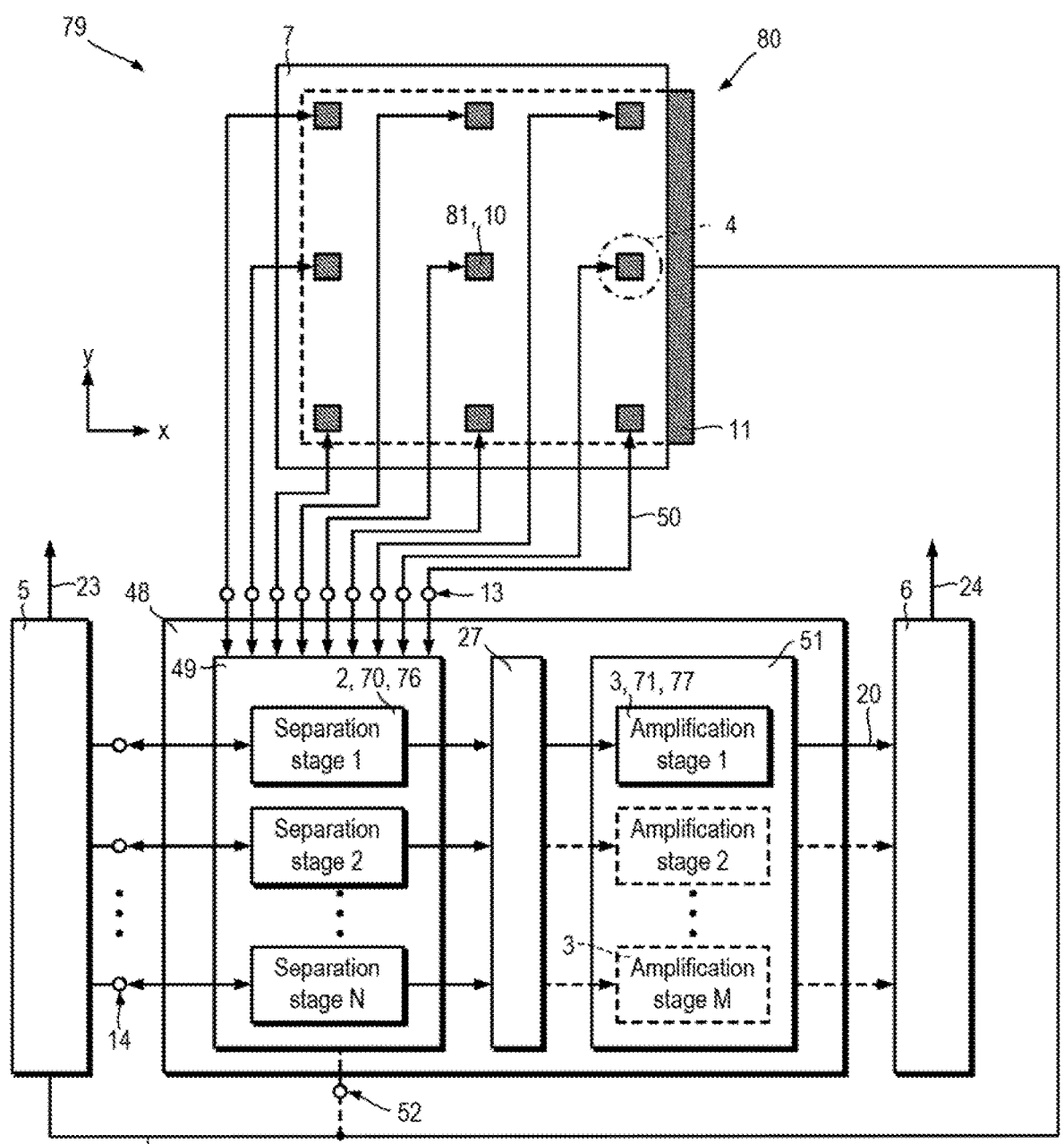
FIG. 23 illustrates a second touch panel system for combined capacitance and pressure measurements.

Second Touch Panel System:

FIGS. 22 and 23 illustrate a second touch panel system 70. Referring to FIGS. 1, 22 and 23, a second touch panel system 79 includes a fourth touch panel 80 and the third device 48. The fourth touch panel 80 includes a number of first sensing electrodes 10 in the form of discrete pads 81, each pad 81 connected to a corresponding first input/output terminal 13 of the third device 48 by a separate conductive trace 50. The fourth touch panel 80 includes the layer structure 7 incorporating a layer of piezoelectric material 12. The fourth touch panel 80 does not include the second layer structure 38 or any second sensing electrodes 31. The fourth touch panel maybe used with the third device 48 for combined self-capacitance and pressure measurements.

In the second touch panel system 79, the third device 48 may use separation and amplification stages 2, 3 in the form of differential separation and amplification stages 70, 71, or single input separation and amplification stages 76, 77. In the second touch panel system 79, the third device 48 may have equal numbers of separation and amplification stages 2, 3 (FIG. 19), or the third device may have a first number N of separation stages 2 and a second, lower, number M of amplification stages 3.

First Display Stack Up:

FIG. 24 illustrates a first stack-up 82. Referring to FIG. 24, a first stack-up 82 includes a cover lens 46 which is a transparent substrate extending in the first and second directions x, y and having upper and lower opposite faces with respect to the thickness direction z. The first stack-up 82 also includes a first dielectric layer 83 extending in the first and second directions x, y and having upper and lower opposite faces with respect to the thickness direction z. Second sensing electrodes 31 in the form of a set of conductive regions extending in the first direction x and spaced apart in the second direction y are disposed on the upper face of the first dielectric layer 83. The upper face of the first dielectric layer 83 is bonded to the lower face of the cover lens 46.

The first stack-up 82 also includes a second dielectric layer 84 extending in the first and second directions x, y and having upper and lower opposite faces with respect to the thickness direction z. First sensing electrodes 10 in the form of a set of conductive regions extending in the second direction y and spaced apart in the first direction x are disposed on the upper face of the second dielectric layer 84. The upper face of the second dielectric layer 84 is bonded to the lower face of the first dielectric layer 83.

The first slack-up 82 also includes a layer of piezoelectric material 12 extending in the first and second directions x, y and having upper and lower opposite faces with respect to the thickness direction z. A common electrode 11 in the form of a conductive material region is disposed on the lower face of the layer of piezoelectric material 12 such that, when assembled, the common electrode 11 at least partially overlaps each first and second sensing electrode 10, 31 region. The upper face of the layer of piezoelectric material 12 is bonded to the lower face of the second dielectric layer 84.

The first display stack-up 82 may be bonded overlying the display 42 of an electronic device 35 (FIG. 3). The elements of the first display stack-up 82 are stacked in the thickness direction z from the display 42 to the cover lens 46. The layer structure 7 includes the second dielectric layer 84 and the layer of piezoelectric material 12 and the second layer structure 28 includes the first dielectric layer 83.

The cover lens 46 is made of glass, or PET or any other substantially transparent material. The cover lens 46 may be up to about 20 mm thick and may be at least 0.05 mm thick. Preferably, the cover lens 46 is up to about 2 mm thick and may be at least 0.05 mm thick. The layer of piezoelectric material 12 is made of PVDF or any other substantially transparent piezoelectric material. The layer of piezoelectric material 12 may be poled before assembling the first stack-up 82. Alternatively, the layer of piezoelectric material 12 may be poled after assembling the first stack-up 82. The layer of piezoelectric material 12 may be up to about 110 μm thick, and may be at least 0.5 μm or at least 1 μm thick. The common electrode 11 and the first and/or second sensing electrodes 10, 31 may be used to produce a poling field. The dielectric layers 83, 84 may be PET or any other substantially transparent polymer. The dielectric layers 83, 84 may be between 10 μm and 100 μm thick, for example, around 20 to 25 μm thick. Preferably the dielectric layers 83, 84 are in the range of about 10-100 μm thick. The conductive regions providing the electrodes 10, 11, 31 may be ITO, IZO or any other substantially transparent conductive material. The conductive regions providing the electrodes 10, 11, 31 may be applied to the dielectric layers 83, 84 and/or the layer of piezoelectric material 12 using lithography, printing or other suitable methods. The shapes of the conductive regions providing the first, second and third electrodes 10, 11, 31 may be any suitable electrode shape described in relation to, for example, one of the first or second touch panels 36, 53. The sheet resistance of conductive regions providing electrodes may be between 1 and 300 Ω/sq. The sheet resistance may be below 10 Ω/sq. The resistance of an individual sensing electrode 10, 31 and connecting trace may be up to 5 kΩ or up to 10 kΩ.

The elements of the first display stack-up may be bonded together in any other sequence resulting in the same ordering of layers 83, 84, 12. In particular, the first and second dielectric layers 83, 84 and the layer of piezoelectric material 12 may be bonded together using continuous roll-to-roll production methods before being bonded to the cover lens 46. When the cover lens 46 is a flexible material, the first display stack-up 82 may be fabricated entirely using continuous roll-to-roll processes.

The first display stack-up 82 does not require complex patterning of the layer of piezoelectric material 12 or of electrodes 10, 11, 31 disposed on the layer of piezoelectric material 12. This allows fabrication of the first display stack-up to avoid complex multi-stage and/or duplex patterning of electrodes. As a result, fabrication of the first display stack-up 82 maybe fast, efficient and cheap.

Figure 25:
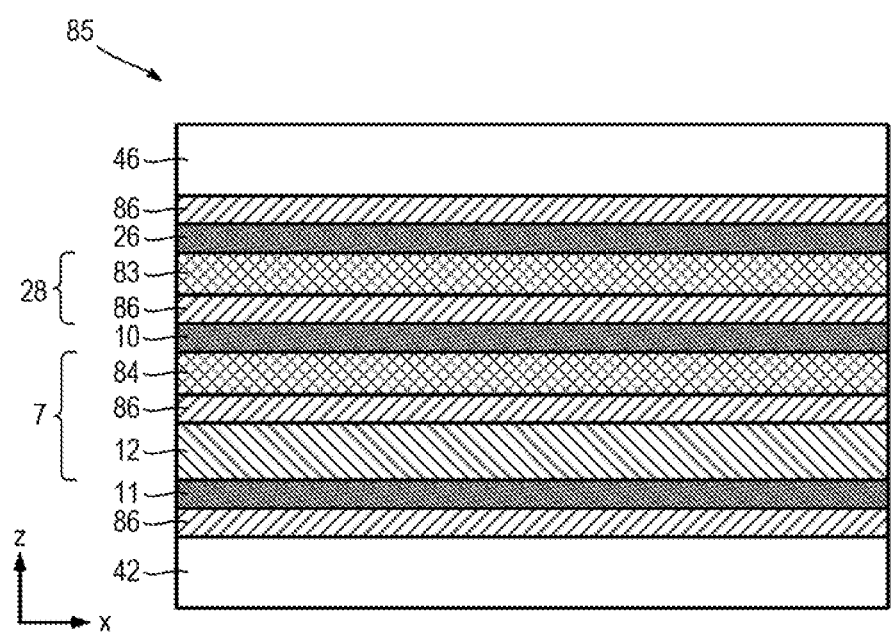

Second Display Stack Up:

FIG. 25 illustrates a second display stack-up 85. Referring also to FIG. 25, the second display stack-up 85 is the same as the first display stack-up 82, except that elements of the second display stack-up 85 are bonded to one another using layers of pressure sensitive adhesive (PSA) material 86 extending in the first and second directions x, y. For example, the cover lens 46 and the first dielectric layer 83 are arranged so that the lower face of the cover lens 46 is opposite to the upper face of the first dielectric layer 83 and separated by a layer of PSA 86. Pressure applied in the thickness direction z bonds the cover lens 46 and the first dielectric layer 83 together. Layers of PSA material 86 are used in the same way to bond the first and second dielectric layers 83, 84, to bond the second dielectric layer 84 to the layer of piezoelectric material 12 and to bond the second stack-up 85 overlying the display 42. Layers of PSA material 86 may be between 10 and 50 μm thick. Preferably, the layers of PSA material 86 are 25 μm thick.

The elements of the second display stack-up 85 are stacked in the thickness direction z from the display 42 to the cover lens 46. The layer structure 7 includes the second dielectric layer 84, the layer of piezoelectric material 12 and a layer of PSA material 86. The second layer structure 28 includes the first dielectric layer 83 and a layer of PSA material 86.

Figure 26:
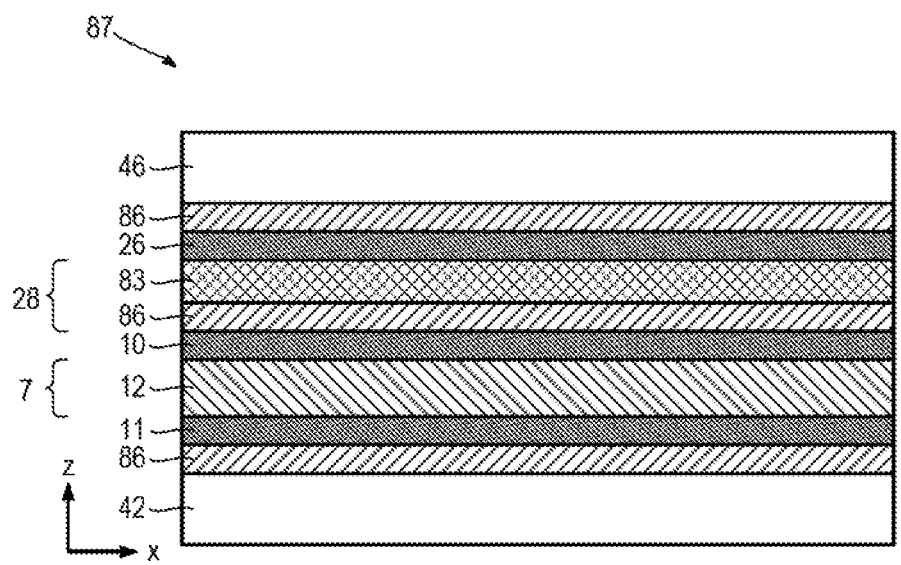

Third Display Stack-Up:

FIG. 26 illustrates a third display slack-up 87. Referring also to FIG. 26, a third display stack up 87 includes a cover lens 46 which is a transparent substrate extending in the first and second directions x, y and having upper and lower opposite faces with respect to the thickness direction z. A first dielectric layer 183 extends in the first and second directions x, y and has upper and lower opposite faces with respect to the thickness direction z. Second sensing electrodes 31 in the form of a set of conductive regions extending in the first direction x and spaced apart in the second direction y are disposed on the upper face of the first dielectric layer 83. The tipper face of the first dielectric Layer 83 is bonded to the lower face of the cover lens 46 using a layer of PSA material 86.

The third display stack up 87 also includes a layer of piezoelectric material 12 extending in the first and second directions x, y, and having upper and lower opposite faces with respect to the thickness direction z. First sensing electrode 10 in the form of conductive regions extending in a second direction y and spaced apart in the first direction x are disposed on the upper face of the layer of piezoelectric material 12. A common electrode u in the form of a conductive material region is disposed on the lower face of the layer of piezoelectric material 12 such that, when assembled, the common electrode 13 at least partially overlaps each of the first, and second sensing electrodes 10, 31. The upper face of the layer of piezoelectric material 12 may be bonded to the lower face of the first dielectric layer 83 using a layer of PSA material 86.

The third display stack up 87 may lie bonded overlying the display 42 using a layer of PSA material 86.

The elements of the third display stack-up 87 are stacked in the thickness direction z from the display 42 to the cover lens 46. The layer structure 7 includes the layer of piezoelectric material 12. The second layer structure 28 includes the first dielectric layer 83 and a layer of PSA material 86.

Figure 27:
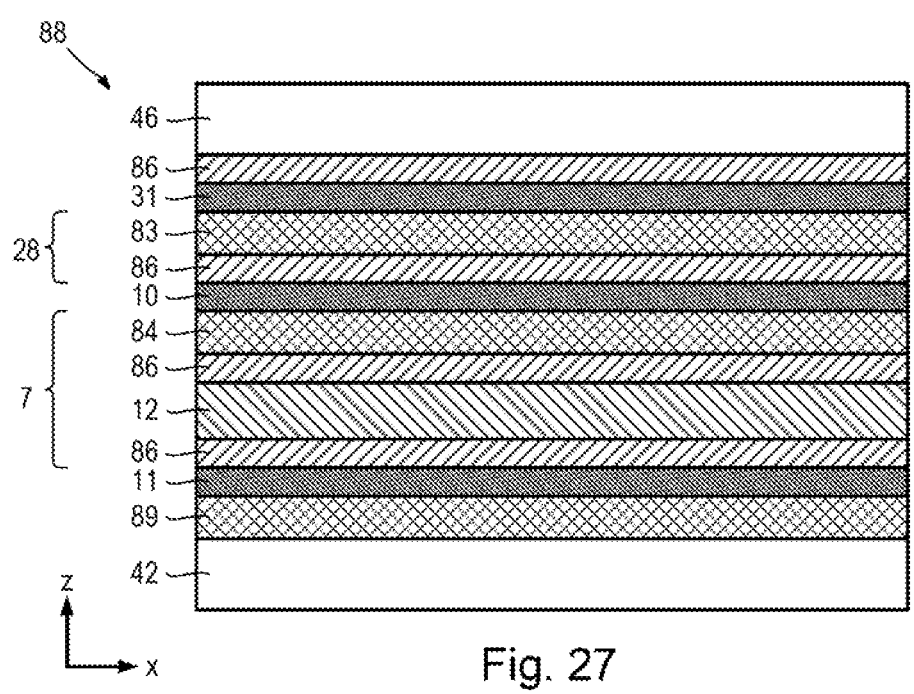

Fourth Display Stack-Up:

FIG. 27 illustrates a fourth display stack-up 88. Referring also to FIG. 27, a fourth display stack up 88 includes a cover lens 46 which is a transparent substrate extending in the first and second directions x, y and having upper and lower opposite faces with respect to the thickness direction z. The fourth display stack up 88 also includes a first dielectric layer 83 extending in the first and second directions x, y and having upper and lower opposite faces with respect to the thickness direction z. Second sensing electrodes 31 in the form of a set of conductive regions extending in the first direction x and spaced apart in the second direction y are disposed on tire upper face of the first dielectric layer 83. The upper face of the first dielectric layer 83 is bonded to the lower face of the cover lens 46 using a layer of PSA material 86.

The fourth display stack up 88 also includes a second dielectric layer 84 extending in the first and second directions x, y and having upper and lower opposite faces. First sensing electrodes 10 in the form of a set of conductive regions extending in the second direction y and spaced apart in the first direction x are disposed on the upper face of the second dielectric layer 84. The upper face of the second dielectric layer 84 is bonded to the lower face of the first dielectric layer 83 using a layer of PSA material 86.

The fourth display stack up 88 also includes a layer of piezoelectric material 12 extending in the first and second directions x, y and having upper and lower opposite faces. The upper face of the layer of piezoelectric material 12 is bonded to the lower face of the second dielectric layer 84 using a layer of PSA material 86.

The fourth display stack up 88 also includes a third dielectric layer 80 extending in the first and second directions x, y and having upper and lower opposite faces with respect to the thickness direction z. A common electrode 11 in the form of a conductive material region is disposed on the upper face of the third dielectric layer 89 such that, when assembled, the common electrode 11 at least partially overlaps each of the first and second sensing electrodes 10, 31. The third dielectric layer 89 is substantially the same as the first or second dielectric layers 83, 84. The upper face of the third dielectric layer 89 is bonded to the lower face of the layer of piezoelectric material 12 using a layer of PSA material 86.

The fourth display stack-up 88 may be bonded overlying the display 42 of an electronic device 35 (FIG. 3). The elements of the fourth display stack-up 88 are stacked in the thickness direction z from the display 42 to the cover lens 46. The layer structure 7 includes the second dielectric layer 84, the layer of piezoelectric material 12 and two layers of PSA material 86. The second layer structure 28 includes the first dielectric layer 83 and a layer of piezoelectric material 86.

In this way, the layer of piezoelectric material JO of the fourth display stack-up 88 does not have any electrodes disposed thereon. This simplifies the fabrication of the fourth stack-up 88 because processing steps to deposit electrodes on the layer of piezoelectric material 12 are not required. In a case when the layer of material 2 is PVDF, the fourth stack-up 88 can be fabricated by sandwiching a PVDF film providing the layer of piezoelectric material 12 between PET layers bearing patterned ITO electrodes, for example first and second dielectric layers 83, 84, and unpatterned ITO electrodes, for example the third dielectric layer 89. In this way, methods for manufacturing a regular projected capacitance touch panel may be quickly and easily adapted to allow production of combined pressure and capacitance touch panels.

Figure 28:
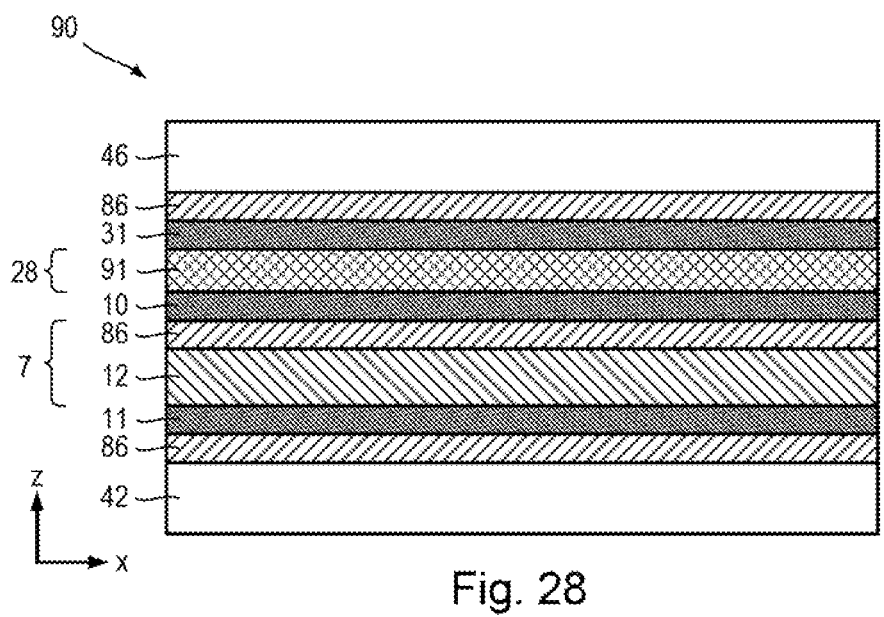

Fifth Display Stack-Up:

FIG. 28 illustrates a fifth display stack-up 90. Referring also to FIG. 28, a fifth display stack up 88 includes a cover lens 46, which is a transparent substrate extending in the first and second directions x, y and having upper and lower opposite faces with respect to the thickness direction z. The fifth display stack up 88 also includes a fourth dielectric layer 91 extending in the first and second directions x, y and having upper and lower opposite faces with respect to the thickness direction z. Second sensing electrodes 31 in the form of a set of conductive regions extending in the first direction x and spaced apart in the second direction y are disposed on the upper face of the fourth dielectric layer 91. First sensing electrodes 10 in the form of a set of conductive regions extending in the second direction y and spaced apart in the first direction x are disposed on the lower face of the fourth dielectric layer 91. The upper face of the fourth dielectric layer 91 is bonded to the lower face of the cover lens 46 using a layer of PSA material 86. The fourth dielectric layer 91 is substantially the same as the first, second or third dielectric layers 83, 84, 89.

The fifth display stack up 88 also includes a layer of piezoelectric material 12 extending in the first and second directions x, y and having upper and lower opposite faces. A common electrode 11 in the form of a conductive material region is disposed on the lower face of the layer of piezoelectric material 12 such that, when assembled, the common electrode 11 at least partially overlaps each of the first and second sensing electrodes 10, 31. The upper face of the layer of piezoelectric material 12 is bonded to the lower face of the fourth dielectric layer 91 using a layer of PSA material 86.

The fifth display stack-up 90 may be bonded overlying the display 42 of an electronic device 35 FIG. 3) using a layer of PSA material 86. The elements of the fifth display stack-up 90 are sacked in the thickness direction z from the display 42 to the cover lens 46. The layer structure 7 includes the layer of piezoelectric material 12 and a layer of PSA material 86. The second layer structure 28 includes the fourth dielectric layer 91.

The common electrode 11 need not be disposed on the layer of piezoelectric material 12. Alternatively, the fifth display stack-up 90 may include the third dielectric layer 89 with the upper face of the third dielectric layer 89 bonded to the lower face of the layer of piezoelectric material 12 using a layer of PSA material 86.

Figure 29:
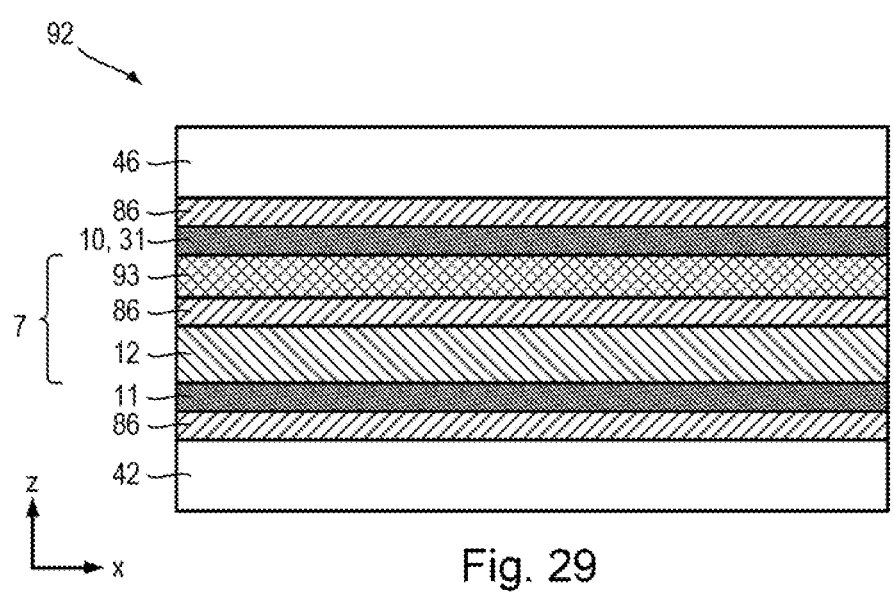

Sixth Display Stack-Up:

FIG. 29 illustrates a sixth display stack-up 92. Referring also to FIG. 29, a sixth display stack up 92 includes a cover lens 46 which is a transparent substrate extending in the first and second directions x, y and having upper and lower opposite faces with respect to the thickness direction. The sixth display stack up 92 also includes a fifth dielectric layer 93 extending in the first and second directions x, y and having upper and lower opposite faces with respect to the thickness direction z. Second sensing electrodes 26 in the form of a set of conductive regions extending in the first direction x and spaced apart in the second direction y are disposed on the upper face of the fifth dielectric layer 93. First sensing electrodes 10 in the form of a set of conductive regions extending, in the second direction y and spaced apart in the first direction x are disposed on the upper face of the fifth dielectric layer 93. The upper face of the fifth dielectric layer 93 is bonded to the lower face of the cover lens 46 using a layer of PSA material 86. The fifth dielectric layer 93 is substantially the same as the first, second, third or fourth dielectric layers 83, 84, 89, 91. Each first sensing electrode 10 is a continuous conductive region and each second sensing electrode 31 is made up of a number of separate conductive regions connected by jumpers 100. Each juniper spans a portion of a conductive region belonging to a first sensing electrode 10. The first and second sensing electrodes 10, 31 may be substantially the same as the first and second sensing electrodes 10, 31 of the third touch panel 58.

The sixth display stack up 92 also includes a layer of piezoelectric material 12 extending in the first and second directions x, y and having upper and lower opposite faces with respect to the thickness direction Z. A common electrode 11 in the form of a conductive material region is disposed on the lower face of the layer of piezoelectric material 12 such that, when assembled, the common electrode it at least partially overlaps each of the first and second sensing electrodes 31. The upper face of the layer of piezoelectric material 12 is bonded to the lower face of the fifth dielectric layer 93 using a layer of PSA material 86.

The sixth display stack-up 92 may be bonded overlying the display 42 of an electronic device 35 (FIG. 3) using a layer of PSA material 88. The elements of the sixth display stack-up 92 are stacked in the thickness direction z from the display 42 to the cover lens 46. The layer structure 7 includes the layer of piezoelectric material 12, a layer of PSA material 86 and the fifth dielectric layer 93.

The common electrode it need not be disposed on the layer of piezoelectric material 12. Alternatively, the sixth display stack-up 92 may include the third dielectric layer 89 with the upper face of the third dielectric layer 89 bonded to the lower face of the layer of piezoelectric material 12 using a layer of PSA material 86.

Figure 30:
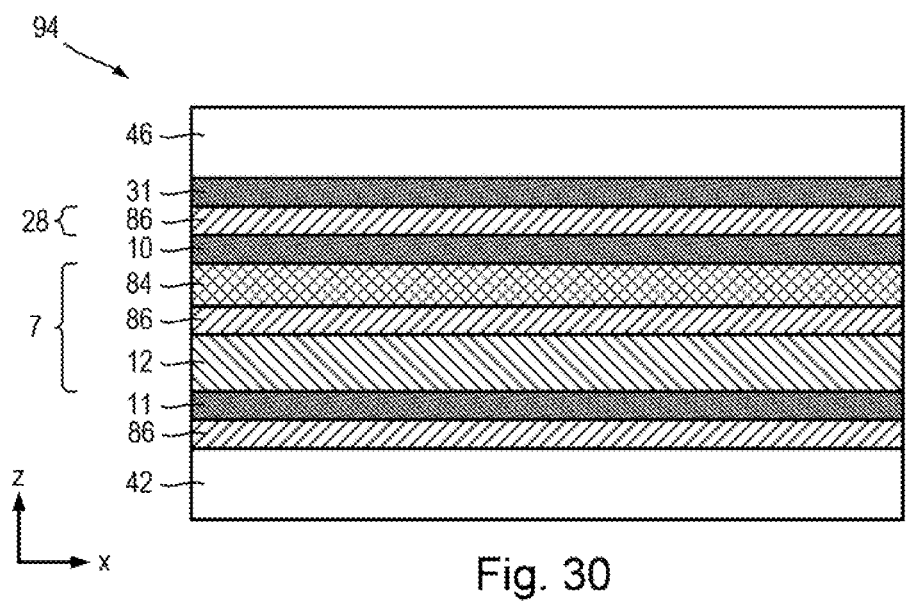

Seventh Display Stack Up:

FIG. 30 illustrates a seventh display stack-up 94. Referring also to FIG. 30, a seventh display stack up 94 includes a cover lens 46 which is a transparent substrate extending in the first and second directions y and having upper and lower opposite faces with respect to the thickness direction z. Second sensing electrodes 31 in the form of a set of conductive regions extending in the first direction x and spaced apart in the second direction y are disposed on the lower face of the cover lens 46.

The seventh display stack up 94 also includes the second dielectric layer 84 extending in the first and second directions x, y and having upper and lower opposite faces with respect to the thickness direction z. First sensing electrodes 10 in the form of a set of conductive regions extending in the second direction y and spaced apart in the first direction x are disposed on the upper face of the second dielectric layer 84. The upper face of the second dielectric layer 84 is bonded to the lower face of the cover lens 46 using a layer of PSA material 86.

The seventh display stack up 94 also includes a layer of piezoelectric material 12 extending in the first and second directions y and having upper and lower opposite faces with respect to the thickness direction z. A common electrode 11 in the form of a conductive material region is disposed on the lower face of the layer of piezoelectric material 12 such that, when assembled, the common electrode 11 at least partially overlaps each of the first and second sensing electrodes 10, 31. The upper face of the layer of piezoelectric material 12 is bonded to the lower face of the second dielectric layer 84 using a layer of PSA material 86.

The seventh display stack-up 94 may be bonded overlying the display 42 of an electronic device 35 (FIG. 3) using a layer of PSA material 86. The elements of the seventh display stack-up 94 are stacked in the thickness direction z from the display 42 to the cover lens 46. The layer structure 7 includes the layer of piezoelectric material 12, a layer of PSA material 86 and the second dielectric layer 84. The second layer structure 28 includes a layer of PSA material 86.

The common electrode it need not be disposed on the layer of piezoelectric material 12. Alternatively, the seventh display stack-up 94 may include the third dielectric layer 89 with the upper face of the third dielectric layer 89 bonded to the lower face of the layer of piezoelectric material 12 using a layer of PSA material 86.

Figure 31:
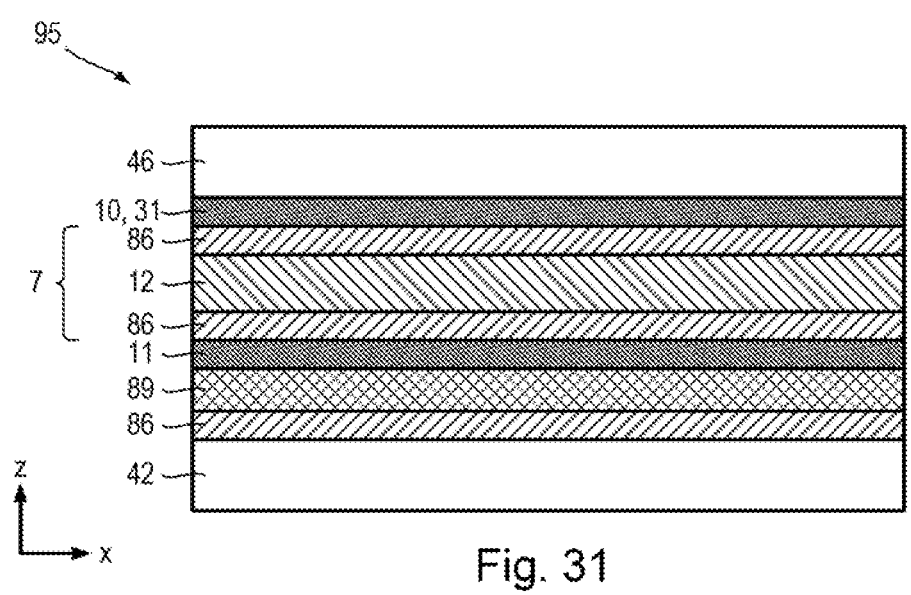

Eighth Display Stack-Up:

FIG. 31 illustrates an eighth display stack-up 95. Referring also to FIG. 31, an eighth display stack up 95 includes a cover lens 46 which is a transparent substrate extending in the first and second directions x, y and having upper and lower opposite faces with respect to the thickness direction z. Second sensing electrodes 31 in the form of a set of conductive regions extending in the first direction x and spaced apart in the second direction y are disposed on the lower face of the cover lens 46. First sensing electrodes 10 in the form of a set of conductive regions extending in the second direction y and spaced apart in the first direction x are disposed on the lower face of the cover lens 46. Each first sensing electrode 10 is a continuous conductive region and each second sensing electrode 31 is made up of a number of separate conductive regions connected by jumpers 100. Each jumper spans a portion of a conductive region belonging to a first sensing electrode 10. The first and second sensing electrodes 10, 31 may be substantially the same as the first and second sensing electrodes 10, 31 of the third touch panel 58.

The eighth display stack up 95 also includes a layer of piezoelectric material 12 extending in the first and second directions x, y and having upper and lower opposite faces with respect to the thickness direction. The upper face of the layer of piezoelectric material 12 is bonded to the lower face of the cover lens 46 using a layer of PSA material 86.

The eighth display stack up 95 also includes a third dielectric layer 89 extending in the first and second directions x, y and having upper and lower opposite faces. A common electrode 11 in the form of a conductive material region is disposed on the upper face of the third dielectric layer 89 such that, when assembled, the common electrode 11 at least partially overlaps each of the first and second sensing electrodes 10, 31. The upper face of the third dielectric layer 89 is bonded to the lower face of the layer of piezoelectric material 12 using a layer of PSA material 86.

The eighth display stack-up 95 may be bonded overlying the display 42 of an electronic device 35 (FIG. 3) using a layer of PSA material 86. The elements of the eighth display stack-up 95 are stacked in the thickness direction z from the display 42 to the cover lens 46. The layer structure 7 includes the layer of piezoelectric material 12 and two layers of PSA material 86.

First Embedded Stack-Up:

The first to eighth display stack-ups 82, 85, 87, 88, 90, 92, 94, 95 are intended to overlie the display 42 of an electronic device 35 (FIG. 3). However, a touch panel 36, 53, 58 for use with the third device 48 for combined capacitance and pressure measurements may alternatively be integrated into a display 42 such as, for example, an LCD display, an OLED display, a plasma display or an electrophoretic display.

Figure 32:
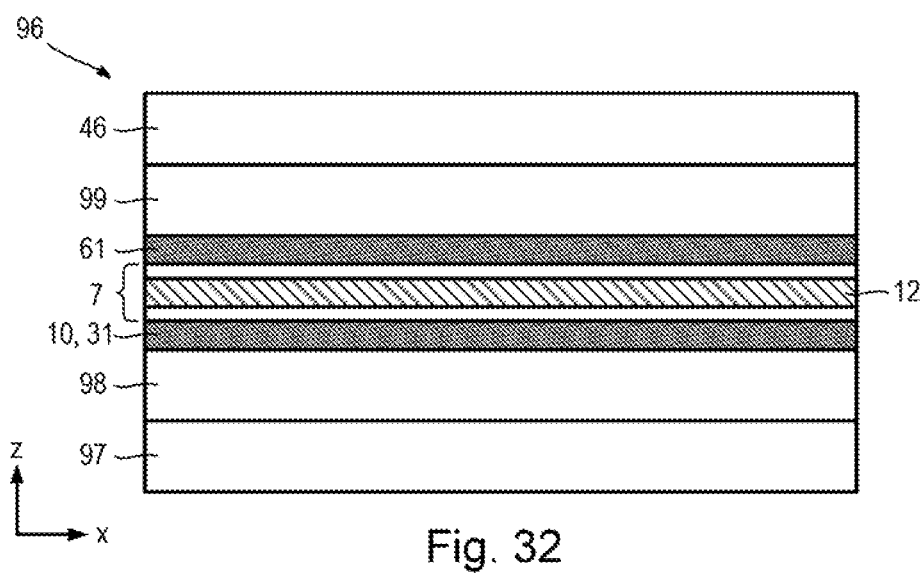
FIGS. 32 to 39 show simplified cross-sections of first to eighth embedded stack-ups for providing touch panels for combined capacitance and pressure measurements.

FIG. 32 shows a first embedded stack-up 96. Referring also to FIG. 32, a first embedded stack-up 96 includes a pixel array 97 of display 42, a colour filter glass 98 first and second sensing electrodes 10, 31, a layer structure 7, a patterned common electrode 61, a polariser 99 and a cover lens 46 stacked in the thickness direction from the pixel array 97 to the cover lens 46. The first and second sensing electrodes 10, 31 may be disposed on the same surface in substantially the same way as the third touch panel 58.

In this way, the first embedded stack-up 96 can be used with the third device 48 to provide a touch panel with combined capacitive and pressure sensing embedded within an LCD display. This may allow the total thickness of the display 42 and touch panel to be reduced compared to a touch panel overlying the display 42.

Using patterned common electrode 61 may help to prevent the common electrode 61 from screening the capacitive coupling between a user's digit and/or conductive stylus and the first and second sensing electrodes 10, 31.

Figure 33:
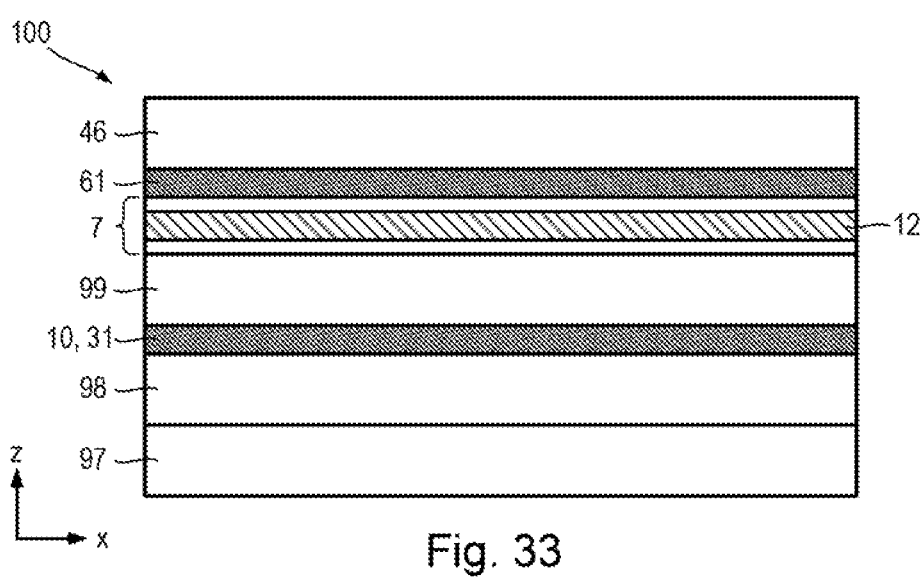

Second Embedded Stack-Up:

FIG. 33 shows a second embedded stack-up 100. Referring also to FIG. 33, a second embedded stack-up 101 includes a pixel array 97 display 42, a colour filter glass 98, first and second sensing electrodes 10, 31, a polariser 99, a layer structure as patterned common electrode 61 and a cover lens 46 stacked in the thickness direction from the pixel array 97 to the cover lens 46. The first and second sensing electrodes 10, 31 may be disposed on the same surface in substantially the same way as the third touch panel 58.

Figure 34:
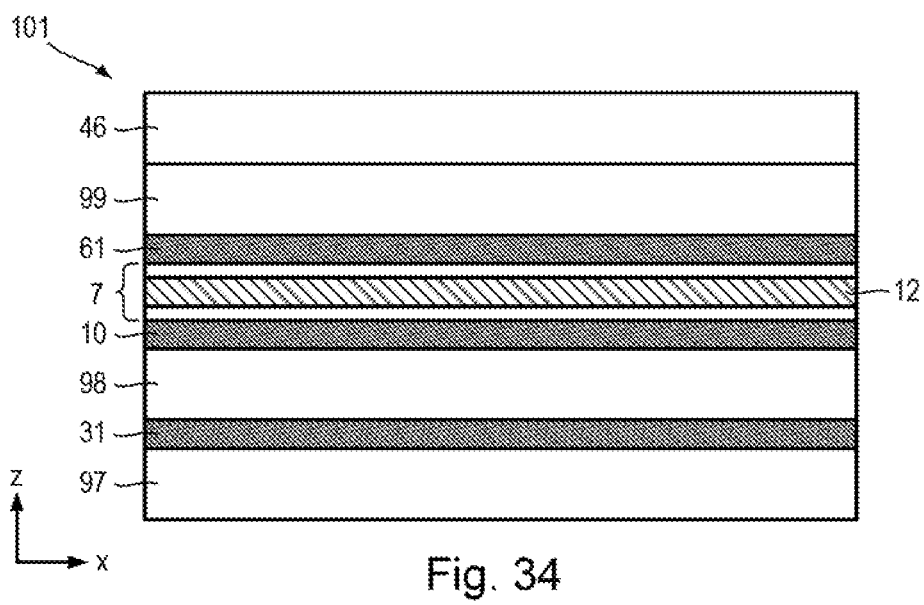

Third Embedded Stack-Up:

FIG. 34 shows a third embedded stack-up 101. Referring also to FIG. 34, a third embedded stack-up 101 includes a pixel array 97 of a display 42, second sensing electrodes 31, a colour filter glass 98, first sensing electrodes 10, a layer structure 7, a patterned common electrode 61, a polariser 99 and a cover lens 46 stacked in the thickness direction from the pixel array 97 to the cover lens 46. The first and second sensing electrodes 10, 31 are disposed on opposite sides of the colour filter glass 98 instead of being separated by a second layer structure 28.

Figure 35:
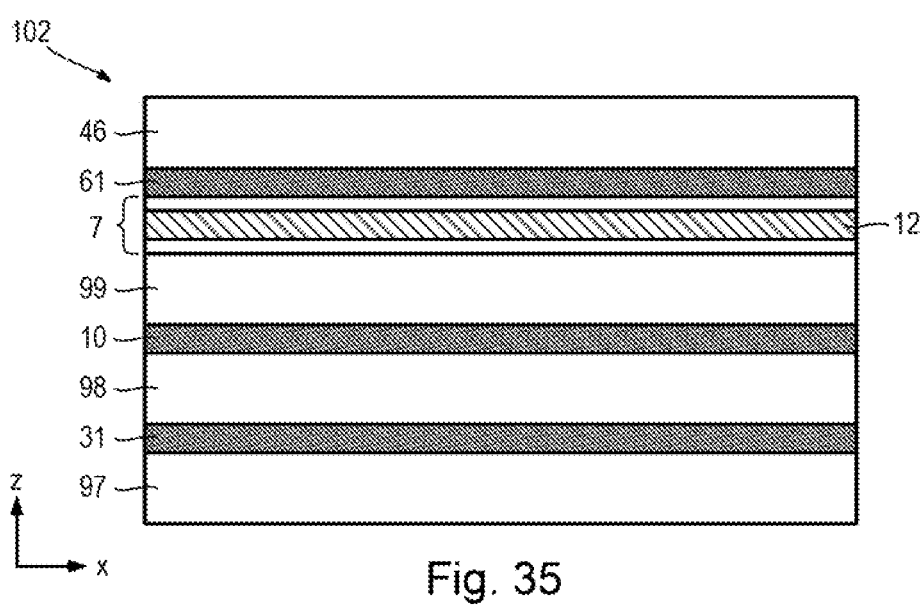

Fourth Embedded Stack-Up:

FIG. 35 shows a fourth embedded stack-up 102. Referring also to FIG. 35, a fourth embedded stack-up 102 includes a pixel array 97 of a display 42, second sensing electrodes 31, a colour filter glass 98, first sensing electrodes 10, a polariser 99, a layer structure 7, a patterned common electrode 61 and a cover lens 46 stacked in the thickness direction from the pixel array 120 to the cover lens 77. The first and second sensing electrodes 10, 31 are disposed on opposite sides of the colour filter glass 98 instead of being separated by a second layer structure 28.

Figure 36:
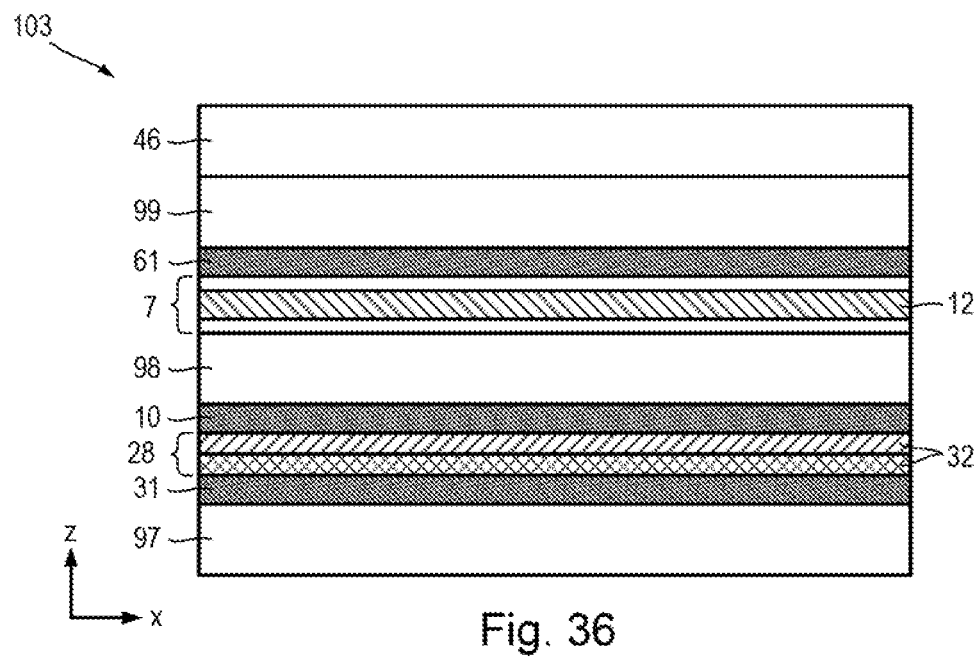

Firth Embedded Stack-Up:

FIG. 36 shows a fifth embedded stack-up 103. Referring also to FIG. 36, a fifth embedded stack-up 103 includes a pixel array 97 of a display 42, second sensing electrodes 31, a second layer structure 28, first sensing electrodes 10, a colour filter glass 98, a layer structure 7, a patterned common electrode 61, a polariser 99 and a cover lens 46 stacked in the thickness direction from the pixel array 97 to the cover lens 46. The first and second sensing electrodes 10, 31 are separated by the second dielectric layer 28.

Figure 37:
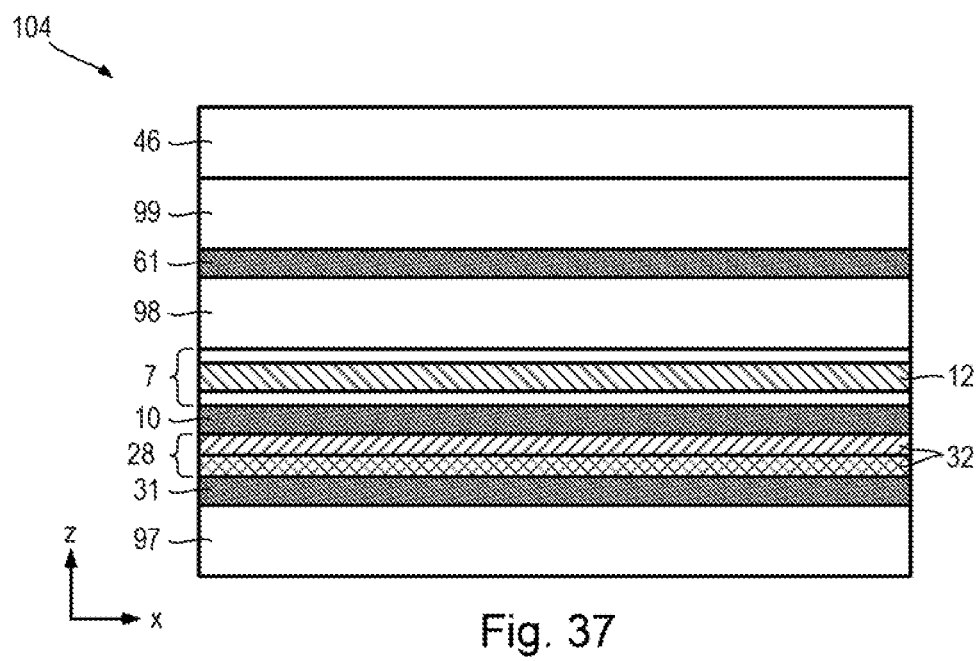

Sixth Embedded Stack-Up:

FIG. 37 shows a sixth embedded stack-up 104. Referring also to FIG. 37, a sixth embedded stack-up 104 includes a pixel array 97 of a display 42, second sensing electrodes 31, a second layer structure 28, first sensing electrodes 10, a layer structure 7, a colour filter glass 98, a patterned common electrode 61, a polariser 99 and a cover lens 46 stacked in the thickness direction from the pixel array 97 to the cover lens 46. The first and second sensing electrode 10, 31 are separated by the second dielectric layer 28.

Figure 38:
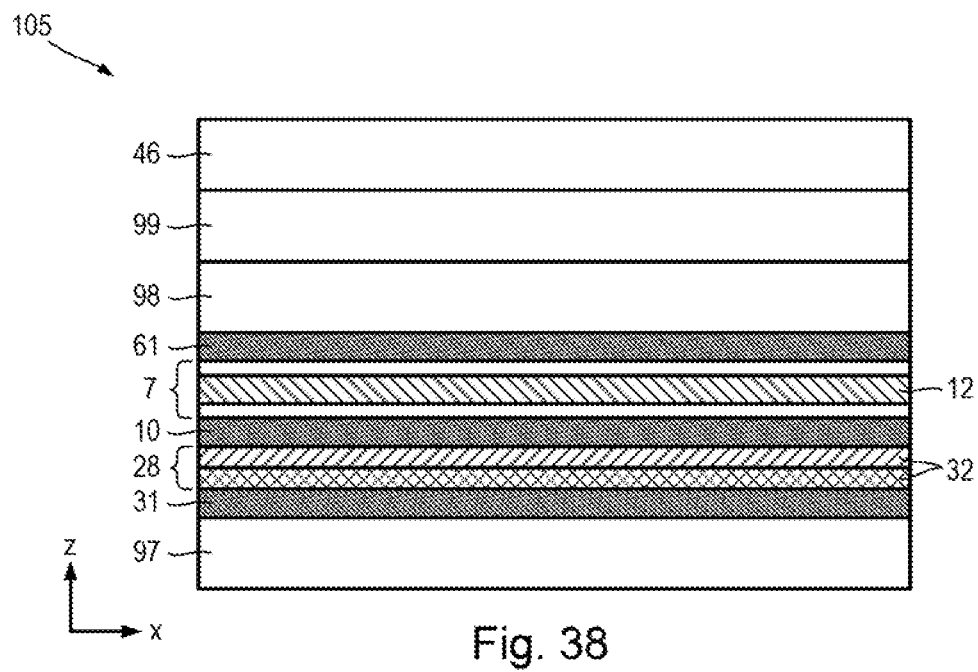

Seventh Embedded Stack-Up:

FIG. 38 shows a seventh embedded stack-up 105. Referring also to FIG. 38, a seventh embedded stack-up 105 includes a pixel array 97 of a display 42, second sensing electrodes 31, a second layer structure 28, first sensing electrodes 10, a layer structure 7, a patterned common electrode 61, a colour filter glass 98, a polariser 99 and a cover lens 46 stacked in the thickness direction from the pixel array 97 to the cover lens 46. The first and second sensing electrode 10, 31 are separated by the second dielectric layer 28.

Figure 39:
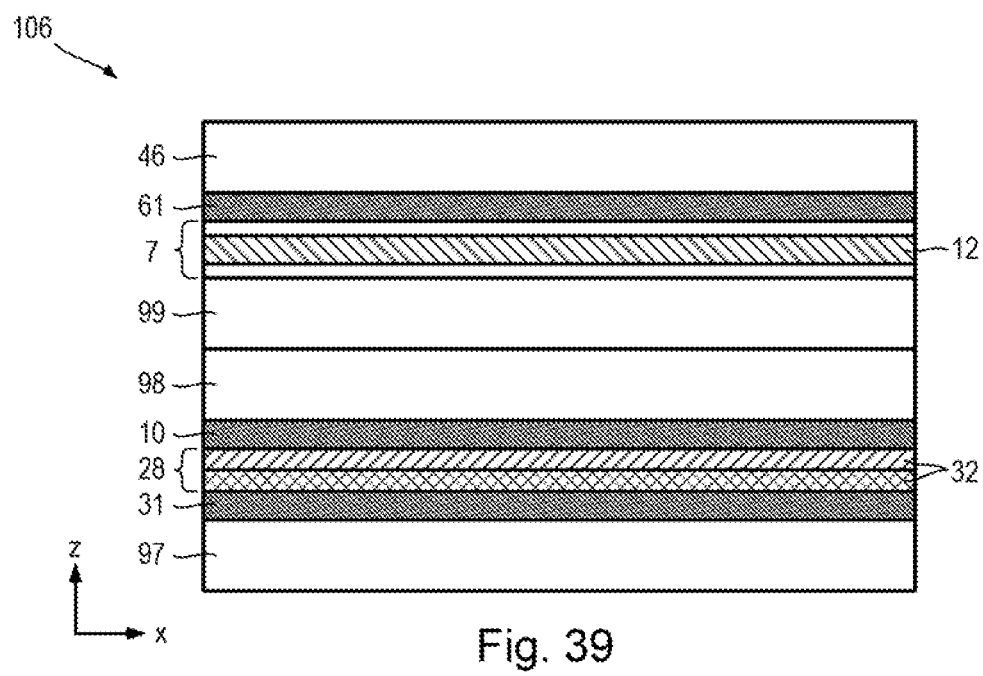

Eighth Embedded Stack-Up:

FIG. 39 shows an eighth embedded stack-up 106. Referring also to FIG. 39, an eighth embedded stack-up 106 includes a pixel array 97 of a display 42, second sensing electrodes 31, a second layer structure 28, first sensing electrodes 10, a colour filter glass 98, a polariser 99, a layer structure 7, a patterned common electrode 61 and a cover lens 46 stacked in the thickness direction from the pixel array 97 to the cover lens 46. The first and second sensing electrode 10, 31 are separated by the second dielectric layer 28.

In the first to eighth embedded stack-ups 96, 100, 101, 102, 103, 104, 105, 106 the first and second sensing electrodes 10, 31 and the patterned common electrode 61 may be disposed on the surfaces of adjacent elements disposed above or below with respect to the thickness direction z. Alternatively, the first and second sensing electrodes 10, 31 and the patterned common electrode 61 may be disposed on the surfaces of additional dielectric layers similar to the first, second, third, fourth and fifth dielectric layers 83, 84, 89, 91, 93. A patterned common electrode 61 need not be used and an unpatterned common electrode 11 may be used instead provided that capacitive coupling between a user's digit and/or conductive stylus and the first and/or second sensing electrodes 10, 31 is not excessively screened. Additional PSA layers 86 may be used to bond one or more layers of the first to eighth embedded stack-ups 96, 100, 101, 102, 103, 104, 105, 106.

Modifications

It will be appreciated that many modifications may be made to the embodiments hereinbefore described. Such modifications may involve equivalent and other features which are already known in the design, manufacture and use of capacitive touch panels and which may be used instead of or in addition to features already described herein. Features of one embodiment may be replaced or supplemented by features of another embodiment. For example, features of one display stack-up or embedded display stack-up may be replaced or supplemented by features of other display stack-ups and/or other embedded display stack-ups.

Figure 40:
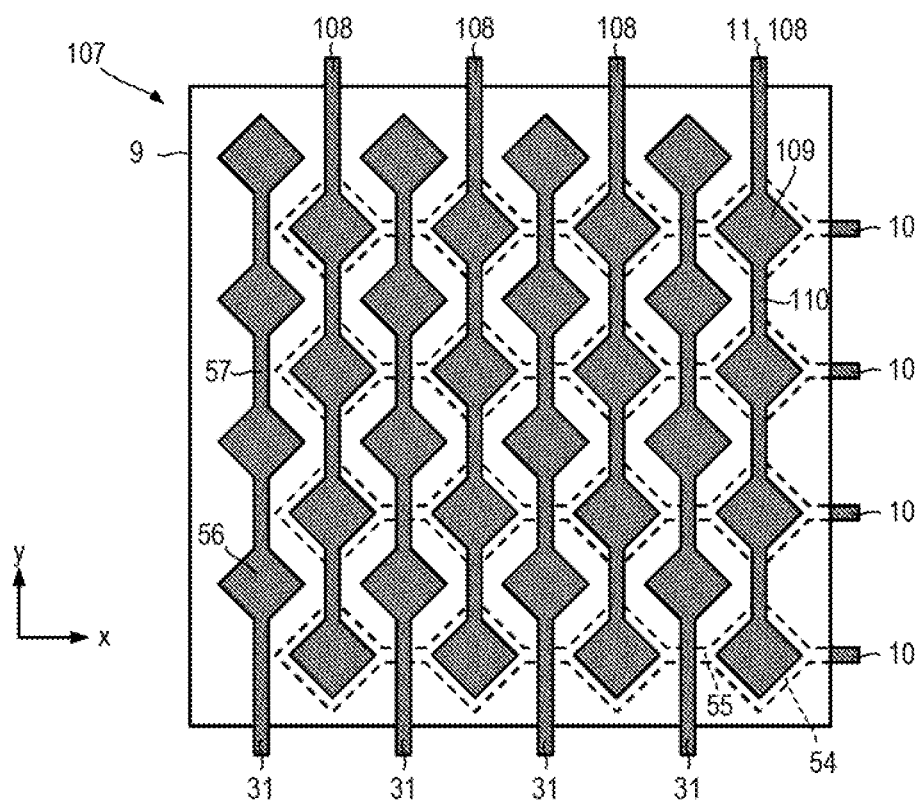
FIG. 40 is a plan view of an arrangement of electrodes for a fifth touch panel for combined capacitive and pressure sensing.
Figure 41:
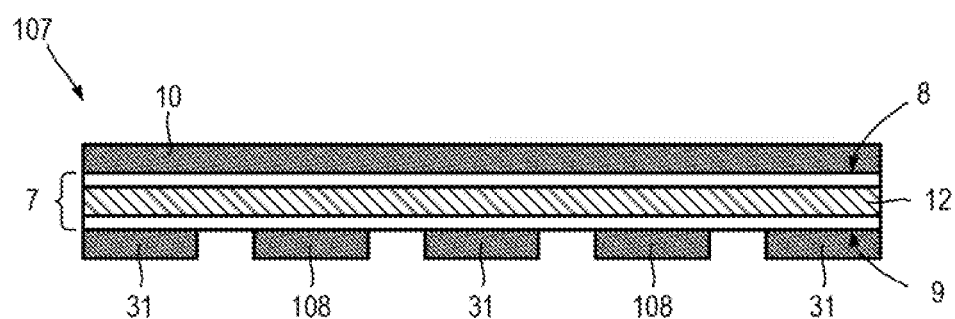
FIG. 41 is a cross-sectional view of the touch panel shown in FIG. 40.

Touch panels have been described in which first and second sensing electrodes 10, 31 are separated from a common electrode 11, 61 by the layer structure 7. However, other arrangements are possible. Referring to FIGS. 40 and 41, a fifth touch panel 107 includes a layer structure 7, a plurality of first sensing electrodes 10 disposed on live first face 8 of the layer structure 7, a plurality of second sensing electrodes 31 disposed on the second face 9 of the layer structure 7 and a plurality of common electrodes 11 disposed on the second face 9 of the layer structure 7 in the form of a plurality of separated common electrodes 108.

The first sensing electrodes 10 extend in the first direction x and are spaced apart in the second direction y. The second sensing electrodes 31 extend in the second direction y and are spaced apart in the first direction x. The separated common electrodes 108 extend in the second direction y and are spaced apart in the first direction x. The separated common electrodes 108 and the second sensing electrodes 31 are interleaved and do not contact one another. The separated common electrodes 108 and second sensing electrodes 31 maybe read using conductive traces (not shown) which exit the fifth touch panel 107 on different edges. Each first sensing electrode 10 may take the form of several pad segments 54 evenly spaced in the first direction x and connected to one another in the first direction x by relatively narrow bridging segments 55. Similarly, each second sensing electrode 31 may include several pad segments 56 evenly spaced in the second direction y and connected to one another in the second direction y by relatively narrow bridging segments 57. The pad segments 54 of the first sensing electrodes 10 may be diamond shaped. The pad segments 56 and bridging segments 57 of the second sensing electrodes 31 may have the same respective shapes and widths as the first sensing electrodes 10. Each separated common electrode 108 may include several pad segments 109 evenly spaced in the second direction y and connected to one another in the second direction y by relatively narrow bridging segments 110. The pad segments 109 and bridging segments 110 of the separated common electrodes 108 may have the same respective shapes and widths as the first and second sensing electrodes 10, 31. Alternatively, the pad segments 54 of the first sensing electrodes 10 may be larger or smaller than the pad segments 109 of the separated common electrodes 108.

The first sensing electrodes 10 and the second sensing electrodes 31 are arranged such that the bridging segments 57 of the second sensing electrodes 31 overlie the bridging segments 55 of the first sensing electrodes 10. The first sensing electrodes 10 and the second sensing electrodes 31 are arranged such that the respective pad segments 54, 56 do not overlap. Instead, the separated common electrodes 108 are arranged such that the pad segments 109 of the separated common electrodes 108 overlap the pad segments 54 of the first sensing electrodes 8. The pad segments 54, 56, 109 need not be diamond shaped, and may instead be circular. The pad segments 54, 56, 109 may be a regular polygon such as a triangle, square, pentagon or hexagon.

The fifth touch panel 107 may be used in, for example, the first touch panel system 47 to measure mutual capacitance between a pair of first and second sensing electrodes 10, 31. The separated common electrodes 108 may be coupled to each another, for example using external traces (not shown) and addressed collectively to measure pressure values between each first sensing electrode 10 and the separated common electrodes 108. Alternatively, the separated common electrodes 108 may be individually addressable to measure pressure values using a pair of first and separated common electrodes 10, 108.

The first to eighth display stack ups 82, 85, 87, 88, 90, 92, 94, 95 or the first to eighth embedded stack-ups 96, 100, 101, 102, 103, 104, 105, 106 maybe adapted to incorporate the fifth touch panel 107, or elements of the fifth touch panel 107 such as, for example, disposing the second sensing electrodes 31 on the same surface as the separated common electrodes 108. The separated common electrodes 108 need not be disposed on the same surface as the second sensing electrodes 31, and may alternatively be disposed on the same surface of the layer structure 7 as the first sensing electrodes 10.

Touch panels and stack-ups have been described which are generally planar. However, touch panels and stack-ups need not be planar or flat and may provide curved or other non-planar surfaces for a user to interact with. Touch panels and stack-ups may be provided overlying or embedded within curved displays.

The pressure signal processing module 6, capacitive touch controller 5 and/or the processor 37 may employ correlated double sampling methods to improve the signal to noise ratio of the pressure values 24 and/or the capacitance values 23. The pressure signal processing module 6, capacitive touch controller 5 and/or the processor 37 may process the pressure values 24 and/or the capacitance values 23 as image data.

Touch sensors 4, 26 and touch panels 36, 53, 58, 80 have been generally described in relation to first, second and third (thickness) directions x, y, z forming an orthogonal set. However, the first and second directions need not be perpendicular and may in general intersect at any angle between 1 degree and 90 degrees. Intersection of the first and second directions at 90, 60, 45 or 30 degrees is preferred.

Examples Omitting the Common Electrode:

The examples described hereinbefore have included a common electrode 11, 61, 108. However, a common electrode 11, 61, 108 is not essential, and in other examples the common electrode 11, 61, 108 may be omitted.

Figure 42:
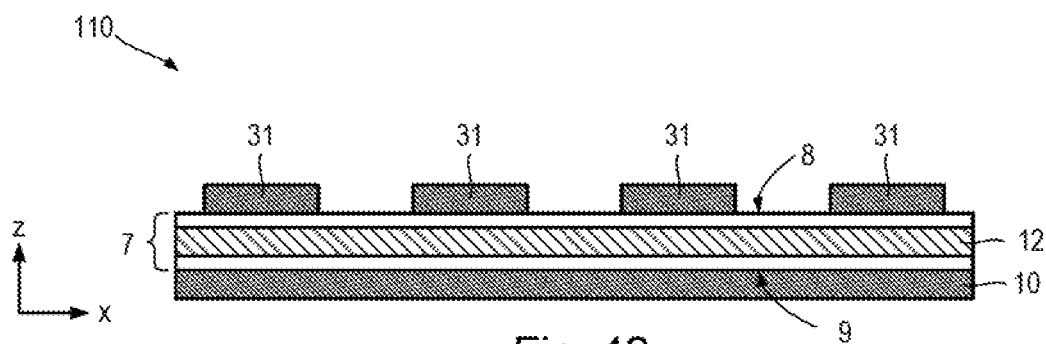
FIG. 42 shows a simplified cross-section of a sixth touch panel for combined capacitance and pressure measurements.
Figure 43:
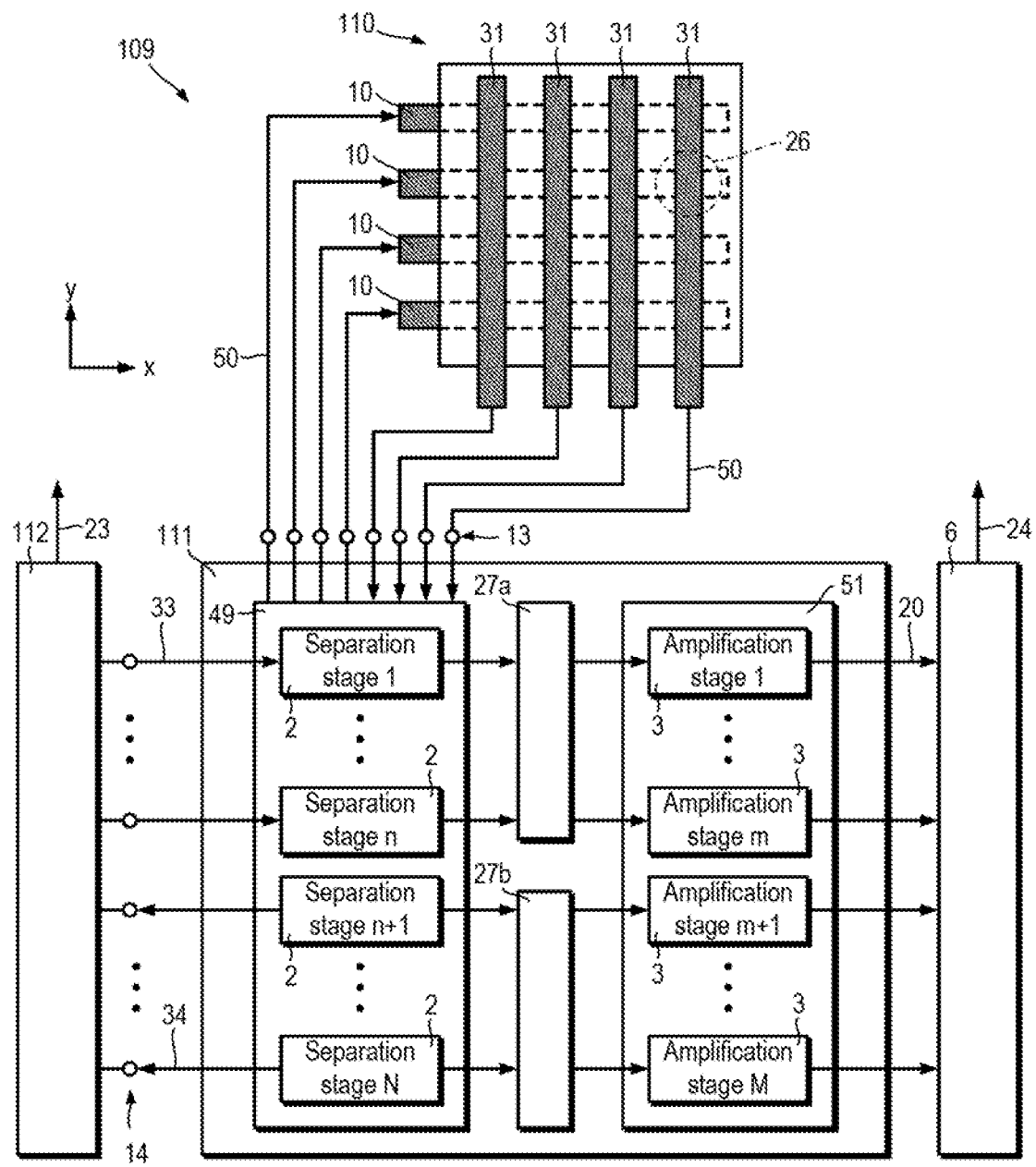
FIG. 43 illustrates a third touch panel system for combined capacitance and pressure measurements.

For example, referring also to FIGS. 42 and 43, a third touch panel system 109 is shown. The third touch panel system 109 includes a sixth touch panel 110, a fourth device m for combined capacitance and pressure measurements, a mutual capacitance touch controller 112 and the pressure signal processing module 6.

Referring in particular to FIG. 42, the sixth touch panel 110 is similar to the first touch panel 36, and differs in that the second layer 28 and common electrode 11 are omitted. Instead, in the sixth touch panel 110, the first sensing electrodes 10 are disposed on the second face 9 of the first layer structure 7 and the second sensing electrodes 31 are disposed on the first face 8 of the first layer structure 7. In this way, charges generated from straining of the layer of piezoelectric material 12 may be detected between the first and second sensing electrodes 10, 31, without the use of a common electrode 11, 61, 108.

Alternatively, the first sensing electrodes 10 may be disposed on the first face 8 of the first layer structure 7 and the second sensing electrodes 31 may be disposed on the second face 9 of the first layer structure 7

The fourth device m is similar to the third device 48, and differs in that the fourth device 111 is intended for use with the mutual capacitance touch controller 112. The mutual capacitance touch controller 112 is configured to drive the first sensing electrodes 10 as drive electrodes (Tx) using capacitance drive signals 33, and to receive capacitance sense signals 34 via the second sensing electrodes 31 as receiving (Rx) electrodes. The roles of the first and second sensing electrodes 10, 31 may be reversed. The signal separation section 49 of the fourth device m includes a total of N separation stages 2, including a number n of separation stages 2 through which capacitance drive signals 33 are transmitted to the first sensing electrodes 10. The remaining N-n signal separation stages 2 transmit capacitance sense signals 34 from the second sensing electrodes 31 to the mutual capacitance touch controller 112.

The fourth device 111 includes $N_{elec}$ first input/output terminals 13, and each first input/output terminal 13 is connected to a corresponding first or second sensing electrode 10, 31 via a conductive trace 50. The third device 48 includes $N_{cap} \leq N_{elec}$ second input/output terminals 14, and each second input/output terminal is connected to a corresponding terminal/port of the mutual capacitance touch controller 112.

The amplification section 51 of the fourth device 111 includes a total of M amplification stages 3, including a number m of amplification stages 3 corresponding to the first sensing electrodes 10. The remaining M-m amplification stages 3 correspond to the second sensing electrodes 31. The first group of signal separate ion stages 2, i.e. the $1^{st}$ to $n^{th}$, are connected to the corresponding $1^{st}$ to $m^{th}$ amplification stages 3 by a first impedance network 27. The second group of signal separation stages 2, i.e. the $n+1^{th}$ to $N^{th}$, are connected to corresponding $m+1^{th}$ to $M^{th}$ amplification stages 3 by a second impedance network 27b which is separate from the first impedance network 27a. The number M is at least two, to allow at least one amplification stage 3 for the first sensing electrodes 10 and one amplification stage 3 for the second sensing electrodes 31.

The first impedance network 27a maps the $1^{st}$ to $m^{th}$ amplification stages 3 to the $1^{st}$ to $N^{th}$ signal separation stages 2 such that an input of each of the $1^{st}$ to $m^{th}$ amplification stages 3 is connected to one or more first sensing electrodes 10 through the respective $1^{st}$ to $n^{th}$ signal separation stage(s) 2. The second impedance network 27b maps the $m+1^{th}$ to $M^{th}$ amplification stages 3 to the $n+1^{th}$ to $N^{th}$ signal separation stages 2 such that an input of each of the $m+1^{th}$ to $M^{th}$ amplification stages 3 is connected to one or more second sensing electrodes 31 through the respective $1^{st}$ to $n^{th}$ signal separation stage(s) 2.

The number M of amplification stages 3 may be equal to the number N of signal separation stages 2. The number N of signal separation stages 2 may be equal to the number of first input/output terminals 13, but need not be. Some mutual capacitance touch controllers 112 may include a terminal corresponding to each drive electrode Tx and each sense electrode Rx, in which case the number N of signal separation stages 2, the number $N_{elec}$ of first terminals 13 and the number $N_{cap}$ of second terminals will all be equal.

Other mutual capacitance touch controllers 112 may include one or several terminals for driving drive electrodes Tx, and which are intended to be connected to the drive electrodes Tx through a multiplexer. Such mutual capacitance touch controllers 112 may still include a terminal corresponding to each sense electrode Rx. In this case, the number N of signal separation stages 2, the number $N_{elect}$ of first terminals 13 and the number $N_{cap}$ of second terminals will not be equal.

Figure 44:
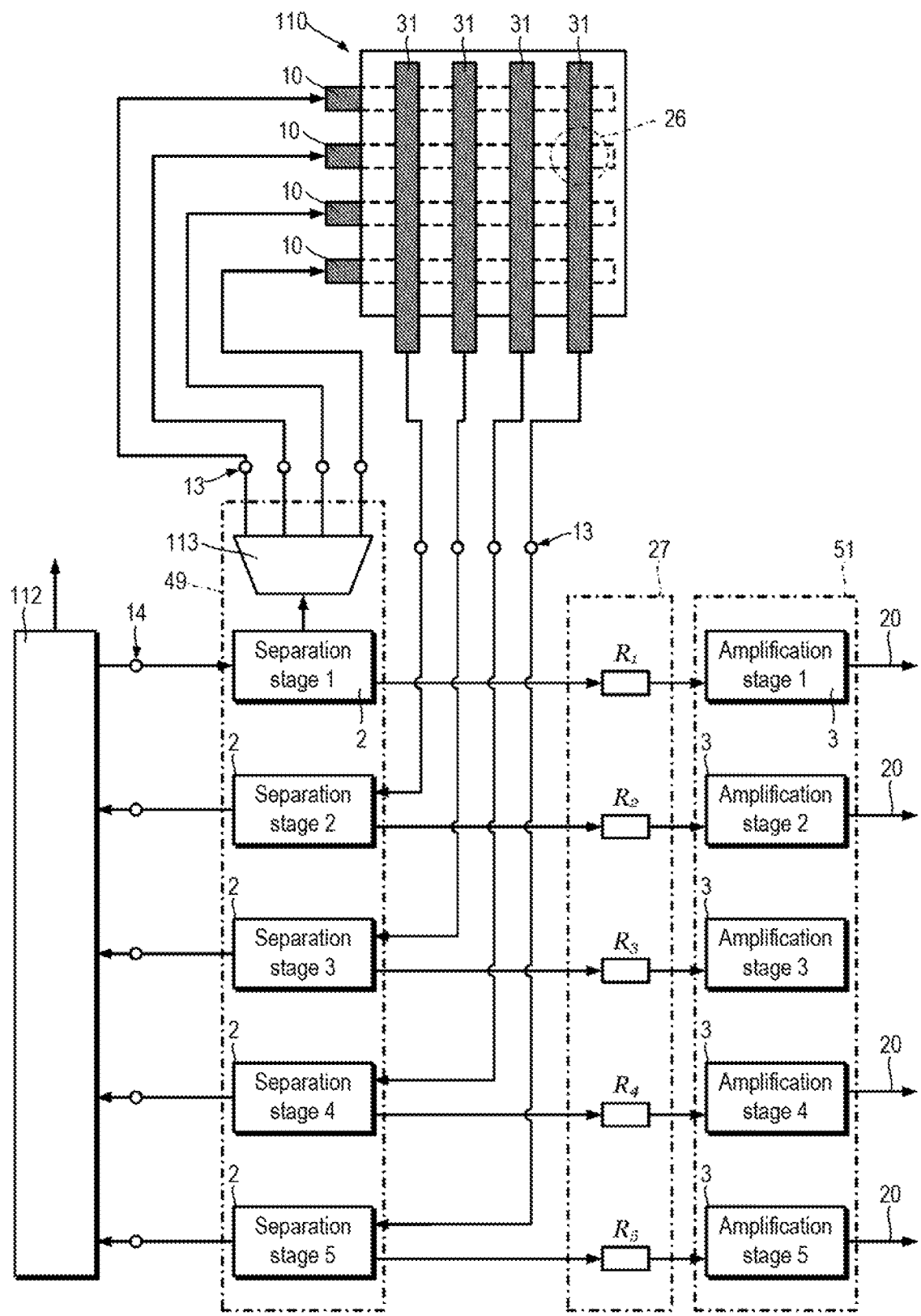
FIG. 44 illustrates one example of the third touch panel system shown in FIG. 43.

For example, referring also to FIG. 44, one example of the third touch panel system 109 is shown. In the example shown in FIG. 44, the mutual capacitance touch controller 112 include a terminal corresponding to each sense electrode Rx, in this case the second sensing electrodes 31, but only includes a single terminal for outputting capacitance drive signals 33. The capacitance drive signals 33 are transmitted by a corresponding signal separation stage 2 to a multiplexer 113, and each output of the multiplexer 113 is connected to a corresponding first sensing electrode 10 via a first terminal 13. In this way, any one of the first sensing electrodes 10 may be selected for driving using the multiplexer 113.

The third touch panel system 109 is not limited to the example shown in FIG. 44. In other examples, the mutual capacitance touch controller 112 may drive die first sensing electrodes 10 directly, so that pressure measurements are obtained in one dimension from the second sensing electrodes 31, or vice versa.

In other examples, each amplification stage 3 may connected to a single first or second sensing electrode 10, 31, yet the number M of amplification stages 3 may be less than the number of sensing electrodes 10, 31. For example, every other first electrode 10 may be connected to an amplification stage 3 whilst the remaining first electrodes 10 are connected directly to the mutual capacitance touch controller 112.

Although the first and second sensing electrodes 10, 31 have been shown as being substantially rectangular, other shapes can be used.

By omitting the common electrode 11, 61, 108, the display stack-up may be simplified and/or thinner. Additionally, even a patterned common electrode 61 will partially shield the sensing electrodes 10, 31, and thus reduce the sensitivity of capacitive touch measurements, if located between a user and the first and second sensing electrodes 10, 31. This problem is avoided in the third touch panel system 109.

Figure 45:
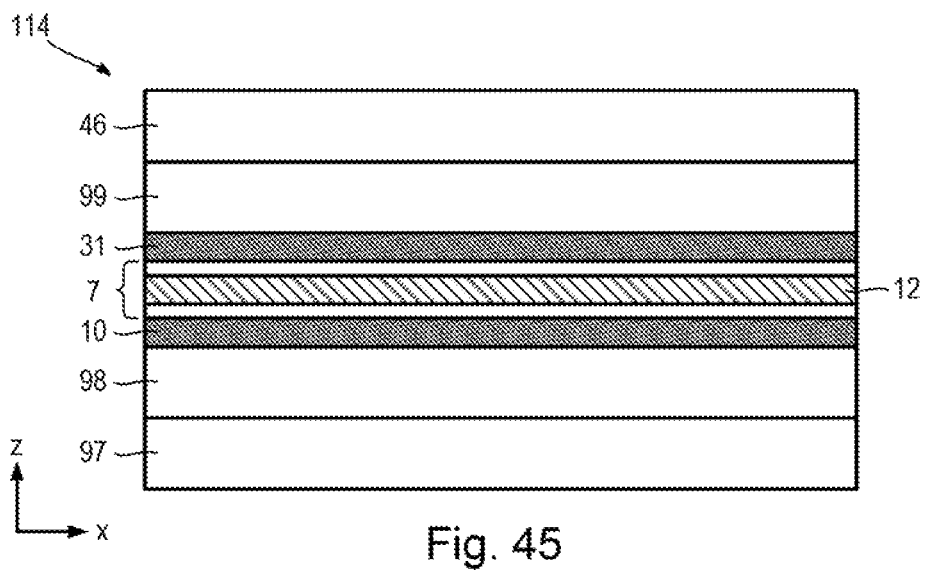
FIGS. 45 and 46 show simplified cross-sections of ninth and tenth embedded stack-ups for providing touch panels for combined capacitance and pressure measurements.

Referring also to FIG. 45, a ninth embedded stack-up 114 is shown. The ninth embedded stack-up 114 includes a pixel array 97 of a display 42, a colour filter glass 98, first sensing electrodes 10, a layer structure 7, second sensing electrodes 31, a polariser 99 and a cover lens 46 stacked in the thickness direction from the pixel array 97 to the cover lens 46. The second sensing electrodes 31 may be disposed on the layer structure 7 and the first sensing electrodes 10 may be disposed on the colour filter glass 98. Alternatively, the second sensing electrodes 31 may be disposed on the first face 8 of the layer structure 7 and the first sensing electrodes 10 may be disposed on the second face 9 of the layer structure. In some examples, the layer structure 7 may include only the layer of piezoelectric material 12, in which case the first and second sensing electrodes 31 are disposed on opposite faces of the layer of piezoelectric material 12.

By omitting the common electrode 11, 61, 108, the display stack-up may be simplified and may also be thinner as fewer layers are required. Additionally, even a patterned common electrode 61 will partially shield the sensing electrodes 10, 31, and thus reduce the sensitivity of capacitive touch measurements, if located between a user and the first and second sensing electrodes 10,31. This problem is avoided using the ninth embedded stack-up 114.

Figure 46:
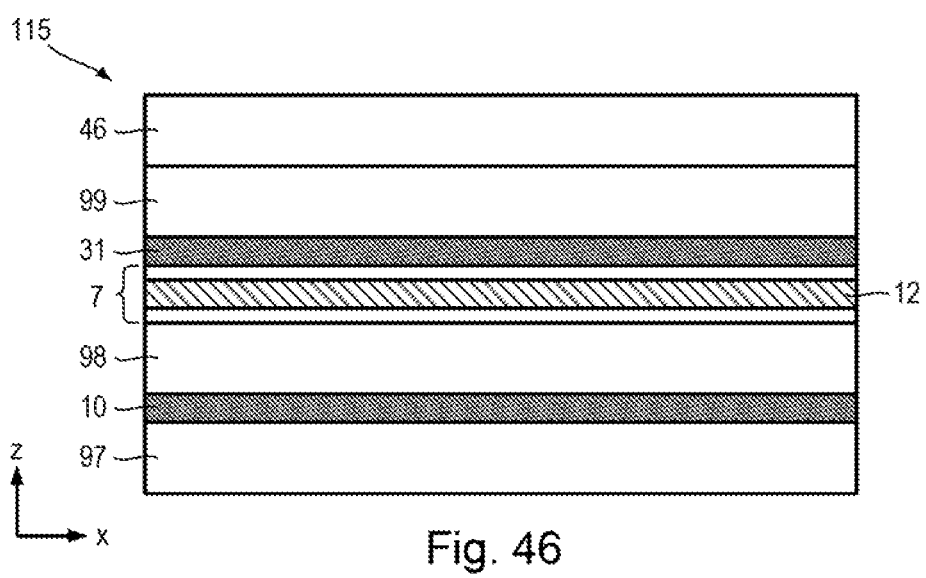

Referring also to FIG. 46, a tenth embedded stack-up 115 is shown. The tenth embedded stack-up 115 is the same as the ninth embedded stack-up 114, except that the order of the first sensing electrodes 10 and the colour filter glass 98 is reversed, so that the tenth embedded stack-up includes a pixel array 97 of a display 42, first sensing electrodes 10, a colour filter glass 98, a Layer structure 7, second sensing electrodes 31, a polariser 99 and a cover lens 46 stacked in the thickness direction from the pixel array 97 to the cover lens 46.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicant hereby gives notice that new claims may be formulated to such features and/or combinations of such features during the prosecution of the present application or of any further application derived therefrom.

What is claimed is:

1. An apparatus comprising:
   a touchscreen panel comprising:
      a plurality of first sensing electrodes disposed on a first face of a layer structure, the layer structure comprising at least a layer of piezoelectric material;
      a plurality of second sensing electrodes disposed on a second face of the layer structure, the second face opposed to the first face;
      a plurality of separated common electrodes disposed on the second face of the layer structure and interleaved with the second sensing electrodes; and
   a device connected to the touchscreen panel and further configured for connection to a capacitive touch controller wherein the capacitive touch controller is configured to measure mutual capacitance between the first sensing electrodes and the second sensing electrodes;
   the device comprising:
      a plurality of input/output terminals for the capacitive touch controller;
      a plurality of separation stages, each separation stage connecting a corresponding input/output terminal to at least one first sensing electrode or at least one second sensing electrode, wherein each separation stage is configured to pass signals to and/or from the capacitive touch controller;
      at least one amplification stage, each amplification stage having at least one input and an output configured to provide an amplified signal, wherein the number of amplification stages is less than or equal to the number of separation stages and each amplification stage input is connected to one or more of the first input/output terminals through at least one respective separation stage;
wherein each amplification stage or each separation stage is configured to attenuate signals from the capacitive touch controller;
wherein the apparatus is configured to measure, based on the amplified signals, pressure values between the first sensing electrodes and the separated common electrodes.

2. The apparatus according to claim 1, wherein each pressure value corresponds to a group of two or more first electrodes, and is indicative of a pressure applied to the touchscreen proximate to that group of first electrodes.

3. The apparatus according to claim 1, further comprising a pressure signal processing module configured to:
receive one or more amplified signals; and
the pressure values in dependence upon the one or more amplified signals.

4. A touchscreen system comprising:
the apparatus according to claim 1; and
a capacitive touch controller connected to the device.

5. The apparatus according to claim 1, wherein the plurality of separated common electrodes are coupled to each another and addressed collectively;
wherein each measured pressure value corresponds to a pressure value obtained between one of the first sensing electrodes and the separated common electrodes.

6. The apparatus according to claim 1, wherein the plurality of separated common electrodes are individually addressable;
wherein each measured pressure value corresponds to a pressure value obtained between a pair of first and separated common electrodes.

7. An apparatus comprising:
a touchscreen comprising:
a plurality of first sensing electrodes disposed on a first face of a layer structure, the layer structure comprising at least a layer of piezoelectric material;
a plurality of second sensing electrodes disposed on a second face of the layer structure, the second face opposed to the first face;
a plurality of separated common electrodes disposed on the second face of the layer structure and interleaved with the second sensing electrodes; and
a device connected to the touchscreen panel, the device comprising:
a capacitive touch controller configured to measure mutual capacitances between the first sensing electrodes and the second sensing electrodes:
a plurality of input/output terminals connected to the capacitive touch controller;
a plurality of separation stages, each separation stage connecting a corresponding input/output terminal to at least one first sensing electrode or at least one second sensing electrode, wherein each separation stage is configured to pass signals to and/or from the capacitive touch controller;
at least one amplification stage, each amplification stage having at least one input and an output configured to provide an amplified signal, wherein the number of amplification stages is less than or equal to the number of separation stages and each amplification stage input is connected to one or more of the first input/output terminals through at least one respective separation stage;
wherein each amplification stage or each separation stage is configured to attenuate signals from the capacitive touch controller;
wherein the device is configured to measure, based on the amplified signals, pressure values between the first sensing electrodes and the separated common electrodes.

8. The apparatus according to claim 7, wherein each pressure value corresponds to a group of two or more first electrodes and is indicative of a pressure applied to the touchscreen proximate to that group of first electrodes.

9. The apparatus according to claim 7, further comprising a pressure signal processing module configured to:
receive one or more amplified signals;
calculate the pressure values in dependence upon the one or more amplified signals.

10. The apparatus according to claim 7, wherein the plurality of separated common electrodes are coupled to each another and addressed collectively;
wherein each measured pressure value corresponds to a pressure value obtained between one of the first sensing electrodes and the separated common electrodes.

11. The apparatus according to claim 7, wherein the plurality of separated common electrodes are individually addressable;
wherein each measured pressure value corresponds to a pressure value obtained between a pair of first and separated common electrodes.

12. A method of using a touchscreen and a capacitive touch controller, wherein the touchscreen comprises a plurality of first sensing electrodes disposed on a first face of a layer structure including at least a layer of piezoelectric material, a plurality of second sensing electrodes disposed on a second face of the layer structure, wherein the second face is opposed to the first face, and a plurality of separated common electrodes disposed on the second face of the layer structure and interleaved with the second sensing electrodes;
the method comprising:
using the capacitive touch controller to measure mutual capacitance values between the first electrodes and the second sensing electrodes, via a plurality of separation stages, each separation stage connecting a corresponding input/output terminal to at least one first sensing electrode or at least one second sensing electrode, wherein each separation stage is configured to pass signals to and/or from the capacitive touch controller;
measuring, based on amplified signals output from at least one amplification stage, pressure values between the first sensing electrodes and the separated common electrodes
wherein each amplification stage has at least one input and an output configured to provide a corresponding amplified signal, wherein the number of amplification stages is less than or equal to the number of separation stages and each amplification stage input is connected to one or more of the first input/output terminals through at least one respective separation stage, and wherein each amplification stage or each separation stare is configured to attenuate signals from the capacitive touch controller.

13. The method according to claim 12, wherein each pressure value corresponds to a group of two or more first electrodes, and is indicative of a pressure applied to the touchscreen proximate to that group of first electrodes.

* * * * *